United States Patent
Vavra et al.

(10) Patent No.: US 10,216,330 B2
(45) Date of Patent: Feb. 26, 2019

(54) TOUCH SYSTEMS AND METHODS INCLUDING REJECTION OF UNINTENTIONAL TOUCH SIGNALS

(71) Applicant: 3M INNOVATIVE PROPERTIES COMPANY, St. Paul, MN (US)

(72) Inventors: Joshua D. Vavra, Derry, NH (US); Thomas J. Rebeschi, Merrimack, NH (US); Craig A. Cordeiro, Westford, MA (US); Jakisa Tomic, Ornis (HR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 44 days.

(21) Appl. No.: 15/319,410

(22) PCT Filed: Jun. 30, 2015

(86) PCT No.: PCT/US2015/038484
§ 371 (c)(1),
(2) Date: Dec. 16, 2016

(87) PCT Pub. No.: WO2016/004003
PCT Pub. Date: Jan. 7, 2016

(65) Prior Publication Data
US 2017/0153763 A1 Jun. 1, 2017

Related U.S. Application Data

(60) Provisional application No. 62/019,930, filed on Jul. 2, 2014.

(51) Int. Cl.
G06F 3/041 (2006.01)
G06F 3/0488 (2013.01)
(Continued)

(52) U.S. Cl.
CPC .......... *G06F 3/0418* (2013.01); *G06F 3/0383* (2013.01); *G06F 3/03545* (2013.01);
(Continued)

(58) Field of Classification Search
CPC .. G06F 3/0418; G06F 3/03545; G06F 3/0383; G06F 3/0416; G06F 3/044;
(Continued)

(56) References Cited

U.S. PATENT DOCUMENTS

| 6,246,395 B1 | 6/2001 | Goyins |
| 8,493,355 B2 | 7/2013 | Geaghan |

(Continued)

FOREIGN PATENT DOCUMENTS

| CA | 2815824 | 11/2013 |
| EP | 2573659 | 3/2013 |
| WO | WO 2014-168779 | 10/2014 |

OTHER PUBLICATIONS

International Search Report for PCT International Application No. PCT/US2015/038484, dated Oct. 20, 2015, 4pgs.

*Primary Examiner* — Lisa S Landis
(74) *Attorney, Agent, or Firm* — Jonathan L. Tolstedt

(57) ABSTRACT

A touch sensor can be used with a finger and/or a pen configured to provide a touch input to the touch sensor. Some implementations involve touch capacitive touch sensing, although many implementations are also applicable to other touch and pen technologies, such as resistive, surface acoustic wave, bending wave, touch force, electromagnetic (E-M). Discrimination between intentional touches and unintentional touches on the touch surface can be performed using first criteria. For each touch identified as an intentional touch, discrimination between a finger touch and a pen touch can be performed using second criteria.

14 Claims, 44 Drawing Sheets

(51) Int. Cl.
*G06F 3/0354* (2013.01)
*G06F 3/038* (2013.01)
*G06F 3/044* (2006.01)

(52) U.S. Cl.
CPC ............ *G06F 3/044* (2013.01); *G06F 3/0416* (2013.01); *G06F 3/0488* (2013.01); *G06F 2203/04101* (2013.01); *G06F 2203/04104* (2013.01); *G06F 2203/04105* (2013.01); *G06F 2203/04106* (2013.01)

(58) Field of Classification Search
CPC ......... G06F 3/0488; G06F 2203/04101; G06F 2203/04104; G06F 2203/04105; G06F 2203/04106
See application file for complete search history.

(56) References Cited

U.S. PATENT DOCUMENTS

| | | | |
|---|---|---|---|
| 2009/0095540 A1* | 4/2009 | Zachut | G06F 3/044 178/18.03 |
| 2011/0084934 A1 | 4/2011 | Tsuzaki | |
| 2011/0291944 A1* | 12/2011 | Simmons | G06F 3/0416 345/173 |
| 2012/0062497 A1 | 1/2012 | Yeh | |
| 2012/0007618 A1 | 3/2012 | Rebeschi | |
| 2013/0044070 A1* | 2/2013 | Townsend | G06F 3/0416 345/173 |
| 2013/0300672 A1 | 11/2013 | Griffin | |
| 2013/0300696 A1 | 11/2013 | Haran | |
| 2013/0328828 A1 | 12/2013 | Tate | |
| 2014/0152594 A1* | 6/2014 | Kim | G06F 3/04883 345/173 |

\* cited by examiner

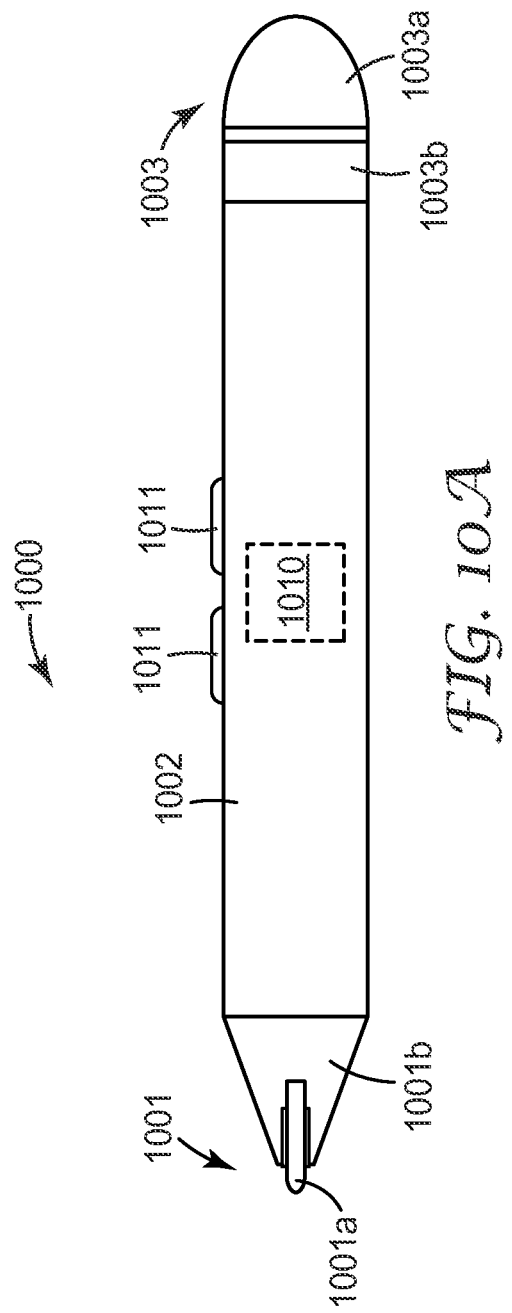

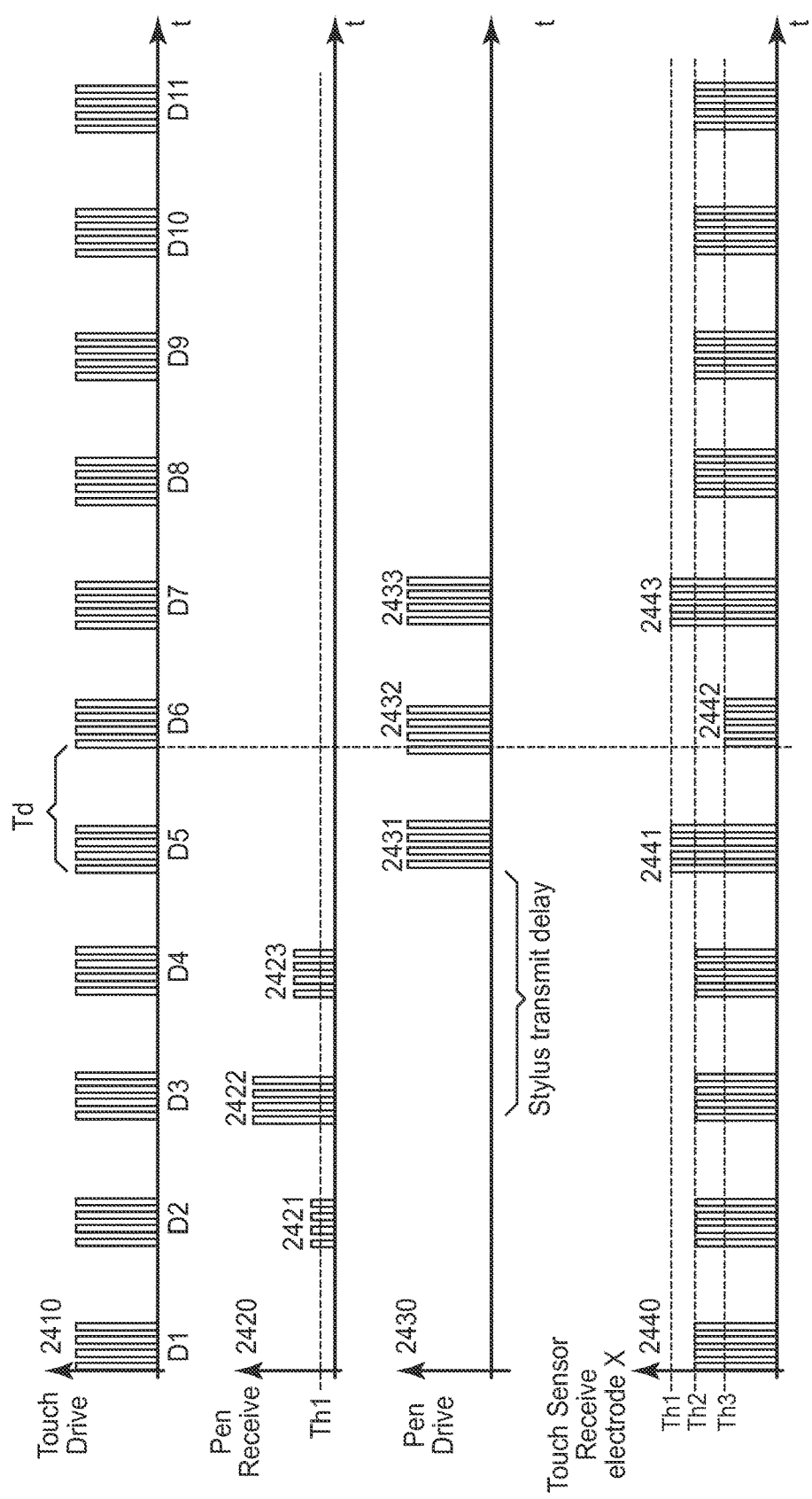

2999

Scan#

| | 1 | 2 | 3 | 4 |
|---|---|---|---|---|
2910

2920 Skip / 1st finger report

| | | |
|---|---|---|
| 2920 | F | F |

2931-2933 Skip / 1st pen report

| | Skip | 1st pen report |
|---|---|---|
| 2931 | F | P |
| 2932 | P | F |
| 2933 | P | P |

2941-2946 Skip / 1st pen report

| | Skip | | 1st pen report |
|---|---|---|---|
| 2941 | F | P | F |
| 2942 | F | P | P |
| 2943 | P | F | F |
| 2944 | P | F | P |
| 2945 | P | P | F |
| 2946 | P | P | P |

2951-2962 Skip / 1st pen report

| | Skip | | | 1st pen report |
|---|---|---|---|---|
| 2951 | F | P | F | F |
| 2952 | F | P | F | P |
| 2953 | F | P | P | F |
| 2954 | F | P | P | P |
| 2955 | P | F | F | F |
| 2956 | P | F | F | P |
| 2957 | P | F | P | F |
| 2958 | P | F | P | P |
| 2959 | P | P | F | F |
| 2960 | P | P | F | P |
| 2961 | P | P | P | F |
| 2962 | P | P | P | P |

FIG. 29

TOUCH SYSTEMS AND METHODS INCLUDING REJECTION OF UNINTENTIONAL TOUCH SIGNALS

TECHNICAL FIELD

This disclosure relates generally to methods and systems for determining touch locations on a touch sensitive surface.

BACKGROUND

Touch-sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon displayed on the display.

Capacitive touch-sensing devices have been found to work well in a number of applications. In many touch-sensitive devices, the touch input is sensed when a conductive object in the sensor is capacitively coupled to a conductive touch implement such as a pen (also referred to as a stylus) or a user's finger. Generally, whenever two electrically conductive members come into proximity with one another without actually touching, a capacitance is formed therebetween. In the case of a capacitive touch-sensitive device, as an electrically conductive object approaches and/or touches the touch sensing surface, changes in capacitance occurs at the touch location and the sensing circuit can be configured to determine the touch location based on the change in capacitive coupling. In some embodiments, the sensing circuit can recognize that multiple objects are concurrently touching the touch surface and can determine the locations of the objects as they move across the touch surface. Other technologies for touch sensing have also been considered, including resistive, magnetic, optical, and acoustic technologies, for example.

BRIEF SUMMARY

Some embodiments are directed to a method of determining a touch location on a touch surface of a touch panel comprising a matrix of intersecting electrodes with nodes at intersections of the electrodes. The method includes discriminating between one or more intentional touches and one or more unintentional touches on the touch surface using first criteria. For each touch identified as an intentional touch, discrimination between a finger touch and a pen touch is performed using a second criteria.

According to some embodiments, a touch sensor includes a touch panel having a touch surface and a matrix of electrodes with nodes at intersections of the electrodes. A touch controller is configured to discriminate between one or more intentional touches and one or more unintentional touches on the touch surface using first criteria. For each touch identified as an intentional touch, the controller discriminates between a finger touch and a pen touch using second criteria.

Some embodiments involve a method of operating a touch sensor. A profile of a touch on a touch surface of the touch sensor is determined. The touch profile is bounded by an edge of connected nodes having a signal value greater than a threshold. One or more peak nodes corresponding to signal peaks within the touch profile are identified. The touch is classified as an intentional touch or an unintentional touch based on the one or more peak nodes and an area and/or shape of the touch profile.

In accordance with some embodiments, a touch sensor includes a touch panel and a controller. The touch panel has a touch surface and a matrix of electrodes with nodes at intersections of the electrodes. The touch controller is configured to identify a profile of a touch on the touch surface. The profile is bounded by an edge of adjacent nodes having a signal value greater than a threshold. The controller identifies one or more peak nodes corresponding to signal peaks within the touch profile. The controller discriminates between an intentional touch and an unintentional touch based on the one or more peak nodes and an area or shape of the touch profile.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 10A illustrates an active pen wherein the one end of the pen can operate in active mode and the other end of the pen can operate in passive mode;

FIG. 24 illustrates pen drive signals that are delayed by a predetermined delay;

FIG. 29 is a diagram that illustrates sensing pen codes using a pen drive signal in accordance with various embodiments;

The figures, examples, and graphs are provided for illustrative purposes and are not necessarily to scale unless otherwise indicated. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Embodiments described herein involve a touch sensor that in many implementations may be used with an active pen (also referred to as a stylus) configured to provide a touch input to the touch sensor. The embodiments discussed herein are applicable to capacitive touch technologies and many examples are provided in terms of capacitive touch sensing. However, this disclosure is not limited to capacitive touch technologies as many of the approaches are also applicable to other touch and pen technologies, such as resistive, surface acoustic wave, bending wave, touch force, electromagnetic (E-M), etc.

A capacitive touch sensor includes a touch panel and a touch controller. The touch panel typically comprises matrix of drive and receive electrodes arranged so that the drive electrodes are capacitively coupled to the receive electrodes. The touch controller is electrically coupled to the drive and receive electrodes. The controller applies drive signals to the drive electrodes and senses the response signals carried by the receive electrodes. The response signals can be analyzed to determine a location of a touch on the touch sensor.

A finger touch is passive and has a subtractive effect on a touch response signal. A pen may be active or passive. A passive pen operates as a finger touch, whereas an active pen may emit a signal that modifies the response signal carried on the receive electrodes. As discussed in embodiments below, an active pen may be configured to add to the touch response signal or to subtract from the response signal of the touch sensor. The difference in the touch response signal amplitude for a finger and an active pen can be used by the touch system to distinguish a finger touch from a pen touch. In some embodiments, pens used with the touch sensor may be configured produce a touch response signal that includes code that may be used to identify the pen or may be used for other purposes.

The pen (also referred to as a stylus) is physically separate from the touch sensor and in some implementations may be electrically connected to the touch sensor. The pen includes a pen body having a pen tip that is configured to make contact with the touch sensing surface and a grip portion or barrel configured so that a user can grip the pen and direct the pen tip into close proximity and/or contact at the desired touch point on the touch sensing surface of the touch sensor. The pen body at least partially encloses electronic circuitry of the pen.

Figure 1:
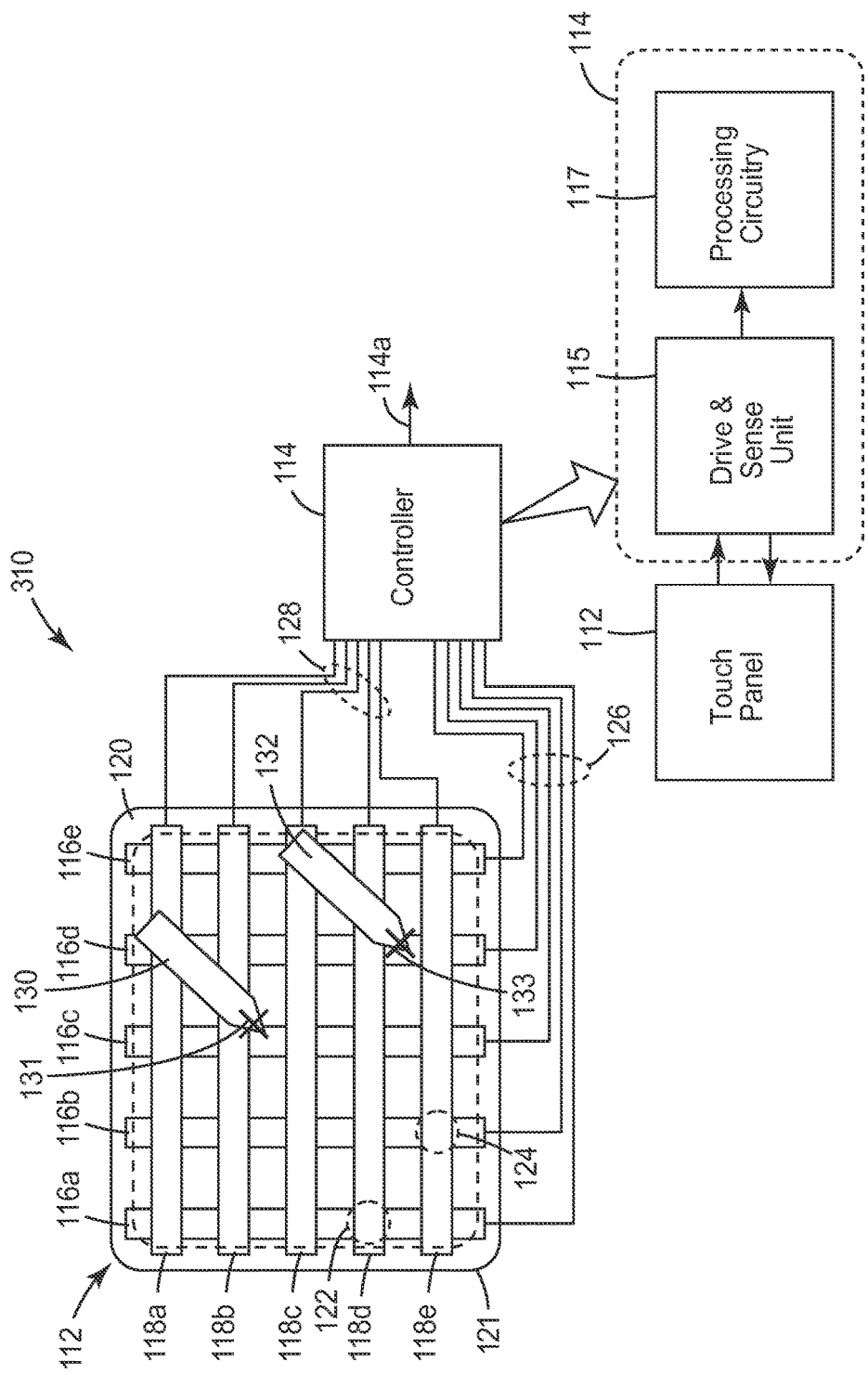
FIG. 1 depicts a touch sensor.

Turning now to FIG. 1, an exemplary capacitive touch sensor 110 is shown. The sensor 110 includes a touch panel 112 connected to electronic circuitry, which for simplicity is grouped together into a single schematic box labeled 114 and referred to collectively as a controller. The controller 114 may comprise a pulse driver, a signal receiver, an analog to digital converter, and a data processor and/or other circuitry configured to perform various processes described herein.

The touch panel 112 is shown as having a 5×5 matrix of column electrodes 116a-e and row electrodes 118a-e, but other numbers of electrodes and other matrix sizes can also be used. The panel 112 is typically substantially transparent so that the user is able to view an object, such as the pixilated display of a computer, hand-held device, mobile phone, or other peripheral device, through the panel 112. The boundary 120 represents the viewing area of the panel 112 and also the viewing area of such a display, if used. The electrodes 116a-e, 118a-e are spatially distributed, from a plan view perspective, over the viewing area 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the row and column electrode-to-electrode capacitive coupling.

In exemplary embodiments the electrodes may be composed of indium tin oxide (ITO) or other suitable electrically conductive materials. From a depth perspective, the column electrodes 116a-e may lie in a different plane than the row electrodes 118a-e such that no significant ohmic contact is made between column and row electrodes, and so that the only significant electrical coupling between a given column electrode and a given row electrode is capacitive coupling. From the perspective of FIG. 1, the column electrodes 116a-e lie underneath the row electrodes 118a-e. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch sensing surface.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, any one of which can be addressed by controller 114 via appropriate selection of one of the control lines 126, which individually couple the respective column electrodes 116a-e to the controller 114, and appropriate selection of one of the control lines 128, which individually couple the respective row electrodes 118a-e to the controller 114.

The controller 114 includes circuitry configured to generate and apply drive signals to a first set of electrodes of the touch panel and to receive signals from a second set of electrodes. For example, in some configurations, the drive electrodes may be the column electrodes 116a-116e and the receive electrodes may be the row electrodes 118a-118e, although it is also possible that the column electrodes may be used as receive electrodes and the row electrodes may be used as drive electrodes. In some implementations, the controller electronics applies drive signals to the drive electrodes sequence, e.g., starting with electrode 116a and progressing to electrode 116e, although it is possible for the sequence to start and/or end with different electrodes such that a variety of patterns are possible for applying drive signals to the drive electrodes. As the drive signals are applied to the drive electrodes, the controller 114 senses signals on the receive electrodes.

When a touch implement 130, such as pen or a finger comes into contact or near-contact with the touch sensing surface of the sensor 110, as shown at touch location 131, the touch implement 130 capacitively couples to the electrode matrix. If the touch implement is a finger (or a passive touch implement), the finger draws charge from the matrix, especially from those electrodes lying closest to the touch location, and in doing so it changes the coupling capacitance between the drive and receive electrodes corresponding to the nearest node(s). For example, the touch at touch location 131 lies nearest the node corresponding to electrodes 116c/118b. A finger or passive touch implement decreases the capacitive coupling between the receive and drive electrodes nearest the node.

If the touch implement is active and is driven with a signal, the signal is capacitively coupled to the matrix and the signal of the touch implement operates to change the effective capacitive coupling between the drive and receive electrodes corresponding to the nearest node. If the signal from the touch implement is subtractive with respect to the drive signal, the signal draws charge from proximate touch sensor electrodes nearby and decreases the effective capacitive coupling between the drive and receive electrodes at the node. If the signal from the touch implement is additive with respect to the drive signal, the signal adds charge to the proximate touch sensor electrodes nearby and increases the effective capacitive coupling between the drive and receive electrodes at the node.

As described further below, the change (increase or decrease) in effective capacitive coupling can be detected by controller 114 and interpreted as a touch at or near affected node, e.g., the 116c/118b node shown in FIG. 1. The controller 114 can be configured to rapidly detect the changes in effective capacitive coupling, if any, of all of the nodes of the matrix, and is capable of analyzing the magnitudes of the changes for neighboring nodes so as to accurately determine a touch location lying between nodes by interpolation.

Furthermore, the controller 114 may be designed to detect multiple distinct touches applied to different portions of the touch panel 112 at the same time, or at overlapping times. Thus, for example, if another touch implement 132 touches the touch surface of the device 110 at touch location 133 simultaneously with the touch of implement 130, or if the respective touches at least temporally overlap, the controller 114 may be capable of detecting the positions 131, 133 of both such touches and providing such locations on a touch output 114a. The number of distinct simultaneous or temporally overlapping touches capable of being detected by controller 114 is not limited to 2, e.g., it may be 3, 4, or more, depending on the size of the electrode matrix. In at least some of the disclosed embodiments the number of temporally overlapping touches capable of being detected equals the number of nodes in the electrode matrix.

As discussed further below, the controller 114 may employ a variety of circuit modules and components that enable it to rapidly determine the coupling capacitance at some or all of the nodes of the electrode matrix. Note that the changes in effective capacitive coupling can be determined by measuring any suitable parameter or quantity whose value depends on the coupling capacitance.

As discussed previously, the controller may include one or more signal generators that form part of a drive unit 115. The drive unit 115 delivers drive signals from the signal generator(s) to one set of electrodes, referred to as drive electrodes. In the embodiment of FIG. 1, the column electrodes 116a-e may be used as drive electrodes, or the row electrodes 118a-e may be so used. In some embodiments, the drive unit 115 delivers multiple drive pulses to one of the drive electrodes at a time. For example, the drive unit 115 may deliver a first drive signal to a first drive electrode, then sequentially delivering a second set of drive pulses to a second drive electrode, and so on delivering a third set of drive pulses to a third drive electrode, and so forth. While the drive signals are applied, the controller 114 may monitor one, some, or all of the other set of electrodes, referred to as receive electrodes.

The controller 114 may, for example, include one or more sense units 115 coupled to the receive electrodes. A given sense unit receives a response signal (also referred to as a receive signal) from a given receive electrode, the response signal contains the signal component of the drive signal frequency. The sense unit 115 may amplify, filter, or otherwise condition the receive signal so that the amplitude of the signal component, which is responsive respectively to the coupling capacitances between the receive electrode and the various drive electrodes that are being driven, can be measured by processing circuitry 117 that includes a measurement unit. The measurement unit may utilize a filter and summing technique to measure the respective amplitudes of the various signal components, which amplitudes are responsive to the coupling capacitance at the nodes defined by the receive electrode and the various drive electrodes that are being driven, and thus also responsive to the touch status of such nodes. The sense unit 115 may sense the response signals from all of the sense electrodes in this manner and the processing circuitry 117 measures their respective signal components in the same way. After all such measurements have been made, the processing circuitry 117 can compare the signal component amplitude measurements to stored reference values for each of the nodes in order to generate a map of which nodes, if any, have experienced a change in coupling capacitance due to the presence of a touch. The stored reference values may be measurements of the coupling capacitances made previously for each of the nodes in the absence of any touches and can be a normalized running average of each node.

A touch sensor controller may also include one or more analog-to digital converters (ADCs) to convert signals from an analog format to a digital format. Digital-to-analog converters (DACs) may also be used, for example in one or more drive units to convert digital values to an analog drive signal. One or more multiplexers and switches may also be used to avoid unnecessary duplication of circuit elements. In some cases, the controller includes one or more memory devices in which to store the measured amplitudes and associated parameters, and a microprocessor to perform the necessary calculations and control functions. In some cases the controller, and/or other portions of the touch device, can also embody one or more application-specific integrated circuits (ASICs), application specific standard products (ASSPs), or the like, to carry out one or more of the functions described herein.

A touch may be identified when the capacitve coupling on a node is effectively reduced or increased by a passive or active touch implement. In some embodiments, for a finger touch, a signal at a receive electrode indicative of the capacitive coupling from the finger touch is compared to the untouched signal level. When the signal at a node of the receive electrode goes below a touch threshold, a touch is detected and a touch coordinate is output.

If the touch implement is a pen, the pen may be passive or active. A passive pen does not emit a pen drive signal. An active pen emits a pen drive signal that is capacitively coupled to the touch sensor. A passive pen acts similarly to a finger and subtracts charge from a node causing a decrease in the response signal. A touch by a passive pen is indicated when the lower touch threshold for the response signal is reached.

An active pen may emit a signal that is subtractive with respect to the touch drive signal. When a subtractive pen drive signal is capacitively coupled to a receive electrode, the subtractive pen drive signal subtracts from the touch drive signal that is also capacitively coupled to the receive electrode. For example, the subtractive touch drive signal may have the same frequency and be 180° out of phase with respect to the touch drive signal. A touch is detected when the response signal is decreased compared with the untouched signal level, similar to a finger touch.

An active pen may emit a signal that is additive with respect to the touch drive signal. When an additive pen drive signal is capacitively coupled to a response electrode, the additive pen drive signal adds to the touch drive signal that is also capacitively coupled to the receive electrode. For example, the additive touch drive signal may have the same frequency and phase as to the touch drive signal. A touch is detected when the response signal is increased compared to the untouched signal level. In some embodiments, the touch sensor controller may be configured to differentiate between a finger touch and a phase additive active pen touch based on the amplitude of the touch sensor response signal. Additional information regarding touch controller circuitry and techniques for determining touch information is discussed in U.S. Patent Publication US 20120062497 which is incorporated by reference herein in its entirety.

Although the touch sensor depicted in FIG. 1 shows one touch panel used with a touch controller, some touch sensors include multiple touch panels that are controlled by a common touch controller. Some touch systems comprise a common host or central processor used in conjunction with multiple touch panels and/or multiple touch controllers.

As described herein, the pen drive signal can be generated based on a synchronization signal from the touch sensor. The synchronization signal can be transferred to the pen through a wired or wireless electrical connection between the touch sensor controller and pen. The synchronization signal includes information about the frequency and phase of the touch drive signals generated by the touch sensor. In some configurations, the synchronization signal may be the sensed touch drive signals. For example, the pen may be configured to sense a touch drive signal applied to a drive electrode when the pen is brought near to the touch sensing surface. The sensed touch drive signal serves as the synchronization signal for the pen.

In one example, the touch sensor controller may include pen synchronization circuitry configured to sum the touch drive signals applied to each drive electrode sequentially and to provide the summed touch drive signals to the pen through a wired connection. In another example, the pen synchronization circuitry in the touch controller may include radio frequency (RF) modulation circuitry configured to modulate an RF carrier signal with the touch drive signal. In this example, the pen would include compatible demodulator circuitry to demodulate the RF touch drive signal.

Figure 2A:
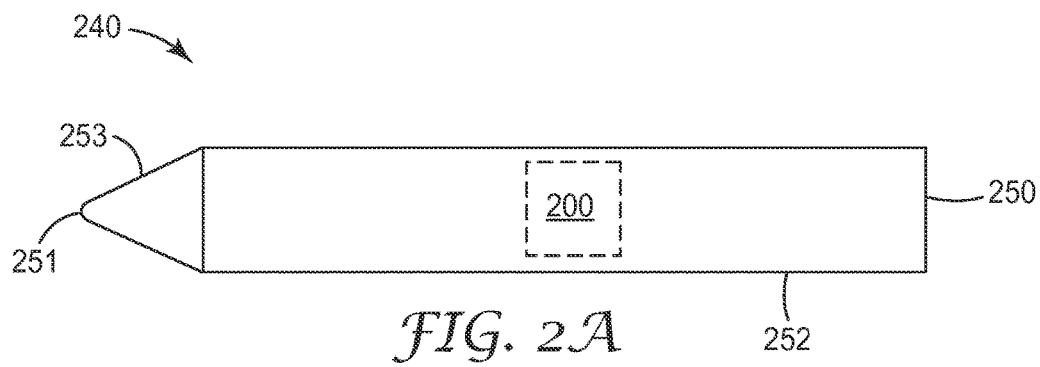
FIG. 2A illustrates a pen for use with the touch sensor of FIG. 1.

FIG. 2A shows an exemplary touch pen 240 comprising a pen body 250 that includes a tip 251 configured to make contact with the touch sensing surface of the touch sensor, a barrel or main region 252, and a transition region 253, e.g., cone between the pen tip 251 and the main region 252. The barrel region 252 provides a gripping region that allows the user to grip and manipulate the pen. An active pen includes electronic circuitry 200 that generates the pen drive signal. The electronic circuitry 200 may be disposed partially or fully within the pen body 250.

Figure 2B:
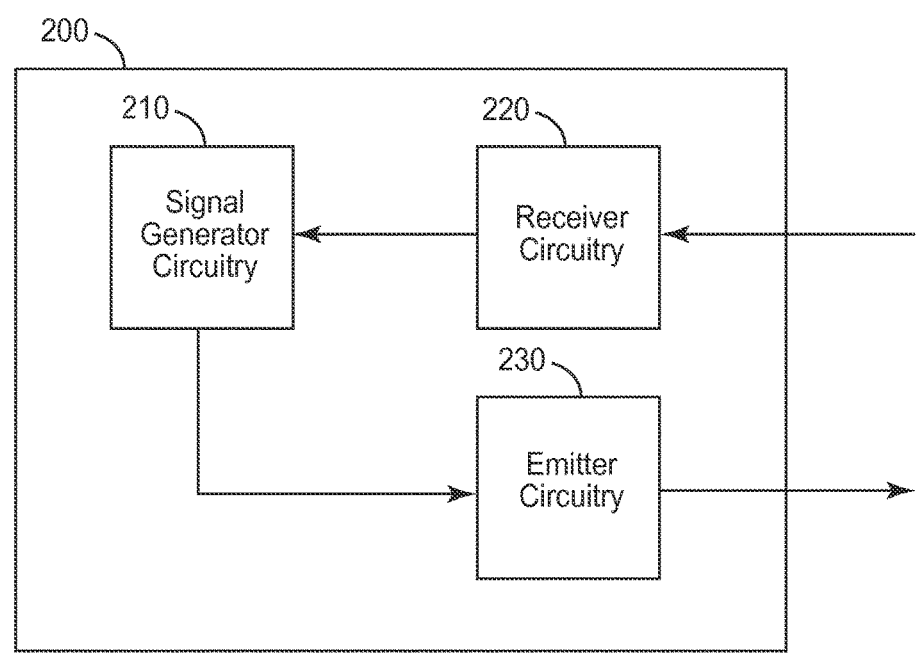
FIG. 2B is a block diagram of the pen circuitry of the pen of FIG. 2A.

As shown in FIG. 2B, in some implementations, the pen circuitry 200 includes receiver circuitry 220 configured to receive a synchronization signal from the touch sensor through a wired or wireless connection. Signal generator circuitry 210 is configured to generate the pen drive signal based on the synchronization signal. Emitter circuitry 230 configured to emit the pen drive signal from the pen.

In various embodiments, the pen body may optionally include electrically conductive emitter portion and/or an electrically conductive receiver portion that is electrically insulated and electrostatically shielded from the emitter portion. In some configurations, the emitter portion my include all or a portion of the pen tip, may include all or a portion of the transition region and/or may include a portion of the main region of the pen body, e.g. a portion of the main region that is nonoverlapping with the gripping region. The emitter circuitry may be electrically coupled with the emitter portion of the pen body so that the pen drive signal is emitted through the electrically conductive emitter portion. In pens having an emitter portion that includes at least a portion of the transition region or the main region of the pen, the pen drive signal may change effective capacitance to a greater degree and/or over a larger area on the touch sensor than the tip, enhancing the touch signal.

In some configurations, the receiver portion may include all or a portion of the pen tip, may include all or a portion of the transition region and/or may include a portion of the main region of the pen body, e.g. a portion of the main region that is nonoverlapping with the gripping region. The receiver circuitry may be electrically coupled with the receiver portion of the pen body so that the synchronization signal is received through the electrically conductive receiver portion.

In some configurations, the emitter portion may include all or at least a portion of the pen tip and the receiver portion may include all or at least a portion of the cone transition region. Alternatively, the receiver portion may include all or at least a portion of the pen tip and the emitter portion may include all or at least a portion of the cone. In some configurations, the receiver portion may comprise a first portion of the tip and the emitter portion may include a second portion of the tip. In some configurations, the receiver portion may comprise a first portion of the cone and the emitter portion may include a second portion of the cone. In other configurations, the tip may serve as the emitter portion in one mode, and serve as the receiver portion in another mode.

Figure 3:
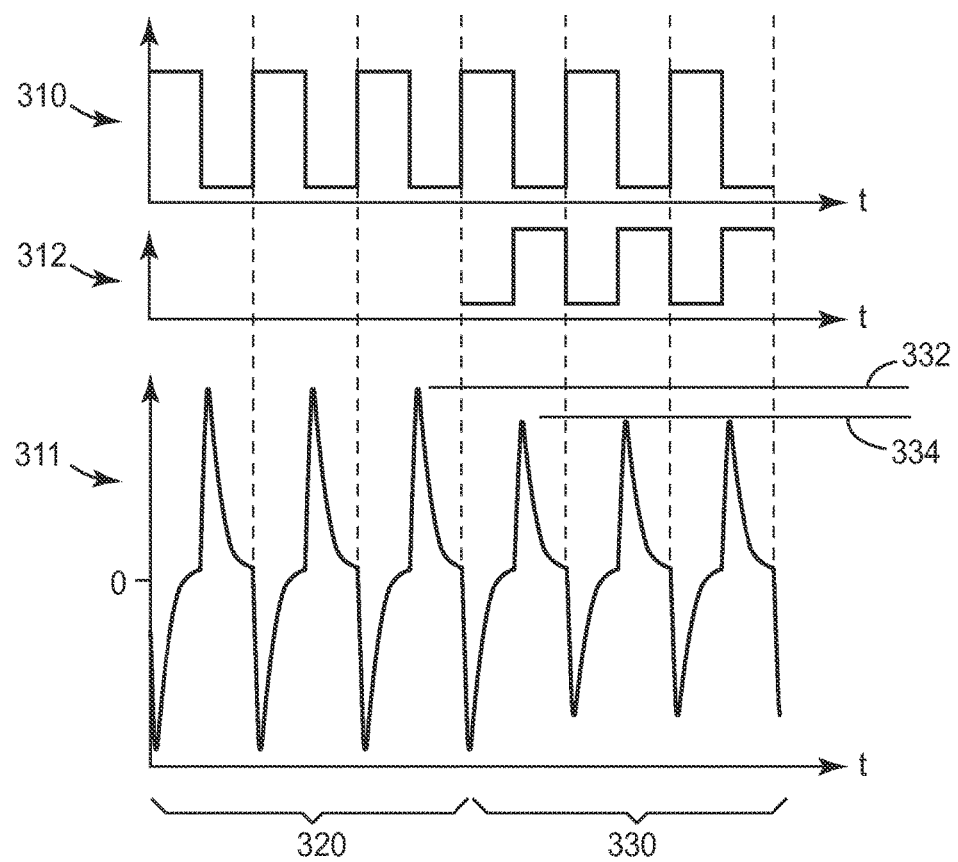
FIG. 3 depicts a voltage vs. time graph of a touch sensor drive signal and a corresponding voltage vs. time graph of a (modeled) touch sensor response signal.

FIG. 3 depicts a voltage vs. time graph of a touch sensor drive signal 310 and a corresponding voltage vs. time graph of a (modeled) touch sensor response signal 311 including portions 320, 330. The touch controller response signal 311 illustrates changes that may occur in the response signal 311 when a pen drive signal 312 that is phase subtractive with the touch sensor drive signal 310 is in close proximity to the touch sensing surface. The response signal 311 includes a no touch portion 320 (no touch present or near the relevant node of the touch sensor) and a touch portion 330 (a touch is present at or near the relevant node of the touch sensor). In the no touch portion 320, the amplitude 332 of the response signal 311 is above a touch threshold. The amplitude 334 of the touch portion 330 of the response signal 311 is below a touch threshold indicating that a touch has occurred. As described previously, a touch from a finger, a passive pen, or an active pen with an opposite phase of the touch sensor drive signal reduces capacitive coupling and decreases the amplitude of the response signal. A touch can be detected based on this drop in the amplitude of the response signal 311.

Figure 4:
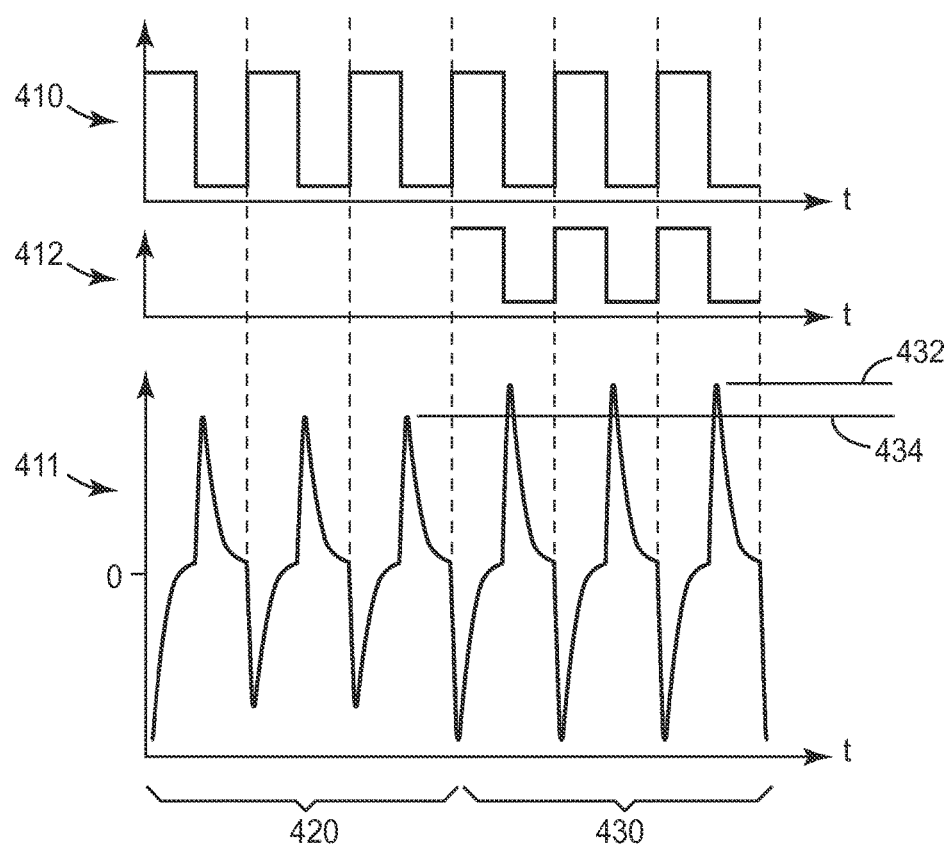
FIG. 4 shows a voltage vs. time graph of a touch sensor drive signal and a corresponding voltage vs. time graph of a response signal affected by an active pen touch with a pen drive signal having the same phase of the touch panel drive signal.

FIG. 4 shows a voltage vs. time graph of a touch sensor drive signal 410 and a corresponding voltage vs. time graph of a response signal 411 affected by an active pen touch with a pen drive signal 412 having the same phase of the touch panel drive signal. The response signal 411 includes a no touch portion 420 (no touch present at or near the node of the touch sensor) and a touch portion 430 (a touch is present at or near the node of the touch sensor). In the no touch portion 420, the amplitude 434 of the response signal is above a first touch threshold and below a second touch threshold. A response signal below the first touch threshold indicates that a finger touch, a passive pen touch, or a pen touch by an active pen having a subtractive phase pen drive signal has occurred.

In the touch portion 430 of the response signal 411, the amplitude 432 of the response signal 411 is above the second touch threshold, indicating the presence of a touch with an active pen having the same phase as the touch panel drive signal. The pen drive signal having the same phase as the touch sensor drive signal, has an additive effect on the response signal 411 in the touch portion 430 causing an increased amplitude due to an increase in the effective capacitive coupling between the drive and receive electrodes of the touch sensor.

According to some embodiments described herein, the pen drive signal includes a code that identifies the pen. The code can be used to differentiate different pens from one another. The code may allow multiple pens to be separately identified to be used concurrently with the same touch sensor.

In many touch systems, the touch controller implements a scan cycle for the drive electrodes by applying a drive signal pulse train sequentially to each drive electrode with a scan time interval between the pulse trains applied to different drive electrodes. There may be a refresh interval between successive scan cycles of the drive electrodes. In some implementations, the code is repeated in the pen drive signal for each drive signal applied to each of the scanned drive electrodes during a scan cycle, as discussed in connection with FIG. 5A. In other implementations, the code is transmitted in the pen drive signal over several scan cycles, e.g., one bit per cycle, as discussed in connection with FIG. 5B.

Figure 5A:
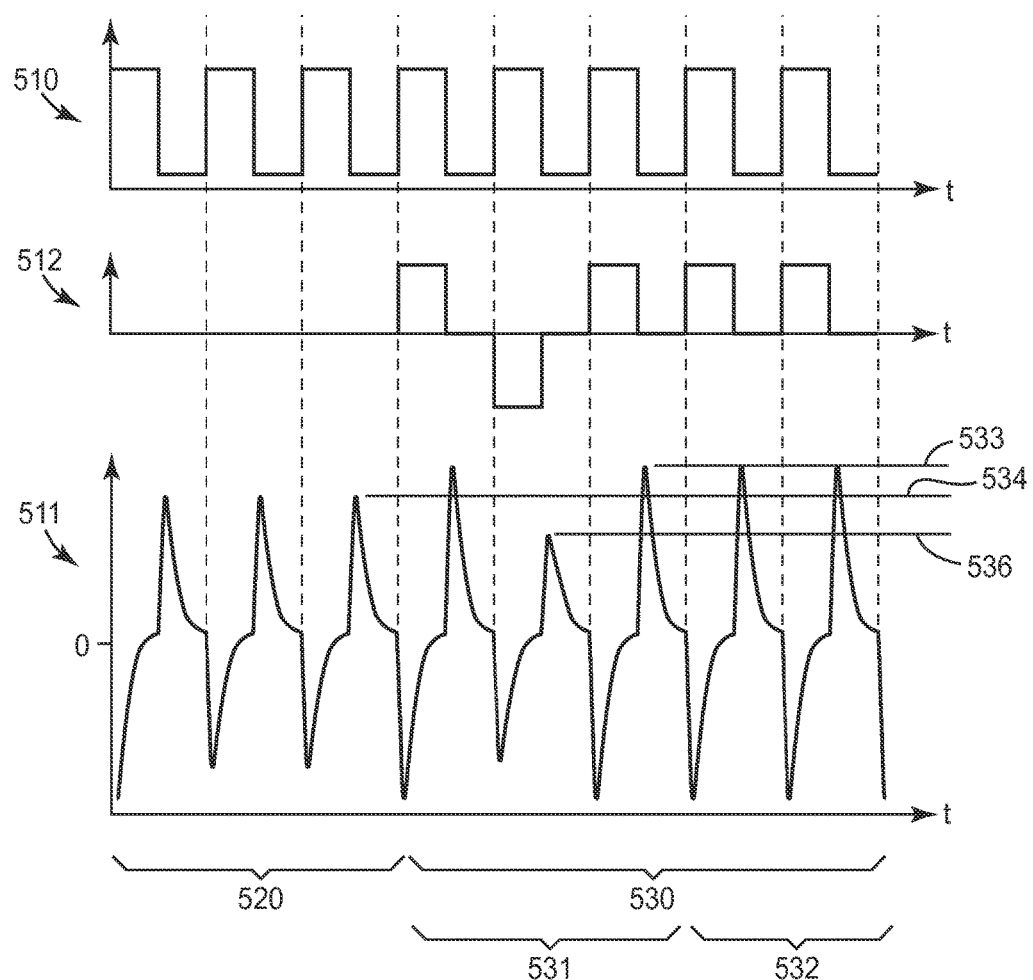
FIGS. 5A and 5B show voltage vs. time graphs of a touch sensor drive signal, a pen drive signal that includes a code identifying the pen, and a response signal affected by the pen drive signal.

FIG. 5A illustrates the approach wherein the code is repeated in the drive signal for each drive electrode that is scanned. FIG. 5A shows a voltage vs. time graph of a touch sensor drive signal 510 and a corresponding voltage vs. time graph of a response signal 511 affected by an active pen that emits a pen drive signal 512 that includes a code identifying the pen. In the no-touch portion 520 of the response signal 511, the response signal 511 has a first amplitude 534 indicative of the absence of a touch. The touch portion 530 of the response signal includes a code portion 531 and a drive portion 532 that are affected by the code portion 513 and a drive portion 514, respectively, of the pen drive signal 512.

In this example, the code portion 531 of the pen drive signal 512, includes a sequence of pulses in a phase additive, phase subtractive, phase additive sequence that can be used to identify the pen. In various embodiments, the encoding can be performed using two or more different pulse amplitudes in the pen drive signal. The pulses that contain the code are not limited to phase additive and phase subtractive pulses. For example the code portion of the pen drive signal could include phase additive pulses of two or more different amplitudes and/or could include phase subtractive pulses of two or more different amplitudes. A code sequence may be generated wherein the pen emits zero amplitude during portion(s) of the code. In some implementations code sequence, e.g. 1011, could be generated using phase subtractive pen drive signal for 1's and zero pen drove signal for 0's. In the illustrated implementation, the pulses in the drive portion 532 of the pen drive signal are phase additive, but phase subtractive pulses in the drive portion could alternatively be employed.

In the code portion 531 of the response signal 511, the response signal 511 includes a three pulse code sequence comprising a first pulse having amplitude 533, a second pulse having amplitude 536, and a third pulse having amplitude 533. A controller of the touch sensor may identify this pattern in the code portion 530 of the response signal 511 as being associated with a specific pen.

In some cases, the drive portion of the pen drive signal includes a sequence of pulses that are phase additive to a drive signal of the touch sensor and the code portion includes at least one pulse that is phase subtractive to the touch sensor drive signal. Alternatively, in some cases, the drive portion includes a sequence of pulses that are phase subtractive to a drive signal of the touch sensor and the code portion includes at least one pulse that is phase additive to the touch sensor drive signal. In some configurations, the drive portion includes a sequence of pulses that are phase subtractive or phase additive to a drive signal of the touch sensor and the code portion includes at least one pulse time period during which the pen neither adds nor subtracts from the touch sensor drive signal.

To identify the pen based on the code, the touch controller can be configured to measure each edge of the response signal and then output these measured signals to multiple decode blocks, each block matched to a particular pen code. The output of each of the decode blocks is a touch signal derived from the measured edges, matched to a particular pen. A decode block for a finger touch (or passive pen) would be matched to all subtractive pulses. For this reason, it is preferable that active pens do not emit codes with more zeros than ones, so the net effect of a single pen code sequence does not have a similar effect to a passive finger touch. In some implementations, it may be useful to use about a 50% additive/subtractive pulse sequence arranged into different codes.

In some implementations, the code sequence is emitted in the pen drive signal over several scan cycles of the drive electrodes. For example, one bit of the code may be emitted per scan cycle. As an example, consider first and second pens used with a touch sensor. The first pen is identified by code 10111 and the second pen is identified by code 10101. During a first scan cycle of the drive electrodes, the pulses of the pen drive signal of the first pen may be phase additive, during a second scan cycle, the pulses of the pen drive signal of the first pen may be phase subtractive, and during the third through the fifth scan cycles, the pulse of the pen drive signal of the first pen would be phase additive. The code sequence is repeated during successive scan cycles.

The pen drive signal of the second pen identified by code 10101 may include a phase additive scan cycle followed by phase subtractive scan cycle, followed by a phase additive scan cycle, followed by a phase subtractive scan cycle, followed by a phase additive scan cycle. In this embodiment, each bit of the code is applied during a complete scan cycle (of all the drive electrodes) of the touch sensor. The technique of applying the code over multiple scan cycles by applying multiple pulses for each scan cycle allows for noise filtering. Using this technique, each pulse of the response signal is integrated and added to the next pulse to provide a sum of all pulses in the response signal to obtain the touch location signal with good signal to noise ratio (SNR). A (noisy) pulse having an amplitude change in the direction opposite from the other (signal) pulses would reduce the final summation, but the SNR could be maintained within a specified level. Alternatively, in the example above, coded 1's may be represented by phase subtractive scans and coded 0's may be represented by applying no signal from the pen.

Figure 5B:
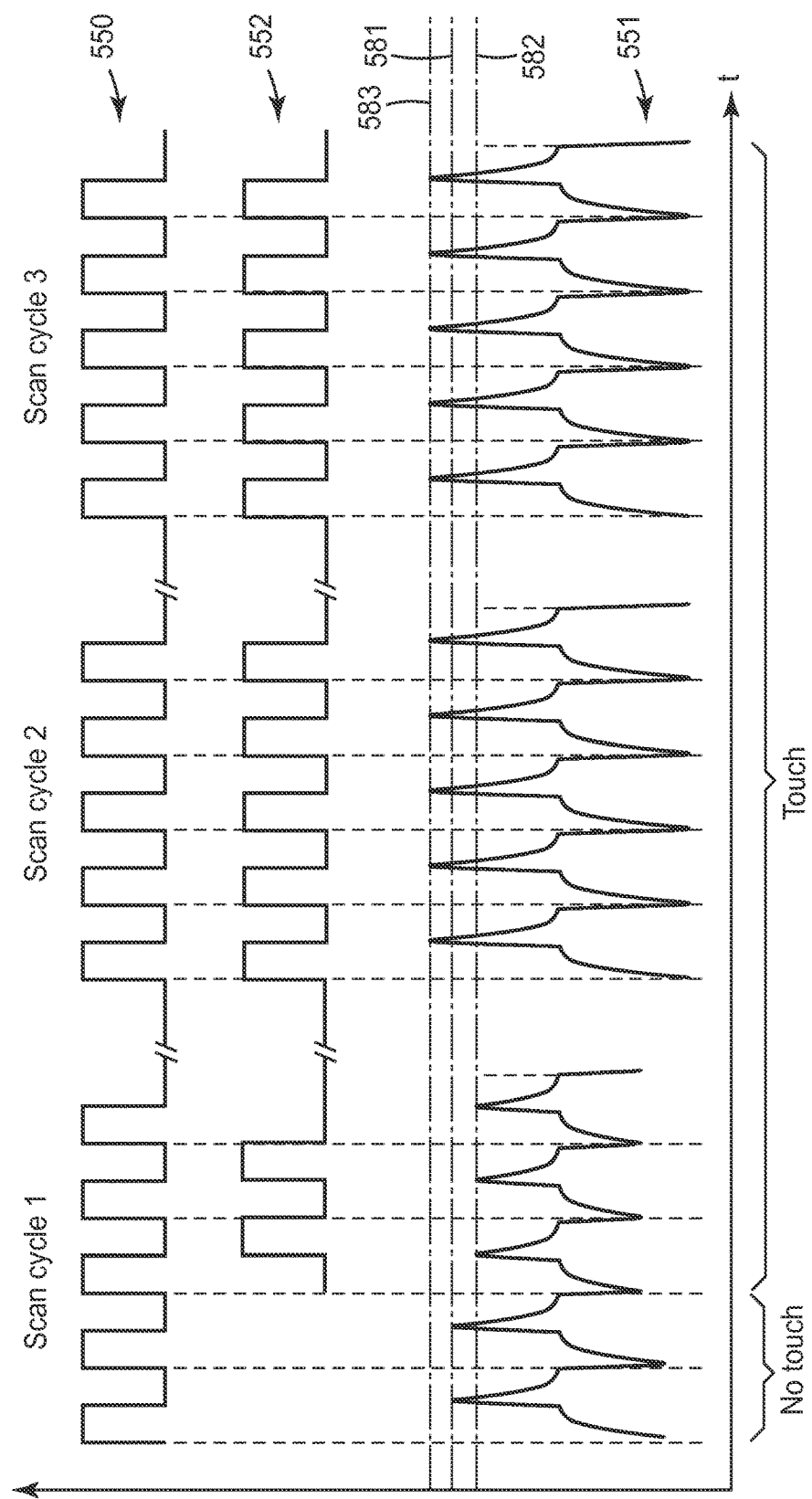

FIG. 5B shows a voltage vs. time graph of a touch sensor drive signal 550 and a corresponding voltage vs. time graph of a response signal 551 affected by a pen drive signal 552 of an active pen. The pen emits a pen drive signal 552 during each scan cycle. The pen drive signal over three scan cycles includes a code 011 identifying the pen, indicated in FIG. 5B as scan cycle 1, scan cycle 2, scan cycle 3. The touch sensor drive signals 550 comprise a waveform of five pulses that would be applied in sequence to each drive electrode during a scan cycle. In the no-touch portion of the response signals 551, the response signal 551 has a first amplitude 581 indicative of the absence of a touch. The touch portion of the response signal 551 includes the code in response to the code of the pen drive signal 552. During scan cycle 1, the pen drive signal 552 is a phase subtractive pulse sequence. In response, the pulses of the response signal 551 during the touch portion of scan cycle 1 has an amplitude 582 that is less than amplitude 581. During scan cycle 2, the pen drive signal 552 is a phase subtractive pulse sequence. In response, the pulses of the response signal 551 during the scan cycle 2 have an amplitude 583 that is greater than amplitude 581. During scan cycle 3, the pen drive signal 552 is a phase subtractive pulse sequence. In response, the pulses of the response signal 551 during the scan cycle 3 have an amplitude 583 that is greater than amplitude 581.

The pen coding implemented as discussed in conjunction with FIG. 5B can be performed using two or more different pulse amplitudes in the pen drive signal. The pulses that contain the code are not limited to phase additive and phase subtractive pulses. For example the code could include phase additive pulses of two or more different amplitudes and/or could include phase subtractive pulses of two or more different amplitudes.

Figure 6:
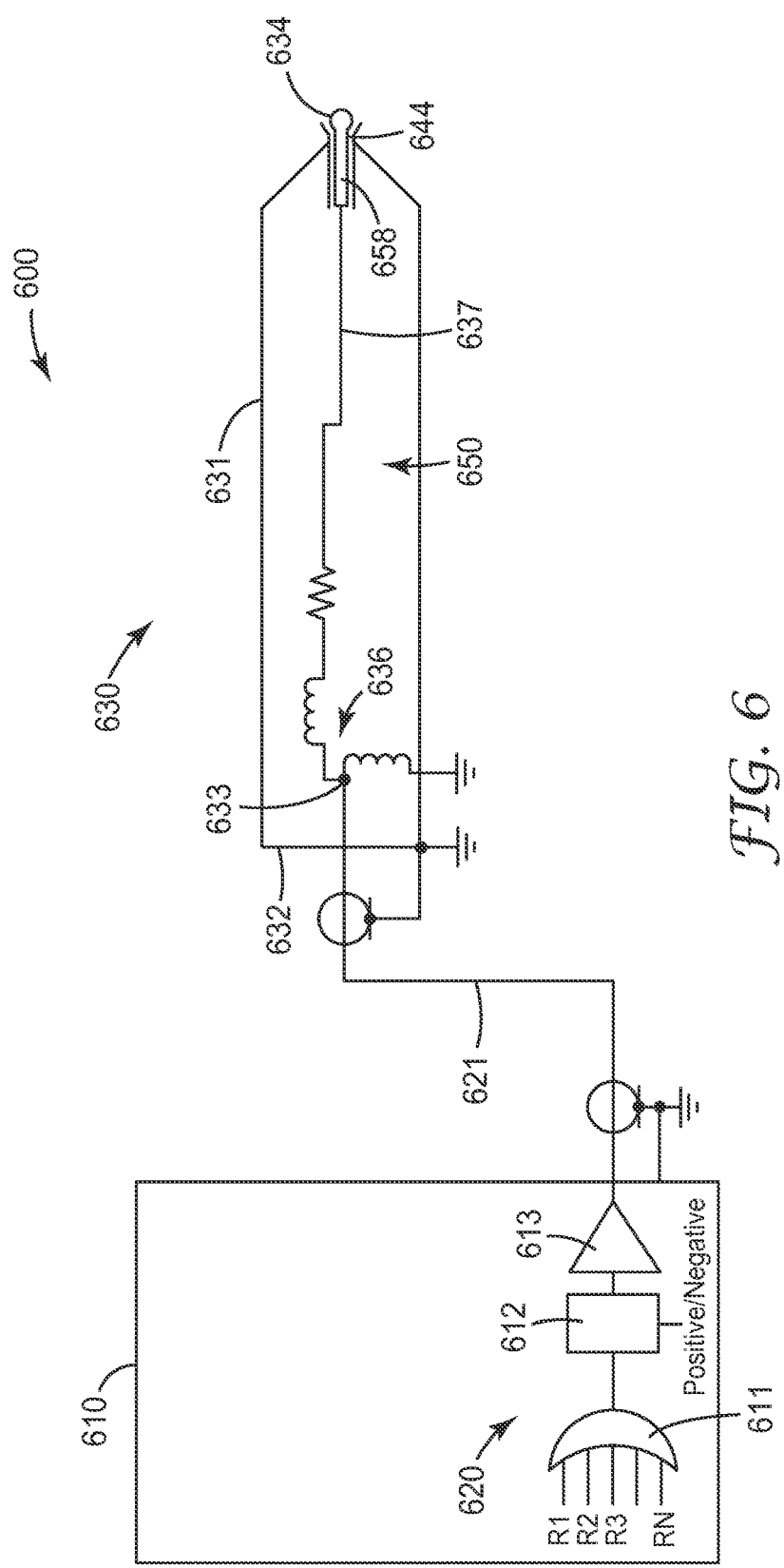
FIG. 6 illustrates a system including an active pen and a touch controller electrically coupled through a wired connection in accordance with some embodiments.

FIG. 6 illustrates a system 600 including an active pen 630 and a touch controller 610 in accordance with some embodiments. The pen 630 includes a pen body 632 and electronic circuitry 650 disposed within the pen body 632. The pen body 632 include a base portion 631 that may be made of metal or other electrically conductive material having a cross sectional shape with a diameter of about 6 mm, for example. The pen body includes a tip 634 that is electrically insulated from the pen body 632. Electrical insulation 644 is disposed between the tip and other portions of the pen body 632. As shown in FIG. 6, electrically conductive portions of the pen body 632 may be grounded to form an electrostatic shield for the tip 634. In some embodiments, an electrostatic shield may be arranged between the tip and other portions of the pen body. The tip 634 is configured to make physical contact with the touch sensing surface. The tip 634 may have a touch contact diameter of about 1.5 to about 2.5 mm, for example.

As shown in FIG. 6, the touch controller 610 of the touch sensor is coupled to the pen 630 by a wire 621, e.g., a single wire shielded cable. The touch controller 610 includes synchronization circuitry 620 configured to generate a synchronization signal that includes information about the frequency and phase of the touch drive signals of the touch controller. As shown in FIG. 6, the synchronization circuitry 620 can include an adder 611 that sums the touch drive signals R1, R2, . . . RN applied to the drive electrodes of the touch sensor. In some cases, a first drive signal applied to a first drive electrode, e.g., R1, includes five pulses, a second drive signal applied to a second drive electrode, e.g., R2 includes another five pulses, continuing to the Nth drive signal applied to the Nth drive electrode. In some cases, drive signals applied to different drive electrodes may have a different number of pulses. Each drive signal may be customized by the touch sensor controller.

Optionally, the touch controller includes an inverting switch 612 that can invert the signal from the adder 611 so that the synchronization signal is either in phase or out of phase with the touch sensor drive signal. The pen drive signal provided by the pen will be either in phase or out of phase with the touch sensor drive signal depending on the phase of the synchronization signal. A positive/negative control line of the inverting switch 612 controls the phase of the synchronization signal and thus controls the phase of the pen drive signal. In some alternative embodiments, an inverting switch may be located in the pen, e.g., disposed within the pen body, rather than in the touch controller. The output from the inverting switch 612 is amplified by amplifier 613 and the synchronization signal is carried to the pen via wire 621. The inverting switch can be used to generate the identification pulse sequence over several row scans.

The pen circuitry 650 receives the synchronization signal via the wire at connection 633, which embodies a simple form of a receiver circuit. The pen circuitry 650 shown in FIG. 6 includes pen drive signal generator circuitry comprising a boost transformer 636 that is configured to boost the synchronization signal received by the touch sensor. The boost amplifier 636 may boost the signal by a factor of about ten, for example. The pen circuitry brings the pen drive signal to the pen tip by conductor 637 and connection 638, which serve as emitter circuitry in this simple case. When the synchronization signal is in phase with the touch sensor drive signals, the pen 630 emits a pen drive signal emitted through the pen tip 634 that has the same frequency and phase as the touch sensor drive signal, but with a larger amplitude.

The boost transformer 636 may cause the amplitude of the pen drive signal to be about ten times greater than the touch sensor drive signal, or on the order of about 100 V peak-to-peak, for example. The amplitude of the pen drive signal may be adjustable. The pen drive signal, e.g., a 100V peak-to-peak signal, has an amplitude (optionally adjustable) that is sufficient to affect the response signal at a node formed by an addressed drive electrode. The pen drive signal is insufficient to affect the response signal at nodes formed by non-addressed drive electrodes at least in part because the non-addressed drive electrodes are grounded by the controller. The touch sensor active drive electrode is driven with the touch sensor drive voltage, for example, 5 to 10 pulses with a 20V-50V positive pulse from ground.

When the pen touches the touch sensing surface at a touch location near a node and the controller drives a drive electrode at the touch location, the touch sensor drive signal and the pen drive signal add together at the receive electrode of the node. A pulse that is out of phase with respect to the phase of the touch sensor drive signal, e.g., 180° out of phase, is phase subtractive and subtracts from the touch sensor drive signal producing a response signal similar to a finger touch. As an example, the amplitude of a touch response signal that is produced by the combined touch sensor drive signal and a phase subtractive pen drive signal may be about 20% less than the amplitude of a response signal that is not registering a touch.

A pulse having the same phase as the phase of the touch sensor drive signal is phase additive and adds to the touch sensor drive signal. The amplitude of a touch response signal that is produced by the combined touch sensor drive signal and a phase additive pen drive signal may be about 20% greater than the amplitude of a response signal that is not registering a touch. In some configurations, the controller is configured to discriminate the response signal produced by a pen having a phase additive pen drive signal and a response signal produced by a finger touch or palm touch based on the amplitude of the response signal. This allows separate processing for pen and finger touches and reduction of palm effects.

In some embodiments, the pen drive signal includes a code that identifies the pen. For example, the pen circuitry 650 may optionally include code circuitry that stores the pen code and inserts the code, e.g., sequence of coded pulses, into the pen drive signal emitted by the pen. In some embodiments, multiple pens used concurrently with the touch sensor can be identified by their respective codes. The insertion of the code into the pen drive over multiple row scans can be timed based on the scan cycle used by the touch sensor controller.

Figure 7:
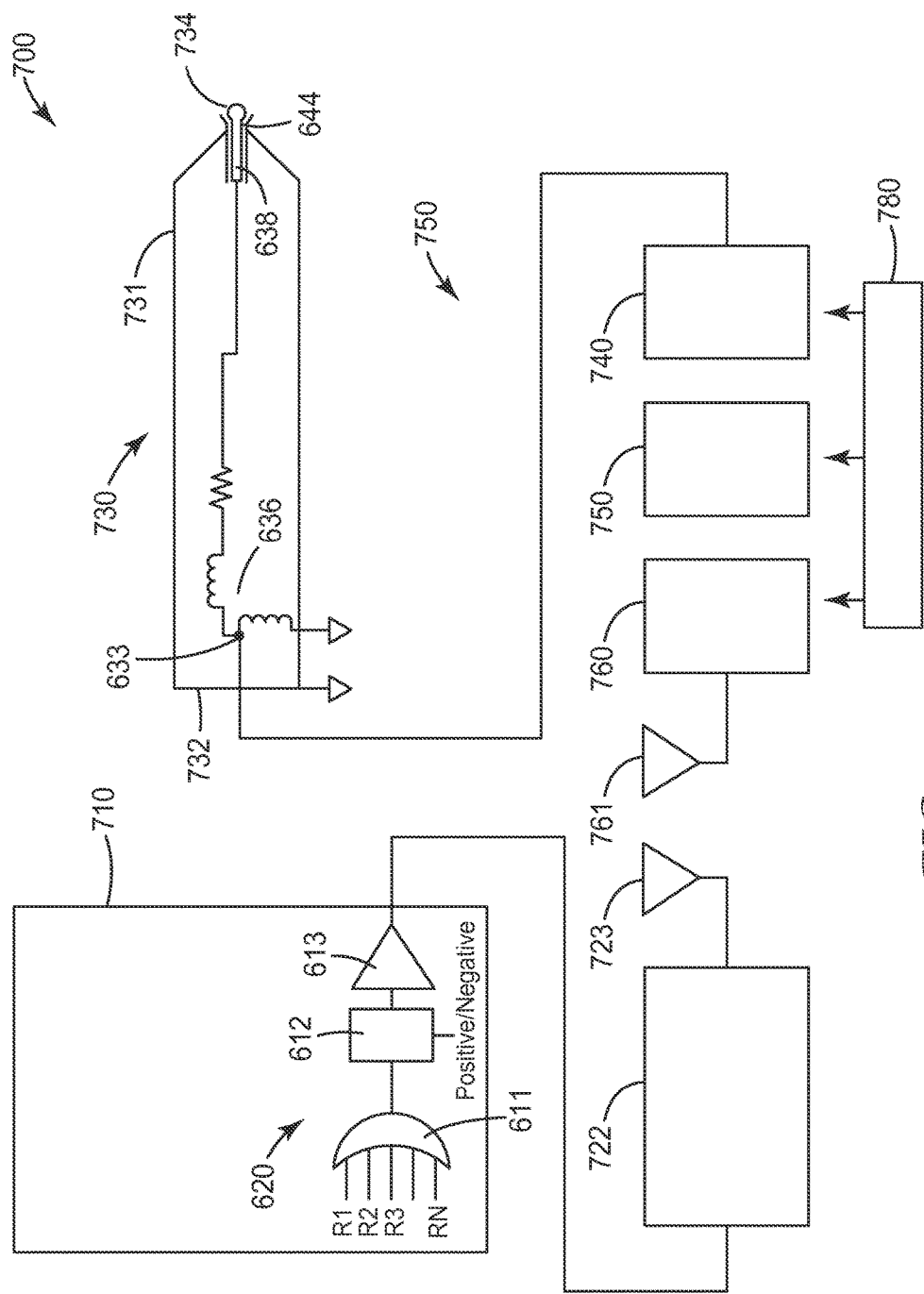
FIG. 7 illustrates a system including an active pen coupled to a touch controller coupled through a wireless connection in accordance that is similar in many respects to the system of FIG. 6.

FIG. 7 illustrates a system 700 that is similar in some respects to the system illustrated in FIG. 6 except that the touch controller circuitry 710 and the pen circuitry include components that provide a wireless connection between the touch sensor controller and pen. FIG. 7 illustrates a system 700 including an active pen 730 and a touch controller 710 in accordance with some embodiments. The pen 730 includes a pen body 732 and electronic circuitry 750 disposed within the pen body 732. The pen body 732 includes a base portion 731 that may be made of metal or other electrically conductive material having a cross sectional shape with a diameter of about 6 mm, for example. The pen body includes a tip 734 that is electrically insulated from the pen body 732. As illustrated in FIG. 7, electrical insulation 744 is disposed between the tip 734 and other portions of the pen body 732. Electrically conductive portions of the pen body may be grounded to form a shield for the tip. In some embodiments, an electrostatic shield may be arranged between the tip and other portions of the pen body. The tip 634 is configured to make physical contact with the touch sensing surface and may have a touch contact diameter of about 1.5 to about 2.5 mm, for example.

In the system 700 shown in FIG. 7 the touch sensor controller 710 and the active pen 730 are coupled via a wireless connection that carries the synchronization signal to the pen receiver 760. The touch sensor controller includes a modulator 722 that modulates a carrier signal with the touch drive signal producing a modulated radio frequency (RF) synchronization signal. The synchronization signal is transmitted through antenna 723 to the pen 730.

The pen includes a pen body 732 that includes a pen tip 734 and a base portion 731. Pen circuitry 750 is disposed at least partially within the pen body 732 which at least partially encloses the pen circuitry 750. The RF signal transmitted by the touch controller is received in the receiver circuitry of the pen 730 comprising an antenna 761 and RF receiver 760. The pen circuitry 750 includes a demodulator 770 coupled to the receiver 760 and configured to demodulate the RF signal and to extract the demodulated synchronization signal. The pen circuitry 750 may include a buffer amplifier 740 and/or other signal processing circuitry, e.g., filters, to condition the demodulated synchronization signal received from the touch sensor controller 710. As previously discussed, the pen circuitry 750 can include a boost transformer 736 that boosts the signal, e.g., by a factor of about 10, for example.

The pen 730 provides a pen drive signal based on the received synchronization signal. As previously discussed, the pen drive signal may be a phase additive signal, having the same frequency and phase as the touch sensor drive signal but with a larger amplitude. The pen drive signal may be emitted through the pen tip 734 to the touch sensor.

In some embodiments, the pen drive signal includes a code that identifies the pen. For example, the pen circuitry 750 may include code circuitry that stores the pen code and inserts the code, e.g., sequence of coded pulses, into the pen drive signal emitted by the pen over multiple row drive cycles. In some embodiments, multiple pens used concurrently with the touch sensor can be identified by their respective codes. The insertion of the code into the pen drive signal can be timed based on the scan cycle used by the touch sensor controller.

The pen 730 includes a power supply 780 configured to supply power to the pen circuitry. The power supply includes an energy storage device, e.g., battery or supercapacitor, and may include power conditioning circuitry, e.g., voltage regulators, capacitors, etc. In some cases, the pen 730 may include a force and/or slide switch that provides power to the pen by connecting the power to the pen circuitry 750 when the pen tip 734 is pushed with a force greater than a threshold force.

Figure 8:
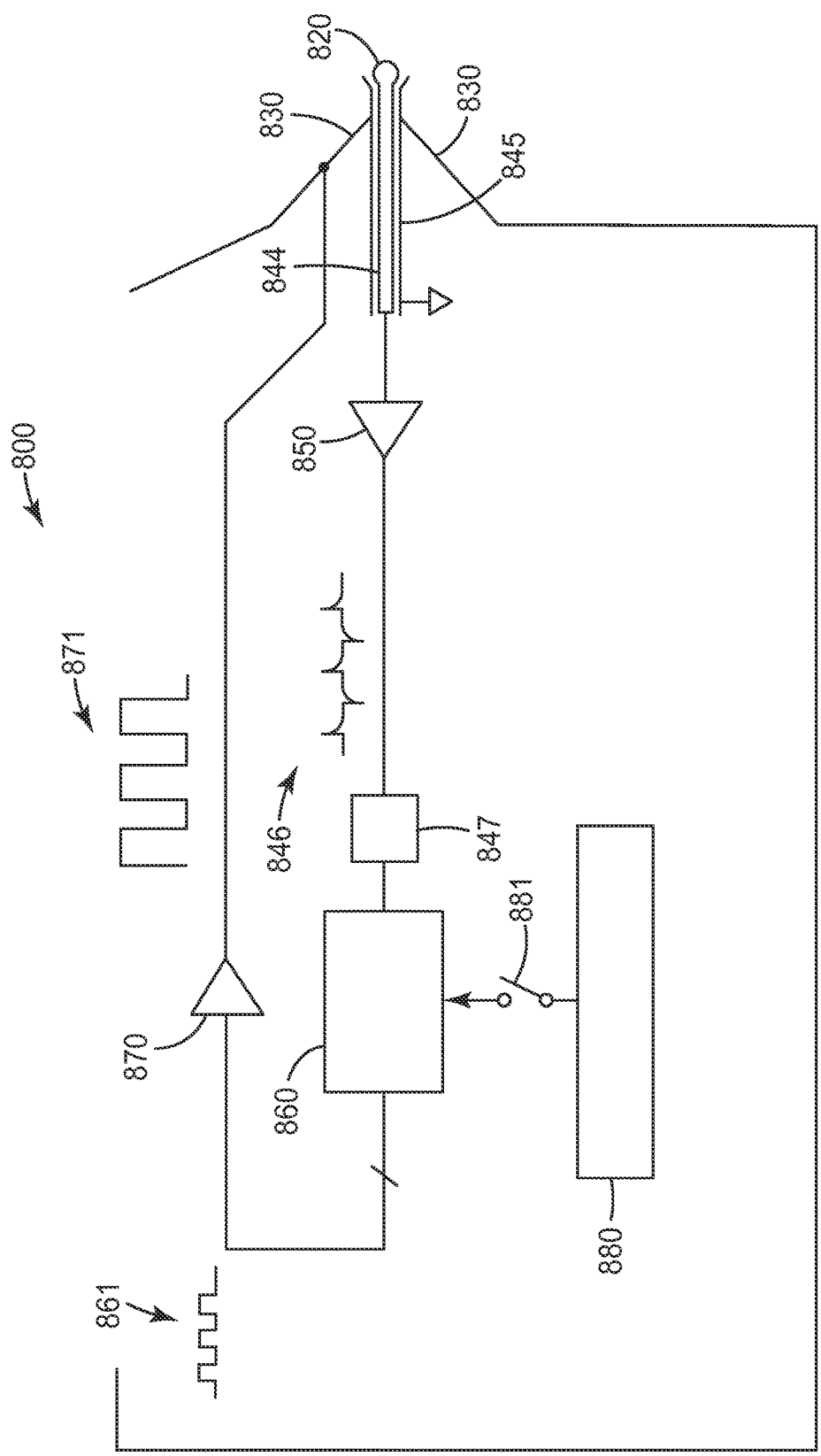
FIGS. 8 and 9 illustrate untethered pens configured to sense touch sensor drive signals applied to drive electrodes and to generate a pen drive signal based on the received touch sensor drive signals.

FIG. 8 illustrates a pen 800 configured for use with a touch controller. The pen 800 is capable of sensing touch sensor drive signals as they are applied to the touch drive electrodes. The sensed touch drive signals form the synchronization signal for the pen.

As previously discussed, in some embodiments, the pen body includes a receiver portion configured to receive the synchronization signals and an emitter portion configured to emit the pen drive signal. In the embodiment illustrated by FIG. 8, the receiver portion of the pen body includes the pen tip 820 that picks up the sensed drive signals present on the drive electrodes when the pen tip touches or comes in close proximity to the touch sensing surface. The emitter portion of the pen body comprises the pen cone 830. The pen tip 820 is insulated from the pen cone 830 by electrical insulation material 844 disposed between the tip and the cone and can be electrostatically shielded by a sleeve 845 that isolates the pen tip 820 from cone 830 and and/or other pen components. Sleeve 845 may be connected to a local ground in pen 800 or it may be driven with a signal that reduces cross-coupling of signals from cone 830 to tip 820.

The pen receiver circuitry may include an amplifier 850 coupled to the pen tip 820. When the pen tip is capacitively coupled to the touch sensor, the output of the amplifier 850 includes positive and negative excursions of sensed drive signal 846 corresponding to the rising and falling edges of the touch drive signal. The pen tip 820 may also pick up noise, e.g., from the drive signals and/or power supply of a liquid crystal display (LCD). Thus, the receive circuitry may also include one or more filters 847 configured to reject noise from sensed drive signal 846.

The pen 800 includes pen drive signal generator circuitry 860 configured to generate a pen drive signal, e.g., a square wave, based on the positive and negative pulses 846, the pen drive signal having the fundamental frequency of the touch sensor drive signal.

In some cases, the signal generator comprises an analog or digital phase lock loop and the output of the amplifier receiver is coupled to the phase lock loop which generates a low level pen drive signal 861. If the phase lock loop is digital, it may be controlled by a microcontroller. The phase lock loop generates the pen drive signal 861 by converting an output 846 of the pen receive circuitry to a signal 861 having the frequency and phase of the touch sensor drive signal.

In some implementations, the touch drive signal is a sequence of about five to ten pulses for each drive electrode. The touch controller scans through the drive electrodes by applying pulse sequence of the drive signal to each drive electrode in a pattern with a scan time interval between the pulse sequences applied to different drive electrodes and a refresh interval between successive scans.

A digital phase lock loop can count the time between edges of the differentiated positive and negative pulses 846 output by the receive circuitry (illustrated as op amp 850 and filter 847 in FIG. 8) and create a timing diagram for the touch sensor. The clock of the phase lock loop is synchronized to the touch controller refresh interval between successive scans of the drive electrodes. The pen senses movement of the pen on the touch sensing surface and generates the pen drive signal based on the touch sensor drive signal present in the local pen touch area. The pen circuitry emulates the timing of the touch sensor scanning circuitry and the phase lock loop reproduces the scan timing of the touch sensor. Using this technique, the pen circuitry can anticipate when a drive signal will scan by the touch location.

In some embodiments, if the pen 800 touches the touch sensing surface in between the location of two adjacent drive electrodes, the pen tip will sense the drive signals on both the adjacent drive electrodes. The pen generates and emits pen drive signals that are based on each of the drive signals present on the adjacent electrodes. Thus, response signals at the receive electrodes that form the nearest intersection nodes with the drive electrodes can be used by the touch controller to interpolate the touch location when the touch sensing surface is touched between drive electrodes.

The low level pen drive signal 861 generated by the signal generator 860 (or other pen drive generator circuitry) may be input to a buffer amplifier 870 that increases the amplitude of pen drive signal, e.g., to about 25 to 100 volts peak-to-peak. The pen 800 emits the amplified pen drive signal 871 through the emitter portion 830 of the pen body, which comprises the cone in the embodiment of FIG. 8. Depending on the phase of the pen drive signal 871 with respect to the phase of the touch drive signal, the pen drive signal may capacitively couple to a receive electrode of the touch sensor in a phase additive mode or a phase subtractive mode as previously discussed.

In some embodiments, the pen drive signal includes a code that identifies the pen. For example, the pen circuitry may include code circuitry that stores the pen code and inserts the code, e.g., the code may be a sequence of coded pulse trains corresponding to a sequence of touch sensor drive signals, into the pen drive signal emitted by the pen. In some embodiments, multiple pens used concurrently with the touch sensor can be identified by their respective codes. The insertion of the code into the pen drive signal can be timed based on the scan cycle used by the touch sensor controller to drive the touch sensor drive electrodes.

The pen 800 includes a power supply 880 configured to supply power to the pen circuitry. The power supply includes an energy storage device, e.g., battery or supercapacitor, may include power conditioning circuitry, e.g., voltage regulators, capacitors, etc. In some cases, the pen 800 may include a force and/or slide switch 881 that connects power supply to the pen circuitry when the pen tip 820 is pushed with a force greater than a threshold force.

Figure 9:
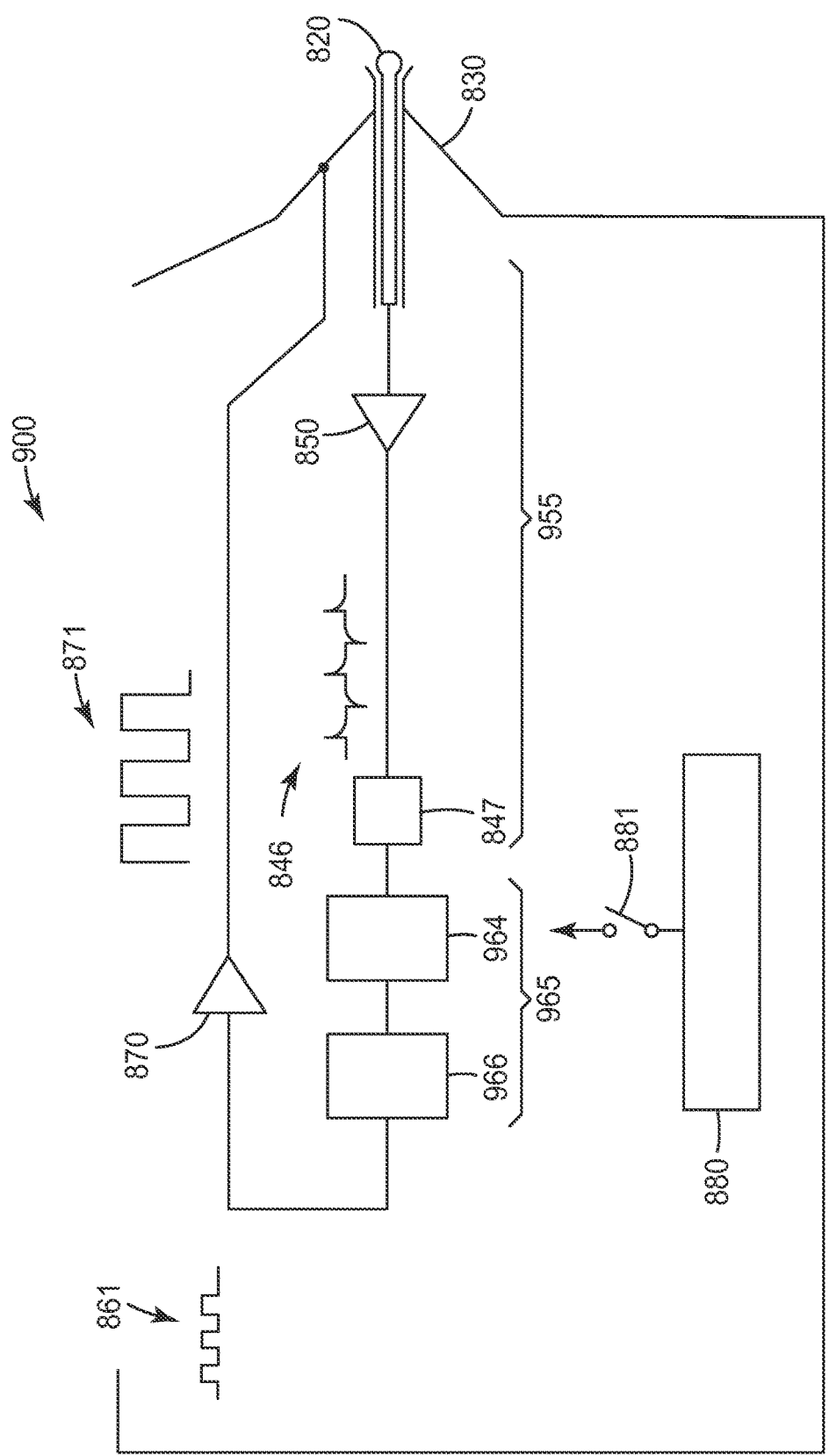

FIG. 9 illustrates a pen 900 that is similar in many respects with the pen 800 of FIG. 8. Signal conditioner 961 Signal generator 966 comprises a circuit that generates signal 861 that may be in phase with pulses 846 or out of phase with pulses 846, depending on the code that is stored in pen 900. Signal generator 966 may also modulate the amplitude of signal 861 to indicate a code. In the simplest case, signal 861 may be held to zero to indicate a code state. Signal conditioner 964 operates on signal 846. In one embodiment, conditioner 964 may be a comparator that triggers on the positive and negative edges of the received signal 846 and defines the positive and negative transitions of the pen drive signal 871. For example, the comparator component 1464 may be fast with less than 1 μsec delay. The comparator output may be input to a signal generator 966 that regenerates the low level square wave pen drive signal 861.

In another embodiment, signal conditioner 964 may comprise a comparator and also a sampling circuit that samples the magnitude of signals 846. The comparator defines the positive and negative edges of pen drive signal 871 as described above, and signal generator 966 may control the amplitude of signal 871 so it is proportional to the sampled magnitudes of pulses 846. Thus, signal generator 966 may output signals that are proportional to signals 846, and also modified to be phase additive or phase subtractive with respect to signals 846. Signal 861 is amplified by amplifier 870 and applied to cone 830. Filter 847 may include a switch that momentarily blocks pulses 846 when signal generator 860 generates signals 861 and 871 that are in phase with pulses 846. This prevents positive feedback from cone 830 to tip 820.

The pen drive signal generator circuitry 965 shown in FIG. 9 includes a signal conditioner 964 and pulse generator 966 in place of the phase lock loop described in connection with FIG. 8.

Embodiments using a phase lock loop and a signal conditioner/pulse generator as a signal generator for the pen drive signal are described in conjunction with FIGS. 8 and 9, respectively. It will be appreciated that any circuitry capable of generating a signal having a fundamental frequency of the touch sensor drive signal based on a received synchronization signal can be used as the signal generator for the pen. The signal conditioner 964 operates on the signal from the receive circuitry 955 of the pen 900. As shown in FIG. 9, the receive circuitry 955 includes filters 847 configured to attenuate noise in the signal received from the touch sensor.

As previously discussed, the low level pen drive signal 861 is amplified by a buffer amplifier 870 and the amplified signal 871 is emitted through the pen cone 830. Particularly in embodiments in which the pen circuitry includes more sophisticated electronics such as a micro controller, the pen may include additional features such as a Bluetooth interface and/or may include an accelerometer that can be used to detect an orientation of the pen.

FIG. 10A illustrates an active pen 1000 wherein the first end of the pen can operate in active mode and an opposing end of the pen can operate in passive mode. In some embodiments, one or both ends of the pen can be switched between active and passive modes. As shown in FIG. 10A, in some embodiments, one end of the pen includes a finer writing tip with a smaller cross sectional area than the other end. In various implementations, the finer tip may have a cross sectional diameter of about 1.2 mm+/−0.5 mm whereas the thicker tip may have a cross sectional diameter of about 5 mm+/−2 mm. The pen body of the pen 1000 includes a barrel 1002 that provides a gripping portion for the user to manipulate the pen relative to the touch sensor. The barrel is electrically connected to the user when the user grips the pen. A first end 1001 of the pen is disposed proximate to a one edge the barrel 1002 and the second end 1003 of the pen is disposed at the opposite barrel edge. The first end 1001 of the pen 1000 includes first pen tip 1001a configured to make contact with the touch sensor to provide a touch input. The second end 1003 of the pen 1000 includes a second pen tip 1003a configured to make contact with the touch sensor to provide a touch input.

When an end 1001, 1003 is switched to active mode, the end 1001, 1003 emits a pen drive signal. In embodiments wherein both the first and second pen ends 1001, 1003 can be operated in active mode, the first and second pen ends 1001, 1003 include first and second electrically conductive emitter portions respectively. Each emitter portion is configured to emit a pen drive signal when the end is switched to active mode. In some embodiments, the first end is an active-only end and the second end can be switched between active and passive modes.

In some embodiments, when operating in active mode, the pen end 1001, 1003, may sense touch sensor drive signals from the touch sensor drive electrodes as previously discussed. In these embodiments, the pen end 1001, 1003 may also include an electrically conductive receiver portion that is electrically insulated and electrostatically shielded from the emitter portion. In some embodiments, the pen tip 1001*a*, 1003*a* includes the emitter portion for the pen end 1001, 1003 and the cone or transition region 1001*b*, 1003*b* includes the receiver portion. In some embodiments, the pen tip 1001*a*, 1003*a* includes the receiver portion for the pen end 1001, 1003 and the cone or transition region 1001*b*, 1003*b* includes the emitter portion.

Pen circuitry 1010 that provides the pen drive signal for active pen operation is disposed at least partially within the pen body. The circuitry 1010 may include one or more switches 1011 (or other manual input devices) having actuators that extend external to the pen body so that the switches can be operated by a user. The switches 1011 may be used to switch the first and second ends 1001, 1003 between active and passive mode, for example, and/or to change functionality of one or both pen ends 1001, 1003.

If a switch 1011 is used to switch a pen end 1001, 1003 from active to passive mode, the pen end 1001, 1003 emits the pen drive signal if the switch 1011 is in a first state and ceases to emit the pen drive signal if the switch 1011 is in a second state. When either end 1001, 1003 of the pen is operating in active mode, then the emitter and/or receiver portions of the pen body may be electrically insulated from the gripping portion to prevent the a signal injected by the user's grip from adding noise to the received or emitted signals. When an end 1001, 1003 of the pen is operating in passive mode, the emitter and/or receiver portions of the pen body may be electrically connected to the gripping portion so that the user's capacitance is coupled to the touch panel. When operating in passive mode, the pen end 1001, 1003 interacts with the touch sensor similar to a finger touch. The pen body also provides a path back to system ground through the user contact.

In some embodiments, the first end 1001 of the pen having a finer tip is used for writing and drawing, whereas the second end of the pen 1003 is used for other functions, such as highlighting, erasing, etc. As previously discussed, the pen drive signal emitted from the first and/or second ends 1001, 1003 may include a code. The code may provide identification for the pen 1000 and/or the pen end 1001, 1003. Each end 1001, 1003 of the pen may emit a code that is different from the code emitted by the other end. In some embodiments, the function of the pen end 1001, 1003, such as erase, highlight, fine tip, coarse tip, etc., may be set using software of the touch sensor. For example in some implementations, the function of a pen end 1001, 1003 may be set in response to the pen end 1001, 1003 touching a specific region on the touch panel.

In some embodiments, the code included in the pen drive signal for a pen end 1001, 1003 may indicate a function for the pen end 1001, 1003. In these embodiments, the user may select the function for the pen end 1001, 1003 using the switches 1011. The code for the selected function can be included in the pen drive signal emitted at the pen end 1001, 1003. In some embodiments, the code may include both an identification code and a function code. In some embodiments, the code emitted may be a wildcard identification code or a movement code as discussed below.

Figure 10B:
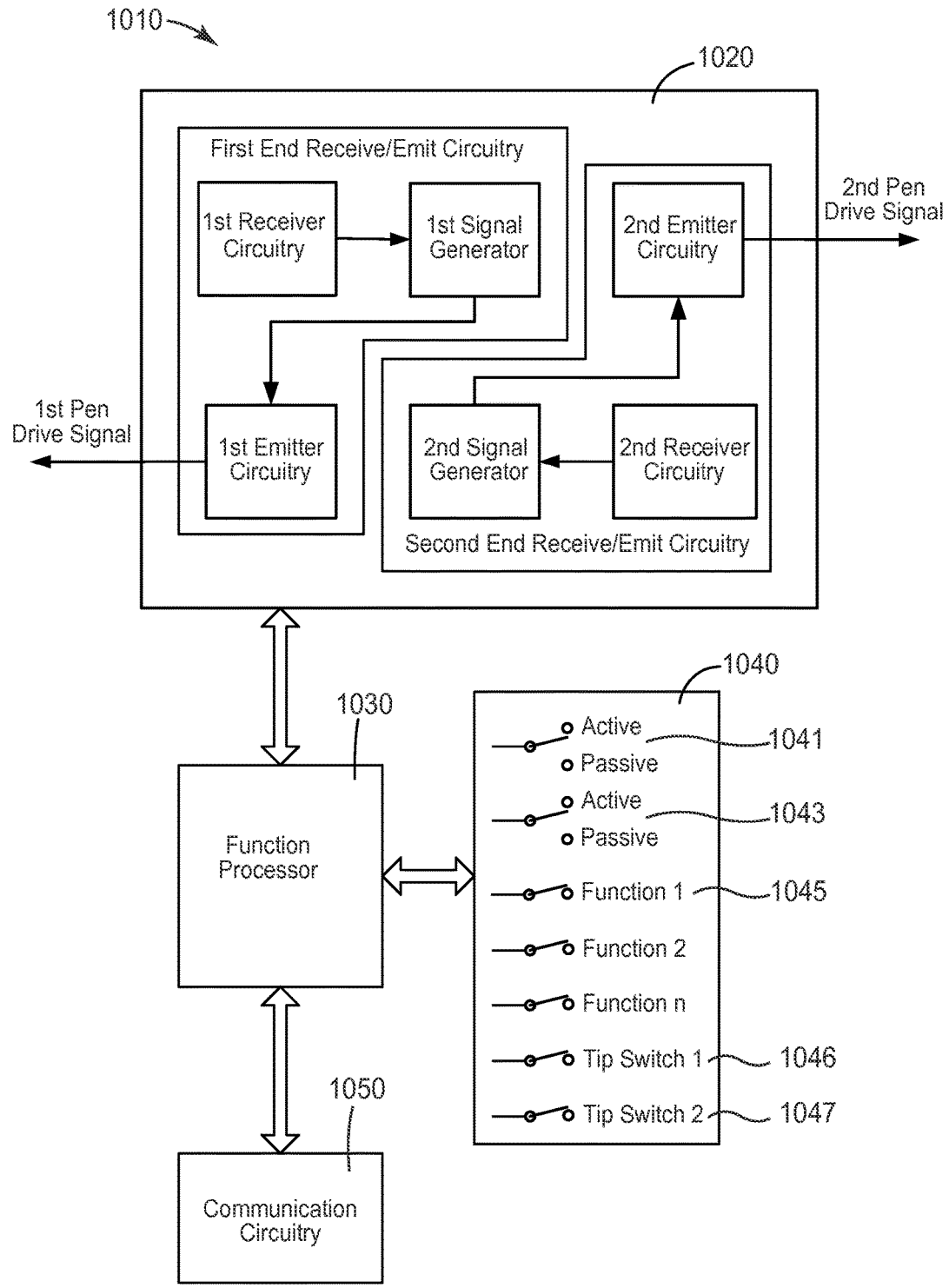
FIG. 10B is a block diagram of pen circuitry for the pen of FIG. 10A.

FIG. 10B is a more detailed depiction of the pen circuitry 1010 according to some embodiments. In the illustrated example, the pen circuitry 1010 includes pen end emitter/receiver circuitry 1020 for the first and second pen ends. The pen end emitter/receiver circuitry 1020 provides pen drive signal when the pen end is operating in active mode. The first pen end emitter/receiver circuitry can include first receiver circuitry coupled to an electrically conductive first receiver portion of the pen body. The first receiver portion picks up touch sensor drive signals present on the drive electrodes of the touch sensor. In other embodiments, the first receiver circuitry may receive a synchronization signal from the touch sensor through a wired or wireless communication connection as previously discussed. The first receiver circuitry provides the received touch sensor drive signal (or other synchronization signal) to first end signal generator circuitry. The first end signal generator circuitry generates a first end pen drive signal based on the received touch sensor drive signal or other synchronization signal. The first pen drive signal is emitted from the first emitter portion of the pen.

In some embodiments, the second pen end emitter/receiver circuitry may include second receiver circuitry coupled to an electrically conductive second receiver portion of the pen body. The electrically conductive second receiver portion receives touch sensor drive signals present on the drive electrodes of the touch sensor when the pen end touches or is proximate to the touch sensor panel. In other embodiments, the second receiver circuitry may receive a synchronization signal from the touch sensor through a wired or wireless communication connection. Note that when the pen receives a synchronization signal from the touch sensor through a communication connection, the same receiver circuitry may be used for both pen ends. The second receiver circuitry provides the received touch sensor drive signal or other synchronization signal to second end signal generator circuitry. The second end signal generator circuitry generates a second pen drive signal based on the received touch sensor drive signal or other synchronization signal. The second pen drive signal is emitted from the second emitter portion of the pen.

The pen circuitry 1010 can include on or more switches 1040. Some switches 1041, 1043 can be used to switch the mode of a pen end from active to passive. Other switches 1045 can select a function for a pen end. Some switches 1046, 1047 may be on/off switches to activate/deactivate the pen or a pen end. In some embodiments, the on/off switches may be pressure sensitive tip switches configured to activate the pen or pen end when a force applied to a tip of the pen is greater than a threshold force. The pen circuitry may be activated by being connected to a power source when the force on at least one of the pressure sensitive tip switches is above a threshold level. The pen may be deactivated by being disconnected from the power source when the force on both of the pressure sensitive tip switches is less than a threshold level.

The pen circuitry can optionally include a function processor 1030 coupled to the emitter/receiver circuitry 1020 and configured to control the emitter/receiver circuitry 1020 based on the state of the switches 1040 and/or information communicated from the touch sensor or other external source.

The pen circuitry 1010 optionally includes communication circuitry 1050 configured to establish a communication connection with the touch sensor via a wired or wireless connection. As discussed above, in some embodiments, the pen circuitry 1010 receives a synchronization signal from the touch sensor via the communication connection and the synchronization signal is used to generate the pen drive signal. The communication connection may be used for other purposes, as well. For example, the pen may transmit or receive the function of a pen end to the touch sensor and/or may transmit or receive a pen code or pen end code via a wireless communication connection.

Figure 11:
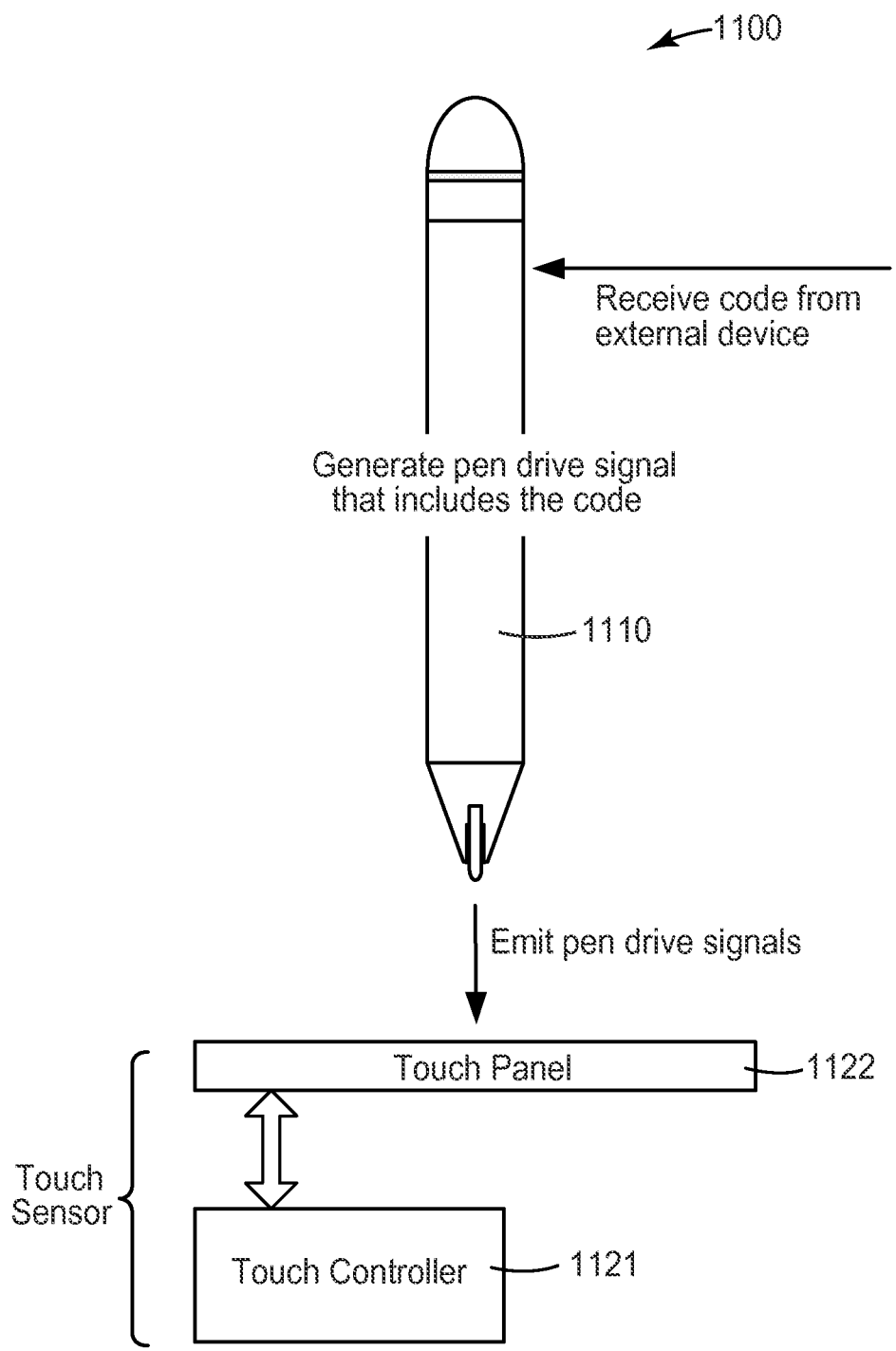
FIG. 11 conceptually illustrates operation of a touch system in accordance with some embodiments.

In some embodiments, the pen 1110 receives a code, e.g., a pen identification code, from the touch sensor controller 1121 or other external device (e.g., a central processor (Host)) and generates a pen drive signal that includes the code, as conceptually illustrated by the touch system 1100 of FIG. 11. The pen 1100 emits a pen drive signal that capacitively couple to the receive electrodes of the touch panel 1122 and affect the response signals carried on the receive electrodes. The touch controller 1121 receives the code through the receive electrodes of the touch panel 1122. The controller 1121 can identify the pen 1100 based on the code and may transmit a touch location and/or the pen identification information to a central processor.

As previously discussed, the pen includes a pen body having an electrically conductive emitter portion. Pen circuitry disposed within the pen body may include communication circuitry configured to provide a communication connection between the pen and one or more external devices. The connection may be a wired or wireless connection, such as an RF connection implementing a Bluetooth® protocol. The pen receives the code which is transmitted by the external device through the communication connection. In some implementations, the external device may be the touch controller 1121. In some implementations, multiple pens and multiple touch sensors are communicatively coupled to a central processor and the central processor transmits pen codes to the pens and to the touch controllers of the touch sensors.

As discussed herein, the pen body may include an electrically conductive receiver portion that is electrically insulated and electrostatically shielded from the emitter portion. Circuitry in the pen includes receiver circuitry that receives touch sensor drive signals from drive electrodes of the touch sensor. The pen drive circuitry generates pen drive signals that include the code based on the sensed drive signals received from the drive electrodes. The pen drive circuitry can be configured to receive and re-transmit the code in real time. For example, the pen drive circuitry may simultaneously receive the drive signal, modulate it with the code and transmit the pen drive signal that includes the code.

The pen drive signal that includes the code may include pulses that are inverted with respect to the received touch sensor drive signals. The pulses that are inverted with respect to the touch sensor drive signals are phase subtractive with the touch sensor drive signals. A blank or no pulse signal may be used that is neither phase additive nor phase subtractive with the received touch sensor drive signals.

In some embodiments, the pen drive circuitry is configured to generate a pen drive signal that include the code based on the received touch sensor drive signals by phase modulating the received touch sensor drive signals. The pen drive signal that includes the code may include pulses that are out of phase with respect to the received touch sensor drive signals. For example, one or more of the pulses may be 0 degrees out of phase, and/or one of more of the pulses may be 180 degrees out of phase, and/or one of more of the pulses may be +90 degrees out of phase, and/or one of more of the pulses may be −90 degrees out of phase. The touch sensor controller 1121 can include a phase sensitive demodulator, e.g., a quadrature demodulator, to receive and demodulate the response signals present on the receive electrodes to extract the code. Where phase modulation over multiple phases is used to represent the code, the pen drive signal can convey multiple bits of the code in one scan cycle. For example, if a pen drive signal is modulated with four phases, 0, 180, +90, −90 as discussed above, a two bit code symbol could be generated per pulse.

In some embodiments, the pen drive circuitry is configured to generate the pen drive signal that includes the code by amplitude modulating the received touch sensor drive signals. In these embodiments, the amount of code information conveyed in the pen drive signal is a function of the resolution of the analog to digital converter (ADC) in the touch controller used to detect the response signals and to calculate the XY touch position by interpolation.

In some embodiments, the pen drive circuitry is configured to generate the pen drive signal that includes the code by quantizing the sensed drive signals. (e.g. the output is a fixed high level if the sensed drive signal is below a threshold and a fixed low level if the sensed drive signal is above a threshold, or zero (null, with no pen drive signal) if the stylus exceeds a threshold.

Modulation methods including phase modulation, amplitude modulation, quantizing, and/or others may be used individually or in combination to generate symbols that may be measured and discriminated by demodulator circuitry in the sensor. A symbol may be a simple binary modulation that can be demodulated into two unique states, or a more complex symbol may be demodulated into four, eight, or more unique states. These states may be used individually or in sequence to convey information from the pen to the sensor. For example, a symbol with two possible states may convey the status of a switch in the pen. A pen identification code may comprise a sequence of four digits separated in time, where each digit has a symbol comprising four states, for a total of 256 possible code combinations. In another example, a single symbol unique from all of those used for coding digits, may be used to indicate the beginning or end of a code sequence. This would serve a purpose similar to the start bit and stop bits in RS232 asynchronous communication.

The communication connection may be used to convey information from the pen to the external device, or to convey information in addition to the code from the external device to the pen. For example, in some embodiments, the pen circuitry may convey information obtained from sensors, switches and/or stored in software registers of the pen to the external device. For example, the pen may include accelerometer arranged to indicate pen tilt and/or pen movement; a voltage sensor configured to indicate battery level; a pressure sensitive tip switch, a pen barrel switch, or software flags/registers that store information including whether a sensed touch sensor drive signal is detected, a globally unique pen identifier, etc. Information from these components can be conveyed from the pen to the external device via the communication connection. For example, the pen may convey one or more of pen tilt angle, pen barrel switch state, pen tip switch state, battery level, a globally unique identifier, drive signal locked—meaning that the pen has sensed the touch sensor drive signal and is, or very recently was, actively generating the pen drive signal, and received touch sensor drive signal magnitude.

In some embodiments, the pen can receive information and/or commands from the external device, e.g., touch sensor, via the communication connection. For example, the touch sensor (or other external device) may convey to the pen, the number of the touch sensor drive signal burst pulses, the touch sensor drive signal frequency, a command to enable or disable the pen drive signal, a command to enable or disable tip switch gating of the pen drive signal, the pen drive signal level, an identifier for the wireless connection between the pen and the external device and/or other information or commands.

In some embodiments, before the communication connection is established, the pen circuitry generates and emits a pen drive signal that does not include the code. In some embodiments, the pen circuitry emits a pen drive signal only after the communication connection between the external device and the pen is established and the pen code is received. In some embodiments, the pen circuitry includes a pressure sensitive tip switch and the pen circuitry emits the pen drive signal only after the pressure sensitive tip switch is activated. The touch controller may suppress finger contact output to the host processor if pen contact is detected.

Figure 12:
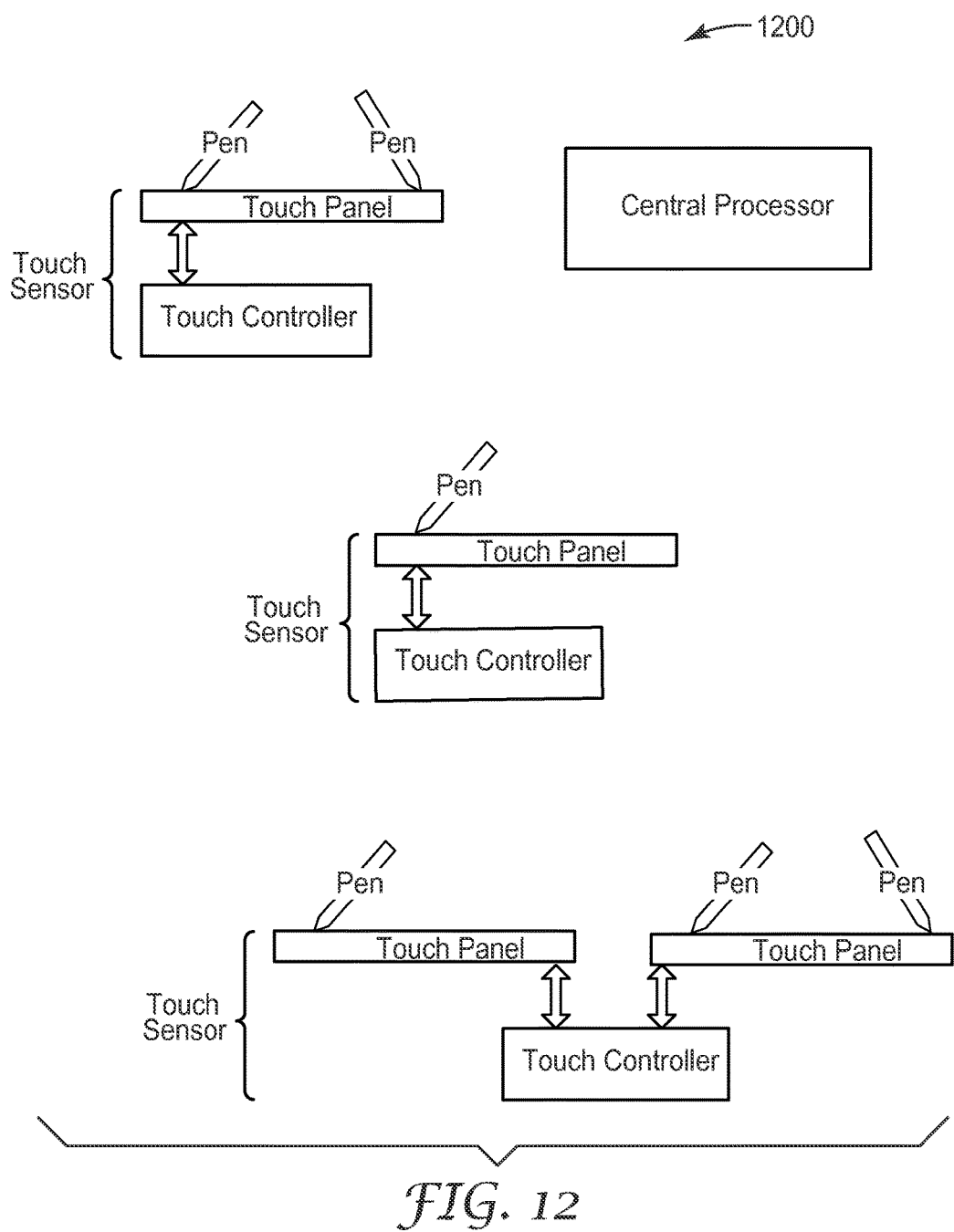
FIG. 12 is a block diagram of a touch system that includes multiple touch sensors, multiple pens, and optionally includes a central processor.

FIG. 12 is a block diagram of a touch system 1200 according to some embodiments. The touch system includes multiple touch sensors, each touch sensor comprising one or more touch panels and at least one touch controller. Each touch sensor can interact with one or more pens. Optionally, the system includes a central processor that can be communicatively connected to each of the touch controllers and/or each of the pens. The central processor may transmit identification codes to one or more of the pens (a unique code to each pen) and in turn the pens may transmit their pen identification codes back through the touch controller.

Some embodiments are directed to touch systems comprising a pen that generates pen drive signal that includes a repeating multi-digit code sequence. The pen emits a pen drive signal that includes the multi-digit code through an electrically conductive emitter portion of the pen body. The multi-digit code sequence is picked up by the touch sensor on the touch sensor receive electrodes. In some embodiments the touch sensor includes a controller having communication circuitry that sends a coordination message to the pen. Alternatively, the coordination message may be sent to the pen by a host or central processor. After the pen receives the coordination message, the pen drive circuitry restarts the multi-digit code sequence.

The pen receives information about the touch sensor drive signals and uses the information to generate pen drive signal that includes the multi-digit code sequence. In some embodiments, information about the touch sensor drive signal, e.g. information that includes the phase of the touch drive signal, is conveyed from the controller to the pen in a synchronization signal transmitted over a wired or wireless connection. In some implementations, the synchronization signal may be transmitted via the communication connection. In yet other embodiments, the pen may directly sense the touch sensor drive signal from the drive electrodes of the touch sensor.

The pen body may include an electrically conductive receiver portion that is electrically insulated and electrostatically shielded from the emitter portion. The pen drive circuitry includes receiver circuitry configured to receive touch sensor drive signals from drive electrodes of the touch sensor through the receiver portion of the pen body. The pen drive circuitry generates the pen drive signal that includes the multi-digit code sequence based on the received touch sensor drive signals.

For example, the pen may emit the multi-digit code during successive scans of the touch sensor drive electrodes, such that the pen drive signal includes one digit of the multi-digit code sequence during each scan. The pen drive circuitry may include the multi-digit code in the pen drive signal by phase modulating or amplitude modulating the received touch sensor drive signals. Each digit of the multi-digit code may provide one bit of information, or may provide multiple bits of information. For example, the multi-digit code may be implemented using multiple analog levels and/or multiple phases, each level and/or phase representing multiple bits of information.

Figure 13A:
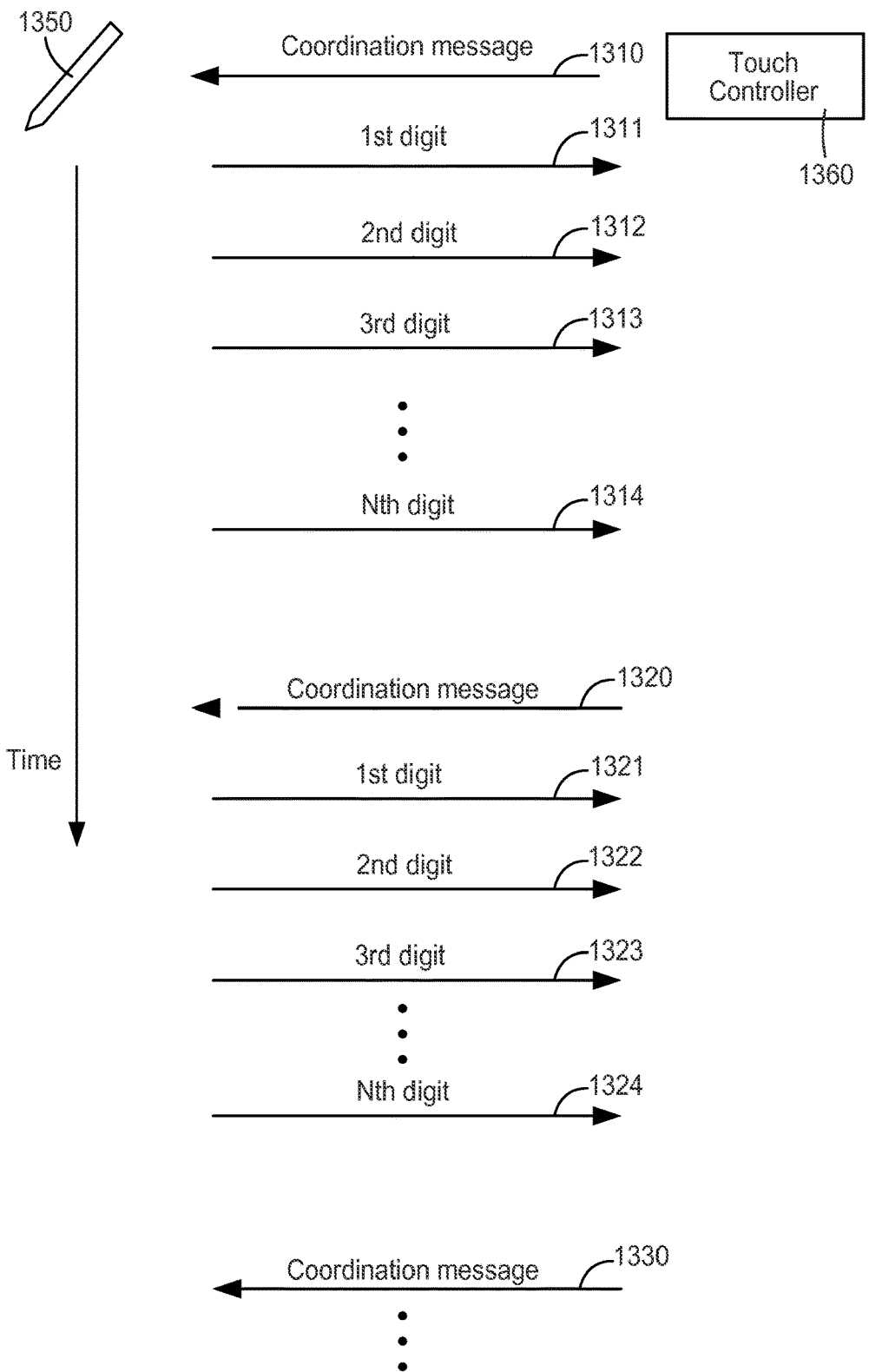
FIG. 13A is a timing diagram illustrating a process of implementing a pen drive signal that includes an N-digit code in conjunction with a coordination message.

FIG. 13A is a timing diagram illustrating a process of implementing a pen drive signal that includes an N-digit code in conjunction with a coordination message from a touch controller, or other processor, such as a host or central processor. The touch controller 1360 sends a first coordination message 1310 to the pen 1350 over a communication connection, e.g., a radio frequency (RF) or Bluetooth® communication connection. The pen responds by restarting the multi-digit code included in the pen drive signal. The pen drive signal is received on the receive electrodes of the touch sensor.

The first digit 1311 of the N-digit binary code is included in the pen drive signal during a first scan of the touch sensor drive electrodes after the first coordination message 1310 is received by the pen 1350; the second digit 1312 of the N-digit code is included in the pen drive signal during a second scan of the touch sensor drive electrodes after the first coordination message 1310 is received; the third digit 1313 of the N-digit code is included in the pen drive signal during a third scan of the touch sensor drive electrodes after the coordination message 1310 is received. Subsequent digits of the N-digit code are included in the pen drive signal of subsequent scans. After the scan that includes the Nth digit 1314 of the code, the controller 1360 sends a second coordination message 1320 to the pen 1350 over the communication connection. The second coordination message 1320 causes the pen to restart sending the N-digit code. The first digit 1321 of the N-digit code is included in the pen drive signal during a first scan of the touch sensor drive electrodes after the second coordination message 1320 is received by the pen 1350, the second digit 1322 of the N-digit code is included in the pen drive signal during a second scan of the touch sensor drive electrodes after the second coordination message 1320 is received, the third digit 1323 of the N-digit code is included in the pen drive signal during a third scan of the touch sensor drive electrodes after the coordination message 1320 is received, the $Nt^h$ digit 1324 of the N-digit code is included in the pen drive signal during an $N^{th}$ scan of the touch sensor drive electrodes after the coordination message 1320 is received. The N-digit code is then repeated in the same manner after another coordination message 1330 is received by the pen.

The use of the coordination message facilitates the use of multiple pens in a touch system. The touch controller (or other processor) may send the coordination message to all pens interacting with the touch sensor causing all pens to restart their code sequences. This enables more pens to be used concurrently in the system when compared to a system that does not use a coordination message to restart the pen codes. For example, consider the scenario wherein each pen interacting with a touch controller uses a four digit code. Pen 1 has a code of 1100; pen 2 has a code of 1001; pen 3 as a code of 0011; and pen 4 has a code of 0110. On the first scan of the touch panel drive electrodes after the coordination message is sent by the touch controller, the first pen sends a 1, the second pen sends a 1, the third pen sends a 0 and the fourth pen sends a 0. On the second scan of the touch panel drive electrodes after the coordination message is sent by the touch controller, the first pen sends a 1, the second pen sends a 0, the third pen sends a 0 and the fourth pen sends a 1. On the third scan of the touch panel drive electrodes after the coordination message is sent by the touch controller, the first pen sends a 0, the second pen sends a 0, the third pen sends a 1 and the fourth pen sends a 1. On the fourth scan of the touch panel drive electrodes after the coordination message is sent by the touch controller, the first pen sends a 1, the second pen sends a 1, the third pen sends a 0 and the fourth pen sends a 0. Without the coordination message, a four bit code can distinguish only three pens. The four codes sent by the pens above would be indistinguishable from each other absent the coordination message.

In another embodiment, a coordination message may be sent from a touch controller prior to each scan, and the coordination message includes the number of the digit to be transmitted by all pens during that scan. For example, prior to the first scan, the controller sends out a coordination message indicating it will be Scan 1, and all pens modulate their pen drive signal outputs according to their respective code digits for Scan 1. Prior to the second scan, the controller sends out a coordination message indicating it will be Scan 2, and all pens modulate their pen drive signal outputs according to their respective code digits for Scan 2, etc. This approach may reduce the latency time to recognize a pen touchdown, because a pen can start emitting its appropriate code digit during any scan of a code sequence.

In some embodiments, a communication connection cannot provide coordination message as described above. This may be the case where the communication connection is absent, or where it is too slow or has too long a latency period to transmit coordination messages. Where this is the case, the pen drive signal may be configured to include a start code indicator as part of its transmitted code, (similar in principle to the start bit in RS232 asynchronous protocol). For this purpose, the pen drive signal can send start code indicator comprising a modulation symbol that is uniquely distinguishable from the symbols used in digits of the code; (e.g. a binary coded pen drive signal comprising 1=opposite-phase signals and 0=no signal, may have a start code indicator comprising in-phase signals). An end-of-code indicator may also be appended, comprising either the same symbol as the start indicator, or a separate, unique symbol. When a start code indicator is used, a pen may emit the start code indicator as soon as it is in the touchdown state, then the pen may follow the start code indicator with its code digits. Coordination with code transmissions of other pens may not be required. The start code indicator may comprise more than one code, e.g., two codes in sequence.

As discussed in relation to a number of embodiments in this disclosure, a pen may emit a coded drive signal that serves dual purposes of locating and identifying the pen. In some embodiments, the coded signal comprises a multi-digit code where a single digit may be emitted during each scan of the touch sensor drive electrodes. As discussed herein, the pen and the touch sensor may be communicatively coupled via several communication connections. For example, a first communication connection may be a more localized connection that relies, for example, on the capacitive coupling between the touch panel and the pen (or other localized communication), whereas the second communication connection may be a longer range communication connection, e.g. radio frequency (RF), Wi-Fi® or Bluetooth®.

It can be helpful to identify the start of code sequences, e.g., identification code sequences, function code sequences, and/or other code sequences, transmitted from the pen. As previously described, a coordination message sent via the second (longer range) communication connection may be used to indicate the beginning of a code sequence, but such an implementation requires a timing system and second communication connection with sufficient speed (and low latency) to transmit a "start code" message synchronized with the sensor scanning process. Where a longer range second communication connection is not available, or has excessive latency, the pen may send its identification code asynchronously using a method that is independent of the second communication connection, at least for its real time data communication.

For example, in some embodiments, a more localized first communication connection (e.g., an optical or infrared communication connection) may be used to send the start code indicator. Alternatively, the pen drive signal may be configured to include a start code indicator as part of its transmitted code, (similar in principle to the start bit in RS232 asynchronous protocol). For this purpose, it is preferable that the pen drive signal can send start code digits (or at least some indication that the code is starting) that are uniquely distinguishable from the digits of the pen code. For example, a pen code may be sent as a binary coded pen drive signal comprising 1=opposite-phase signals and 0=no signal and a code start indicator for the identification code may comprise in-phase signals.

The examples provided in the discussion below involve a transponder type pen that receives touch sensor drive signals from a touch sensor and re-transmits a pen drive signal which is a form of the received touch sensor drive signals simultaneously with receiving the touch sensor drive signals. A start code indicator is sent from the pen to touch sensor prior to sending the pen code. This signaling has similarities to RS232 signaling that includes start and stop bits. In some scenarios, the pen code is hardwired into the pen or stored in pen firmware, e.g., at the time of manufacture. In some scenarios, the pen code may be stored in registers or is switch states of the pen. In additional scenarios, the pen receives the pen code through an external source, e.g., via the first or second communication connection.

Figure 13B:
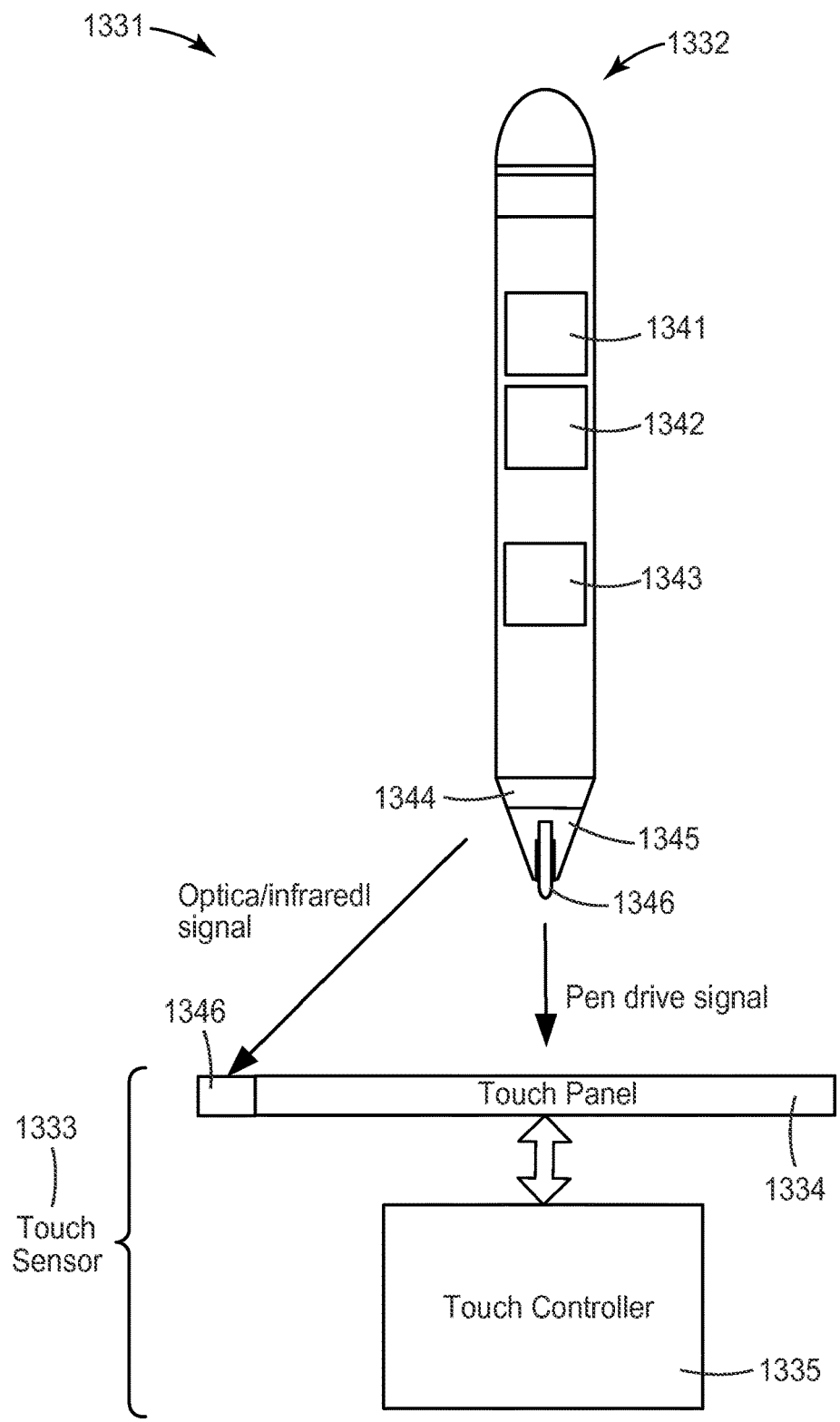
FIG. 13B is a block diagram of a system that includes a touch sensor and a pen wherein the pen is configured to provide a start code indicator to the touch sensor.

FIG. 13B is a block diagram of a system 1331 that includes a touch sensor 1333 including a touch panel 1334 and a touch controller 1335. Pen 1332 is configured for use with the touch sensor 1333. The pen 1332 includes a tip 1346 configured to make contact with the touch panel 1334. For operation in active mode, the pen circuitry includes signal generator circuitry 1341 configured to generate a pen drive signal emitted via an emitter portion 1345 of the pen body. The signal generator circuitry is configured to generate a pen drive signal including a pen code, such as an identification code that uniquely identifies the pen with respect to other pens used within the system 1331. Receiver circuitry 1342 of the pen 1332 may be coupled to a receiver portion of the pen body, e.g., the pen tip 1346. The receiver portion and receiver circuitry 1342 are capable of receiving touch sensor drive signals present on the drive electrodes of the touch panel 1334.

Optionally, the pen 1332 and touch sensor 1333 include communication circuitry configured to establish a communication connection between the pen 1332 and touch sensor 1333, such as an RF, Wi-Fi®, or Bluetooth® communication connection. The communication connection may have a relatively long latency such that real time communication between the pen and touch sensor within the time frame needed for touch location identification is not possible.

In an optional implementation, the touch panel 1334 includes a detector 1346 configured to receive a start code indicator from the pen 1332 through a separate channel, e.g., an optical or infrared communication channel. In this implementation, the pen circuitry further includes emitter circuitry 1343 configured to emit a signal, e.g., optical or infrared signal, used to convey the start code indicator to the touch sensor 1333. For example, for optical or infrared signals, the emitter circuitry 1343 can arranged so that it emits the start code indicator through a window 1344 in the pen body. For example, in some embodiments, emitter emits the start code indicator through a ring 1344 of a material that is substantially transparent to the emitted signal, e.g., plastic, and that surrounds the pen tip 1346. In some embodiments, the pen tip 1346 itself may be made of material that is substantially transparent to optical or infrared radiation so that the pen tip provides the window for emission of the start code indicator. In some implementations, the pen tip may be optically transmissive and electrically conductive so that the pen tip serves as both an optical window and the receiver portion of the pen body.

In some embodiments, the start code indicator is included in the pen drive signal. For example, after the pen tip switch is activated, the pen may send the start code indictor on the next scan of the touch sensor, followed by the pen code. The start code indicator is unique with respect to the code digits and thus can be identified by the touch controller as a start code indicator. For example, when the start code indicator is included in the pen drive signal, the start code indicator may be have a unique phase and/or magnitude with respect to the code digits.

In some implementations, the start code indicator may be a unique quantized form of the received touch sensor drive signal. For example, the pen circuitry may compare the received touch sensor drive signal to a threshold. If the received touch sensor drive signal is above the threshold, the pen drive signal may include a start code indicator at a fixed first level. If the received touch sensor drive signal is below the threshold, the pen drive signal may include a start code indicator at a fixed second level.

Figure 13C:
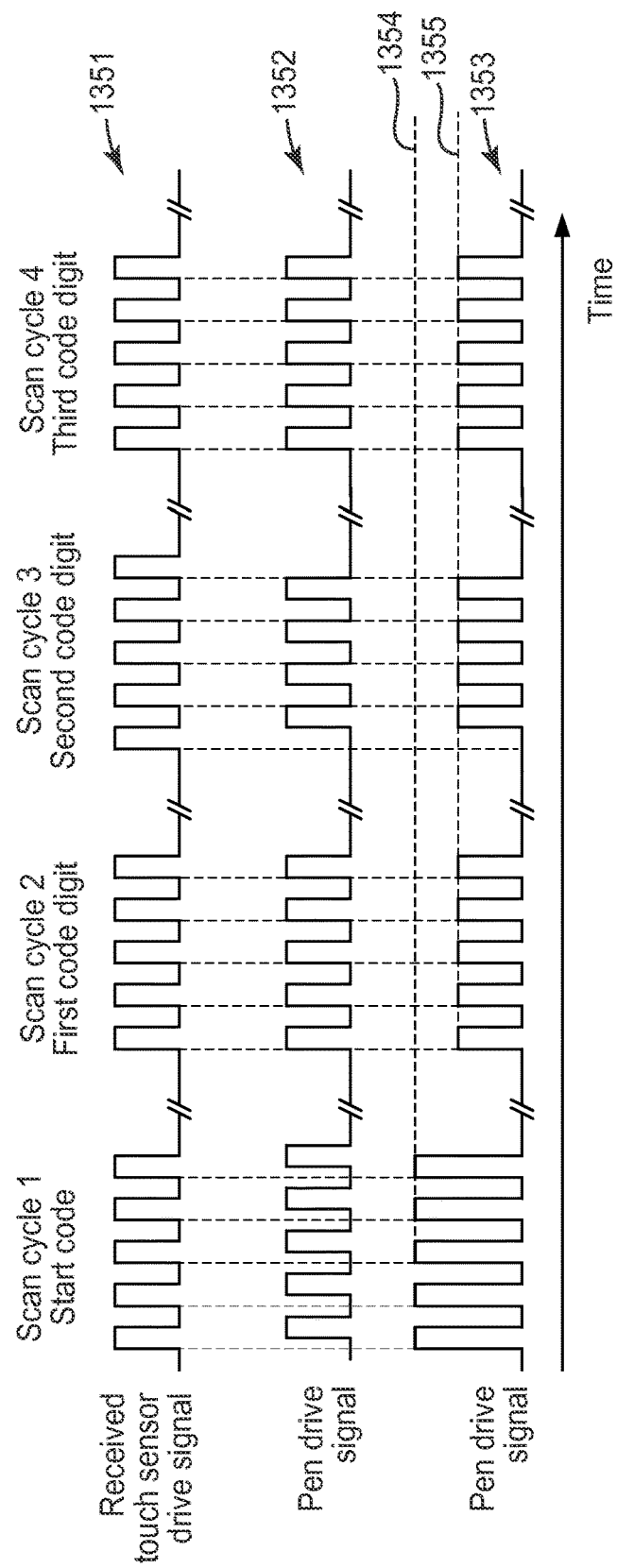
FIG. 13C illustrates various start code indicator implementations that may be employed by the system of FIG. 13B.

FIG. 13C illustrates various start code indicator implementations. FIG. 13C shows a received touch sensor drive signal 1351 received from a drive electrode near the touch location over several scan cycles. During each scan cycle, the touch sensor drive signal is applied sequentially to the drive electrodes and the received touch sensor drive signal for the drive electrode nearest the touch location is shown in FIG. 13C. Signal 1352 illustrates a pen drive signal including a start code indicator that has a different phase from the phases used for the code digits. In this example, the start code indicator is a pulse sequence that is 90 degrees out of phase with respect to the pulses of the touch sensor drive signal 1351. Pen drive signal 1352 illustrates three digits of the pen identification code, although the code may include more or fewer digits. The code digits of pen drive signal 1352 are pulses that are 0 degrees or 180 degrees out of phase with the touch sensor drive signal 1351. Pen drive signal 1353 includes a start code indicator having pulses of a different magnitude 1354 than the magnitude 1355 of the pulses used for the code digits.

In some implementations, the pen emits a first code when the pen is operating in a first state and emits second code, different from the first code, or no code when the pen is operating in a second state different from the first state. In some embodiments, the first and second states may be related to first and second pen functions. For example, the pen may emit the first code when the pen is in mark mode and may emit the second code when the pen is in erase mode.

In some embodiments, the first and second states may be unmated and mated states or stationary and movement states, or may be any other operational states of the pen. The pen may operate according to a first set of functions when in the first state and may operate according to a second set of functions, different from the first set of functions, in the second state. For example, the first set of functions may provide relatively limited functionality when compared to the second set of functions.

For example, in some embodiments, the pen operates in a first state and emits a first code before the pen is communicatively mated with the touch sensor or other external device. The pen operates in a second state and emits a second code after the pen is communicatively mated with the touch sensor or other external device. The pen uses the second code until the pen becomes unmated with the touch sensor or external device. The first code can be a generic wildcard code that is used by one or more other pens interacting with the touch sensor or external device. The second code can be an identification code that uniquely identifies the pen with respect to other pens interacting with the touch sensor or external device. The pen may receive the second code from the touch sensor or external device, whereas the first code is pre-programmed into the pen or obtained by the pen from another source. The pen may receive the second code via a relatively longer range communication link, such as an RF or Bluetooth® connection, or through a relatively local connection such as through optical, magnetic, inductive, capacitive, and/or electromagnetic coupling with the touch sensor or with a display that is viewable through the touch panel of the touch sensor. In some configurations, the pen may have mated with multiple touch sensors and may use a different identification code for each of the multiple touch sensors.

Figure 14:
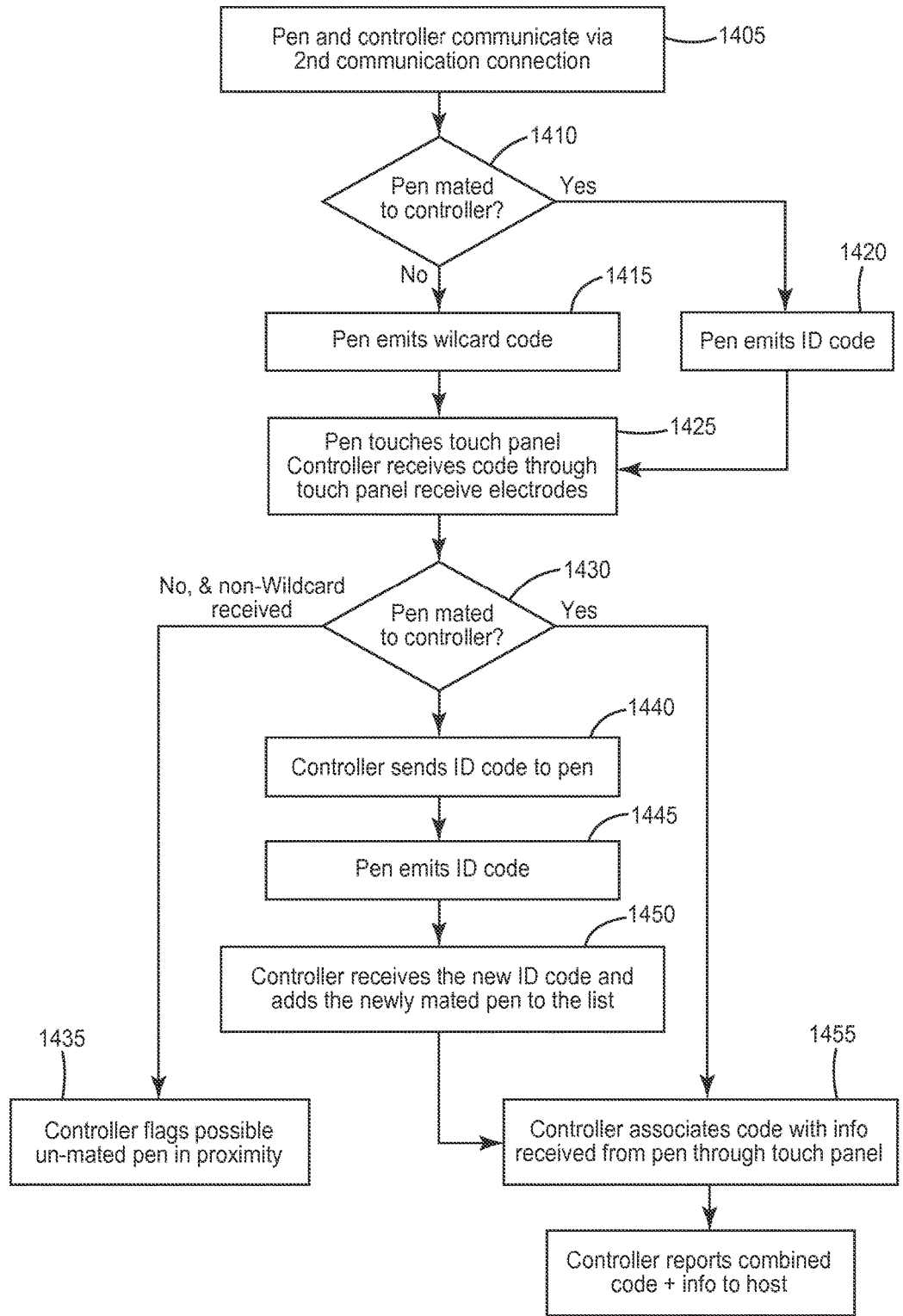
FIG. 14 is a flow diagram that illustrates a process for an interactive mating between a pen and touch controller.

The flow diagram of FIG. 14 illustrates a process for an interactive mating between a pen and sensor controller, e.g., capacitive, electromagnetic, etc. In this process, an identification code for a pen used with a controller (or other processor) may be established interactively over a communication connection between the pen and controller. In this embodiment, the pen and controller are capable of communicating information over two connections. The first connection may be a relatively more local connection, e.g., based on capacitive coupling between the pen and touch sensor. Through the local connection, a pen drive signal is communicated from the pen to the touch sensor, e.g. by capacitive or electromagnetic coupling between the pen and touch panel electrodes. The second connection may be a relatively more long range connection, e.g., a wireless connection such as Wi-Fi®, Bluetooth®, radio frequency identification (RFID), or a wired connection.

In the process illustrated in FIG. 14, the pen transmits a wildcard code to the controller through the local connection; the controller transmits an identification code to the pen through the second (longer range) connection; and the pen transmits the identification code to the touch sensor controller through the first (local) connection.

The controller keeps a list of currently used pen identification codes and available identification codes. When a pen initially comes within range of the second communication connection, the pen and controller establish 1405 the communication connection, e.g. via Bluetooth®. If the pen and controller have been previously mated 1410, e.g., Bluetooth® paired, the pen is commanded to emit 1420 the identification code previously established and stored on the controller's list. The pen that emits the identification code can be uniquely recognized by the controller with respect to other pens used with the touch sensor.

If the pen and controller have not been previously mated, the pen emits a wildcard drive code 1415 that is a generic code used for all compatible controller/Host systems. Note that a pen may alternately interact with multiple different touch sensor systems, using two different identification codes that were established by previous mating with each of the multiple controllers/Host system. Bluetooth® may not lend itself to a device mating (pairing) with several others, but the protocol described herein allows this type of device mating.

The pen touches 1425 the touch panel and the touch controller receives the coded pen drive signal via the touch panel electrodes, as previously discussed. If the pen and controller have been previously mated 1430, the identification code included in the pen drive signal is uniquely recognized by the controller. If not, and the controller recognizes the wildcard code, the controller can initiate a mating process. If the controller recognizes a non-wildcard drive code, the controller flags/reports 1435 a possible non-mated pen in proximity.

During the mating process, the controller communicates with the unmated pen via a second communication connection, e.g. Bluetooth®, RFID, Wi-Fi®, wired communication link etc. The controller searches the list of identification codes of devices currently active on its second communication connection, identifies the pen as unmated, and assigns a new identification code to the pen.

The controller sends 1440 the pen identification code to the pen through the second communication connection. The pen includes the code in the pen drive signal and emits 1445 the pen drive signal that includes the identification code to the controller via the touch panel electrodes. The controller recognizes 1450 the identification code and adds the newly mated pen identification code to the list of used identification codes. The controller associates 1455 the identification code of the pen with other information received from the pen, e.g., touch location. The controller may send 1460 the identification code along with other information to the host processor.

In some scenarios, only one unmated pen will appear on the second communication connection shortly before the wildcard code is conveyed by the pen to the touch sensor through the touch panel receive electrodes. In this scenario, the controller sends a command via the second communication connection to the unmated pen to change its code from the wildcard code to a new (yet unused) identification code. The pen begins including the identification code in its pen drive signal. The controller confirms the pen's identity by detecting the change in the code at the expected location via touch panel receive electrodes and location-measuring circuits (drive and receive circuitry). Then the controller flags the new pen on its list as mated.

In some scenarios, two or more unmated pens may concurrently appear on the second communication connection and shortly thereafter a wildcard code appears on the touch panel electrodes. The controller commands each unmated pen to change its emitted code, (e.g. one at a time) to a new (yet unused) code, such that each unmated pen is provided with a unique identification code. The controller detects the change to the new code for each pen at the expected location via the touch panel electrodes and location-measuring circuits. When the controller detects that the response signals on touch panel receive electrodes at the new pen location include the new code, the controller flags the new pen as mated and the pen continues to use the new code assigned to it by the controller. The wildcard code can then be used by the next stylus that comes in proximity with the second communication connection of the controller.

The process described above will allow two pens to appear simultaneously on the second communication connection and also appear simultaneously on the touch panel electrodes. The identification code assigned to the pen by the controller may be used by the pen as long as the pen remains mated with the controller. Alternatively, the controller or the pen itself may identify the identification code as temporary, in which case the identification code may be cleared after a specific time or in response to an event. Using this method, a relatively limited number of identification codes can be used to accommodate a number of pens.

As previously discussed, some touch system embodiments include multiple touch controllers and/or host processors. In multiple controller/host systems, after pens have been mated to a first controller/Host, that first controller/Host can convey the pen identification codes to a second controller/host so the second controller/Host will be able to associate the coded signals of each pen to specified parameters and/or identifying information, even if the second controller/Host has not mated (e.g. via Bluetooth®) with a pen.

In some embodiments, a touch system lacks the relatively longer range communication connection that can be provided, for example, by a Wi-Fi® or Bluetooth® connection. In these embodiments, the controller may convey a pen identification code to the pen through the touch panel electrodes or through another relatively localized communication connection.

Figure 15:
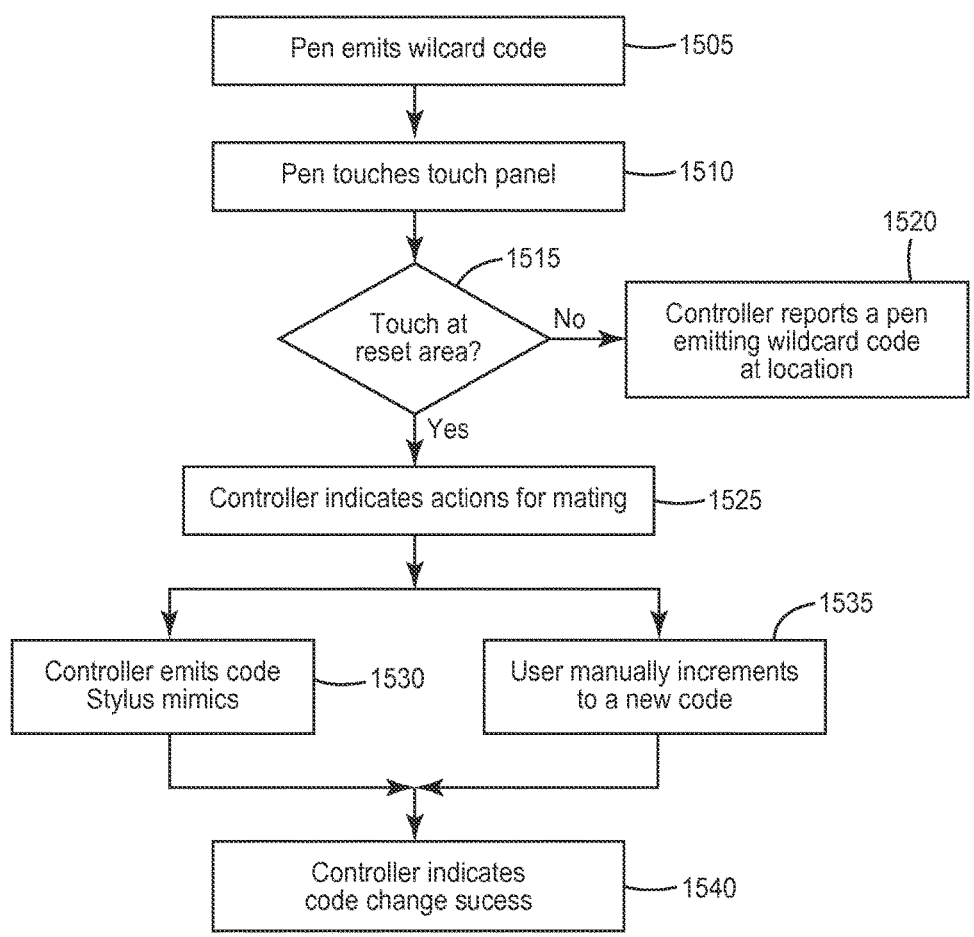
FIG. 15 is a flow diagram illustrating a process for mating a pen and touch controller in accordance with some embodiments.

FIG. 15 is a flow diagram illustrating a process for mating a pen and touch controller in accordance with some embodiments. An unmated pen begins emitting 1505 the wildcard code. For example, the pen may begin emitting 1505 the wildcard code in response to some manual input from the user such as depressing a barrel switch on the pen body held closed, or shaking the pen, etc. The pen may begin emitting the code while the pen is out of communication range of the touch panel. The pen touches 1510 the touch panel surface, optionally at a specific code reset-enabled area on the touch panel surface. In some embodiments, the pen includes a pressure sensitive tip switch and the tip switch is depressed when the pen tip touches the touch panel surface.

Alternatively, the pen may have circuitry that allows the pen to detect proximity to the touch panel. The pen begins emitting the wildcard code when the stylus detects proximity with the touch panel. The proximity circuitry may comprise circuitry configured to detect electromagnetic, optical, inductive, capacitive, or magnetic signals emitted by the touch panel or controller, for example.

When the touch system includes a display, the controller/Host may display feedback to indicate to a user how to change the pen identification code. For example, a target displayed on a display that is visible through the touch panel can indicate to the user where to place the pen on the touch panel for a code reset. If the pen does not touch 1515 the reset—enabled area, the controller flags and/or reports 1520 a pen emitting a wildcard code at a location other than the reset-enabled area. If the pen touches 1515 the reset-enabled area, the touch sensor sends the code to the pen or otherwise conveys information to the user regarding how to change the code. Sending the code to the pen may be accomplished in various ways. For example, the drive electrodes at the reset-enabled area may momentarily emit 1530 the code sequence that is intended for the pen. The pen subsequently mimics the code sequence it receives from the touch panel drive electrodes. Alternatively, the code can be sent to the pen through any suitable optical, magnetic, or electromagnetic signal from the touch sensor to the pen.

Activation of a unique combination of manual inputs, e.g., pen switches or pen movements, may be needed to cause the pen to accept a new identification code. Instructions for how to change the code may be optionally displayed 1525 on a display of the touch system. For example, in one scenario a number N is displayed, and the user presses 1535 the pen tip switch N times on a designated spot on the touch panel. Each press increments the code. On the Nth press, the code is the correct one, and an indication of success is displayed 1540 to the user on the display. Alternatively, the code may be input to the pen by shaking the pen N times, as detected by an accelerometer in the pen, or tilting the pen N times, as detected by a tilt sensor in the pen.

The code may be used by the pen until the pen code is reset, or the code may be cleared after a specific time or in response to proximity or another event. The controller/Host may limit the interaction functions allowed for an unmated pen. For example, certain touch panel areas/buttons/functions may not be active for the unmated pen.

More than one wildcard code can be recognized by a touch system. A wildcard drive code may be a code sequence that is most reliably measured by controller circuits. The result of the processes described above is that multiple pens with a limited number of codes can each be uniquely identified with respect to each other on a touch panel surface, and each pen can communicate on a separate link, if available, to convey status and/or change parameters. While capacitive examples have been used for illustration, wildcard codes may be used with various pen location technologies including capacitive, electromagnetic, optical, and/or acoustic.

Figure 16A:
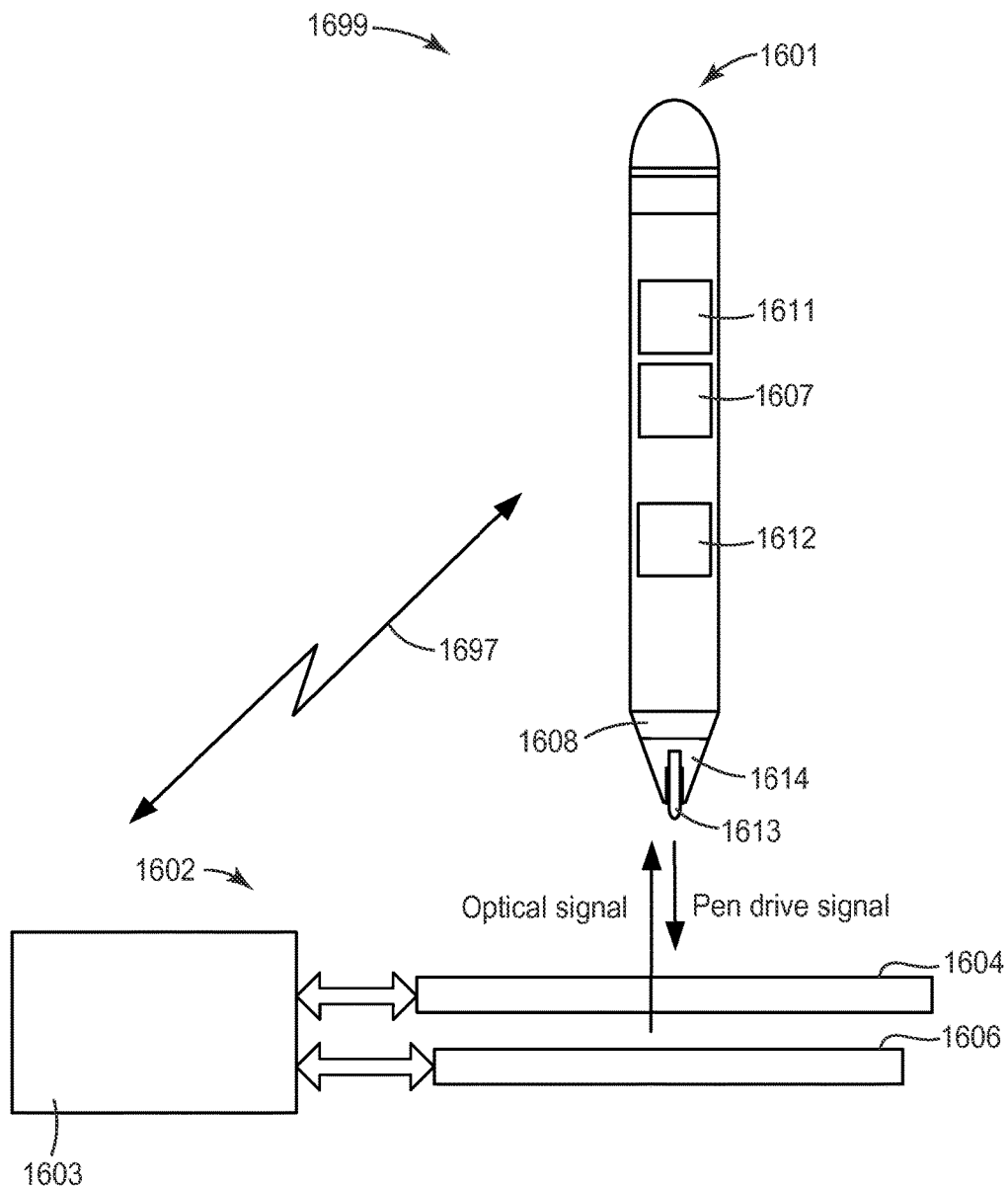
FIG. 16A is a block diagram of a system that uses optical signaling for confirmation of the pen identity in accordance with some embodiments.

Touch systems according to some embodiments use location-specific optical signaling for confirmation of the pen identity. FIG. 16A is a block diagram of an exemplary system 1699 that includes a touch sensor 1602, including a panel 1604 and a controller 1603. The system 1699 includes a display 1606 viewable through the touch panel 1604. Under control of the touch controller 1603, the display can emit an optical signal at a specific location on display 1606. The optical signal indicates to pen 1601 that it should respond with a confirmation signal. The resulting confirmation signal may comprise a simple change in the pen drive signal that confirms it is a pen rather than a finger touch, and/or the pen may initiate an encoded pen drive signal sequence that identifies it uniquely from other pens. Alternatively, if the pen cannot emit variable signals, the confirmation signal may comprise a message transmitted by the pen using communication connection 1697.

Pen 1601 is configured for use with the touch sensor 1602. The pen 1601 can operate in active or passive mode, (with or without pen drive signals) and includes a portion, e.g., pen tip 1613, configured to make contact with the panel 1604. For operation in active mode, the pen circuitry can include signal generator circuitry 1611 configured to generate a pen drive signal emitted via an emitter portion 1614 of the pen body. The pen drive signal may include a code, which may be a generic "wildcard" code or an identification code that uniquely identifies the pen with respect to other pens used within the system 1699. Receive circuitry 1607 of the pen 1601 may be coupled to a receiver portion of the pen body, the receiver portion and receiver circuitry 1607 capable of detecting touch sensor drive signals present on the drive electrodes of the touch panel 1604.

The pen circuitry includes photodetector circuitry 1612 configured to detect the optical signal emitted by the display. In some embodiments, the photodetector circuitry 1612 includes a photodiode configured to detect optical signals in the visible wavelength range. The photodetector circuitry is arranged so that it receives light from the display through an optical window 1608 in the pen body. For example, in some embodiments, the light from the display may be optically coupled to the photodetector circuitry through a ring of optically transparent material, e.g., plastic, that surrounds the pen tip. In some embodiments, the pen tip may be made of an optically transparent material so that the pen tip provides the optical window. In some implementations, the pen tip may be optically transmissive and electrically conductive so that the pen tip serves as both the optical window and the receiver portion of the pen body.

Optionally, the pen 1601 and touch sensor 1602 may include communication circuitry configured to establish a communication connection 1697 between the pen 1601 and touch sensor 1602, such as an RF or Bluetooth® communication connection. The communication connection 1697 may have a relatively long latency such that real time communication between the pen and touch sensor within the time frame needed for touch location identification is not possible.

In some embodiments, the touch sensor 1602 is a capacitive touch sensor that includes a touch panel comprising matrix of drive electrodes capacitively coupled receive electrodes at nodes. When the pen 1601 or a finger touches the touch panel, the pen 1601 or finger causes a detectable change in the capacitive coupling at the nodes.

In some embodiments, the sensor 1602 is an electromagnetic sensor that includes a digitizer panel and a controller configured to generate digitizer drive signals and to detect the pen based on changes in magnetic fields in the digitizer panel caused by the pen. An optical signal provided by a display is viewable through the digitizer panel. The pen 1601 includes pen circuitry configured to magnetically couple to the digitizer panel, causing a magnetic field change locatable by the touch sensor. The pen circuitry also includes photodetector circuitry configured to sense the optical signal and signal generator circuitry configured to generate a confirmation signal in response to the optical signal, and to emit the signal. For example, in some embodiments, the confirmation signal comprises a change in the pen magnetic field. Pens used with magnetic touch sensors may indicate their status (e.g. tip pressure, etc.) by changing their emitted magnetic field, (e.g. phase). This is analogous to coding the signal emitted by a capacitive pen.

In some implementations, confirmation signal comprises a pen identification code. For example, the touch sensor controller may have previously provided the pen with its identification code via the communication connection.

Figure 16B:
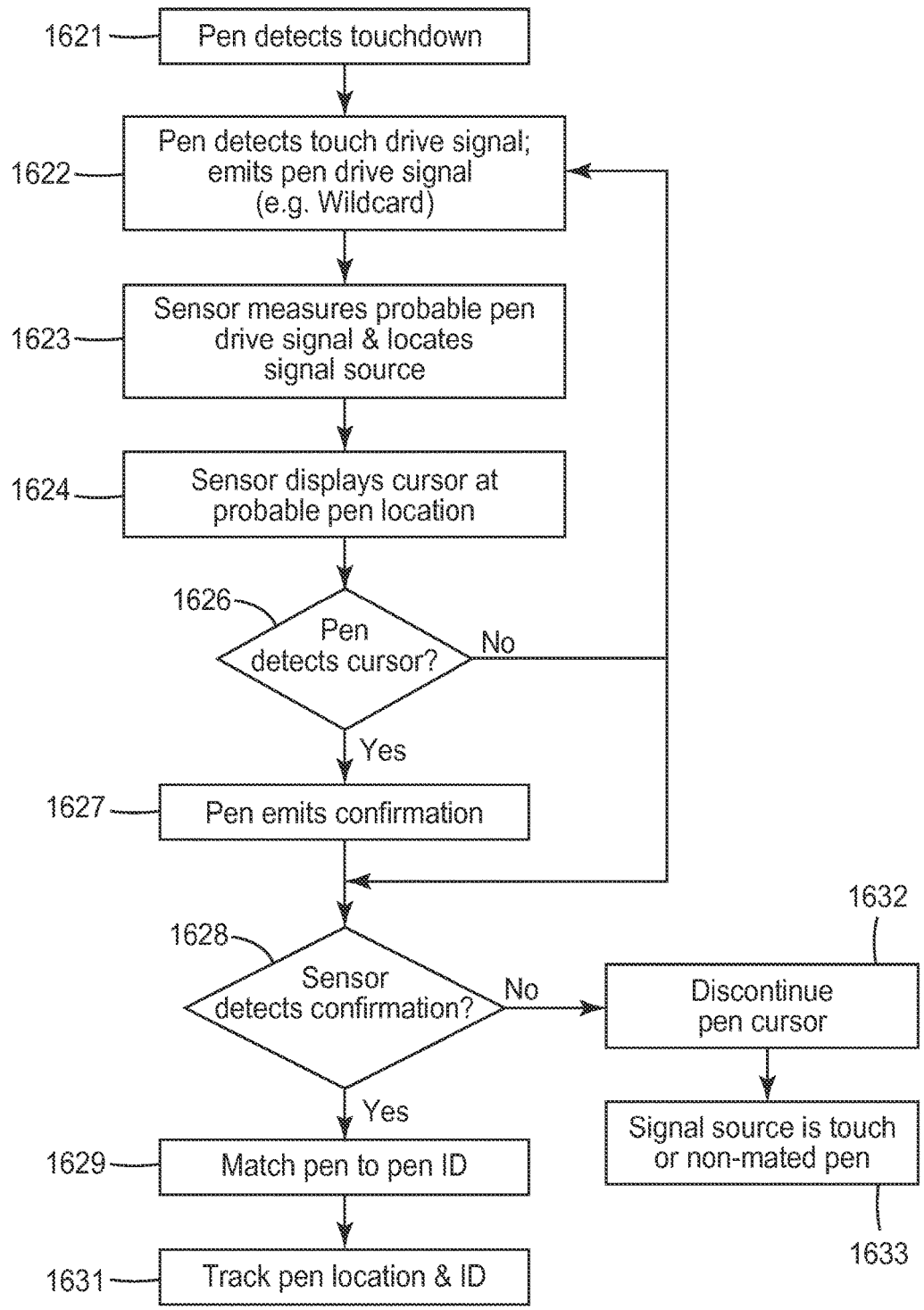
FIG. 16B is a flow diagram illustrating confirmation of a pen identification code using optical signaling from the display under control of the touch controller.

FIG. 16B is a flow diagram illustrating confirmation of a pen identification emitted by the pen 1601 using local optical signaling from the display 1606 under control of the touch controller 1603. The pen detects 1621 touch down on the touch panel surface, e.g., by detecting signals above a threshold and/or due to activation of a pressure sensitive tip switch. The receiver circuitry of the pen detects 1622 the touch drive signal and emits a pen drive signal. At this point, the pen may be communicating with the touch controller through a communication connection, but there is no code confirmation that would allow successful transmission of a pen identification to the touch controller. Prior to pen ID confirmation, the pen drive signal may be unencoded, or it may include a generic "wildcard" code.

The touch controller determines 1623 the touch location on the touch panel. In some cases, multiple concurrent touches occur on the touch panel, and in such a scenario, the touch controller determines the location of multiple touches. At this point, the touch controller has not identified the type of touch (active pen or finger). The touch controller causes the display to provide 1624 an optical signal (referred to as a "cursor") at the location of the touch. The cursor provides a local, momentary change in the video output of the location of the touch. For example, the change in the video output may comprise an increase or decrease in light intensity, a change in the color of the cursor. If multiple concurrent unidentified touches are detected, a cursor is displayed at each of the touch locations. In some embodiments, the touch sensor may display the cursor at the locations that are likely active pen touches and does not display the cursor at locations that are likely finger touches. In some embodiments, the touch sensor may display the cursor at several of the touch locations in a predetermined order, e.g., in order of the probability that the touch is caused by an active pen.

If no optical signal meeting predetermined threshold conditions is detected 1626 by the photodetector circuitry in the pen, the pen continues to emit the unencoded signals or a wildcard code. However, if the photodetector circuitry detects 1626 the optical signal and the detected optical signal meets the threshold conditions, e.g., threshold intensity and/or color change, then the pen transmits 1627 its pen identification code via the pen drive signal, or via communication connection 1697.

In some embodiments, the pen code was previously transmitted to the pen by the touch sensor or other external device. For example, the pen code may have been transmitted to the pen from the touch sensor via the communication connection or via a local connection with the touch panel as previously discussed. In some embodiments, the optical signal itself may be used to convey the pen code from the touch sensor to the pen, e.g., as series of higher and lower intensity light pulses. The pen code may be selected or modified based on the optical change of the cursor. For example, the direction of the change, and/or the magnitude of the change and/or the color change of the cursor may cause the pen to modify the pen code. In some embodiments, the pen identification code is hardwired into the pen or programmed into the pen firmware, e.g., at the time of manufacture.

If the sensor detects 1628 a pen identification code, then the touch sensor associates 1629 the pen with the detected identification code and tracks 1631 the pen location associated with the pen identification code. If no pen identification code is detected 1628, then the touch sensor discontinues 1632 the cursor and identifies 1633 the source of the touch signal as a finger, passive pen, or unmated active pen.

In some embodiments, the pen operates in a first state and emits a first code when an operational parameter of the pen is below a threshold and emits a second code (or emits no code) when an operational parameter of the pen is above the threshold. For example, the operational parameter may be a rate of movement of the pen relative to the touch surface such that the pen emits a first code when the rate of movement of the pen relative to the touch surface of the touch sensor is below a movement threshold, e.g., the pen is stationary with respect to the touch surface, and the pen emits a second code (or ceases to emit a code) when the rate of movement of the pen with respect to the touch surface is above the threshold. Ceasing to emit a code or emitting a generic code can facilitate processing during pen movement because it reduces the time for the pen to complete sending the code at one location before it is moved to another location and/or reduces processing time in the touch controller.

In some embodiments, the pen can include a sensor, such as an accelerometer, configured to generate a signal in response to the movement of the pen, and movement circuitry, e.g., a comparator or other circuitry configured to determine if the movement of the pen exceeds the threshold based on the sensor signal. In some embodiments the pen can include communication circuitry configured to establish a communication connection with the touch sensor. The touch sensor can process location information to determine a rate of movement and can provide the movement information to the pen through the communication connection.

The code emitted when the pen is stationary may be an identification code for the pen that uniquely identifies the pen with respect to other pens interacting with the touch senor. When the rate of movement of the pen exceeds the threshold, the pen emits a generic wildcard code, e.g., the code 1111, that may also be emitted by other pens that are moving above the movement threshold. In some cases, the generic code may be selected provide minimum time for recognition and/or a maximum signal to noise ratio, relative to other codes.

In some embodiments, the pen and the touch sensor may alternate the task of tracking pen identification. For example, when the pen is moving slowly (below the movement threshold) or is stationary, the pen emits its identification code to identify itself to the touch sensor. When the pen moves faster (above the movement threshold), the pen stops emitting the identification code and the touch sensor tracks movement of the pen using techniques similar to those used to track multiple finger touches. The touch sensor maintains the identification of the pen during the time that the pen does not emit an identification code. The controller can maintain the identification of the pen based on continuity of the pen's location and, optionally, extrapolation of the pen's velocity at the time the pen stops emitting its identification code. When the pen's movement slows again, the pen re-assumes the responsibility of emitting the identification code.

The pen emits a pen drive signal that is configured to operate with the sensor. In some embodiments, the pen receives a signal, e.g., a touch sensor drive signal or synchronization signal, processes the signal, e.g., by filtering and/or amplification, and transmits the processed signal as the pen drive signal. In other embodiments, the pen generates its own pen drive signal, either in response to a signal received from the touch sensor or in response to internal timing and/or calculations.

Figure 17:
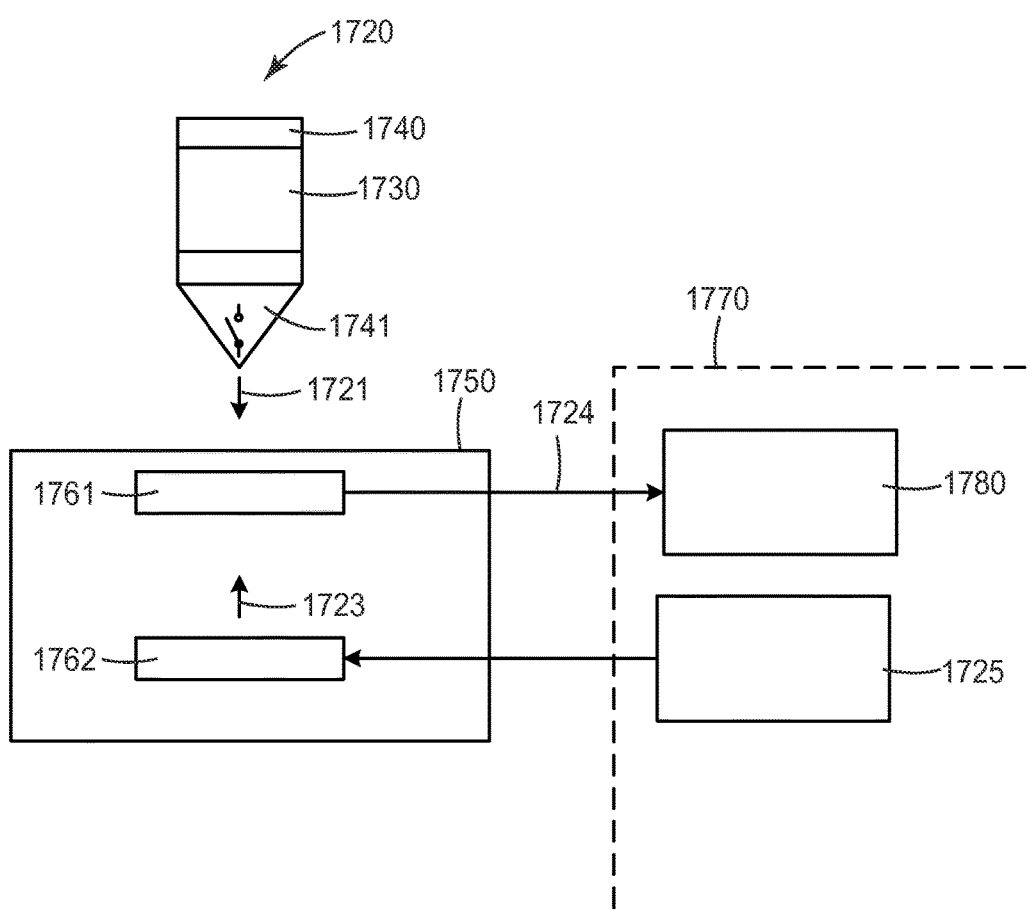
FIG. 17 is a block diagram that illustrates certain components of a touch system including some components of the pen and some components of the touch controller circuitry.

The block diagram of FIG. 17 illustrates certain components of a touch system including some components of the pen and some components of the touch controller circuitry. The block diagram of FIG. 17 shows a pen 1720 having signal generator circuitry 1730 configured to generate a pen drive signal. An emitter portion 1741 of the pen body 1740 is shown emitting the pen drive signal 1721 in the vicinity of a node of a touch panel 1650 at the intersection of a receive electrode 1761 and a drive electrode 1762. The receive electrode 1761 is capacitively coupled to the pen drive signal 1721 and to a touch sensor drive signal on the drive electrode 1762. A response signal 1724 is present on the receive electrode 1761 in response to the pen drive signal 1721. The response signal is processed by front end signal processing circuitry 1780 of the touch sensor controller. The front end circuitry may include, for example, amplifiers, analog filters, digital filters, demodulators, etc.

In some embodiments, the front end circuitry 1780 includes signal processing components, such as one or more filters, that optimally receive signals of a specific shape vs. time. A pen may be configured to emit a pen drive signal having a waveform morphology that is compatible with the signal processing components in the front end circuitry 1780 of the touch controller 1770. Compatibility between the pen drive signal waveform and signal processing components can provide for increased signal to noise ratio for the pen drive signal and/or enhanced demodulation efficiency. The waveform morphology, e.g., peak magnitude, slopes, peak width, rise time, fall time, power density spectrum, etc., of the pen drive signal may be adjusted so that the signal generated on the receive electrode in response to the pen drive signal (and possibly the touch sensor drive signal) has a waveform morphology that is efficiently demodulated.

Figure 18:
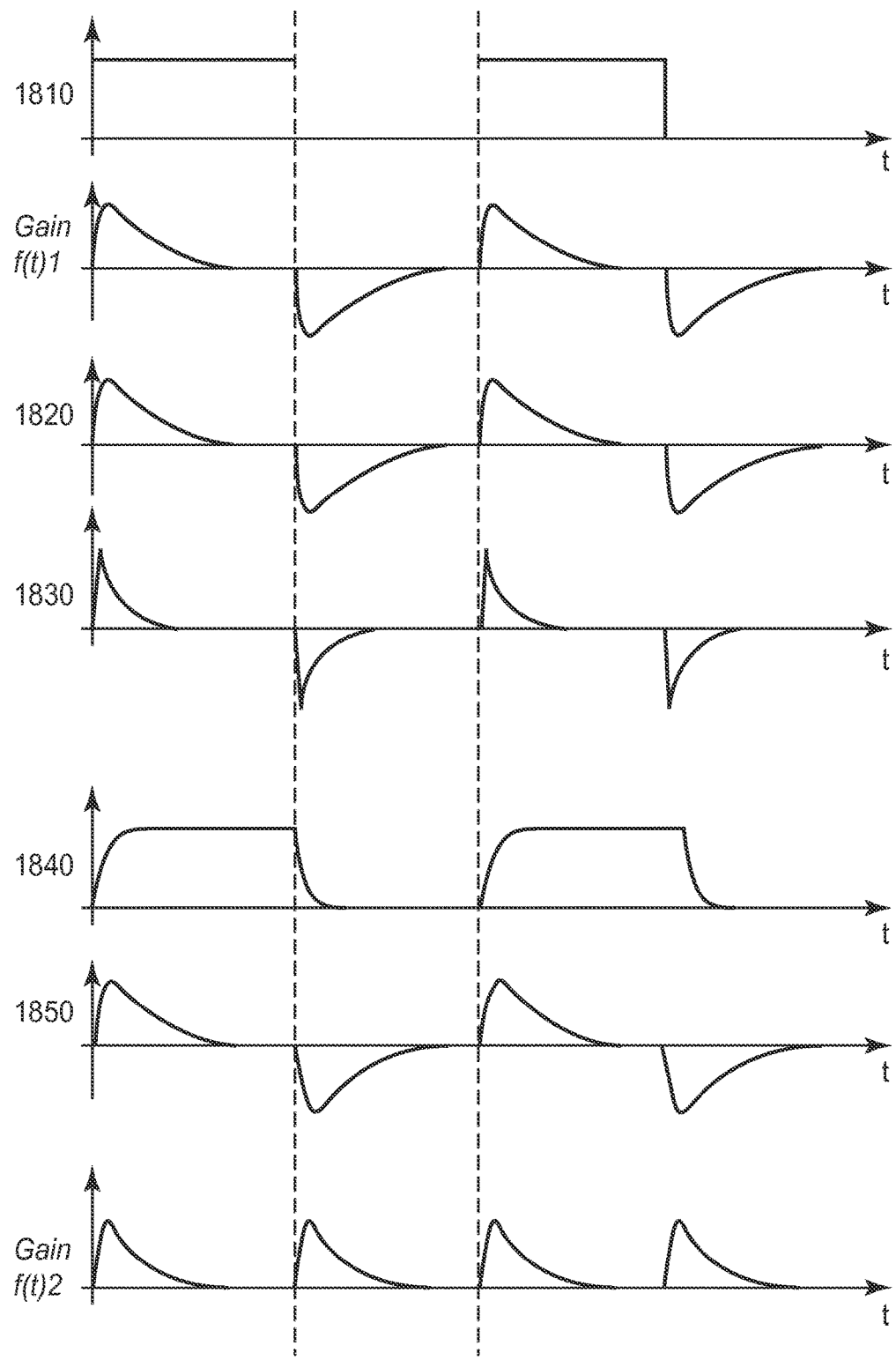
FIG. 18 illustrates various signals of a touch system.

In some scenarios, a finger touch on the touch panel modifies the touch response signal on the receive electrodes; in other scenarios a pen emitting a pen drive signal modifies the response signal. FIG. 18 shows a square wave drive signal 1810 representative of a signal driven onto touch sensor electrodes by a touch controller. Response signal 1820 shows the shape of a signal that is received by a low-impedance input circuit of the touch controller in response to a finger touch. A pen emitting a pen drive signal having the same signal shape 1810 as the touch sensor drive signal will generate a response waveform 1830 that is similar to response signal 1820, but smaller values of coupling capacitance may cause the time constants of response signal 1830 to be shorter, resulting in a sharper peaked waveform.

The touch controller includes time varying filtering that is sensitive to the waveform vs. time of the received signal, as indicated by Gain function F(t)1. If F(t)1 is optimized for a finger touch signal shape such as 1820, the filter will be non-optimal for a pen touch signal shape such as 1830.

According to some embodiments, the touch controller input filter may be adjusted to to a compromise filtering function F(t)2 that has characteristics between those of the finger touch signal shape and the pen touch signal shape so that touch response signals from a pen and touch response signals from a finger are both demodulated with reasonable efficiency.

According to other embodiments, the pen is configured to emit a pen drive signal 1840 that will couple to the receive electrode with a modified shape 1850 that is substantially similar to the touch signal 1820. Thus, the pen touch response signal simulates the finger touch response signal and both pen and finger touch response signals can be demodulated by gain function F(t)1 with similar efficiency. In some embodiments, the pen touch response signal may have a time constant that is within 25% of the finger touch response signal. Expressing the similarity in terms of signal correlation, the pen and finger touch signals may have a correlation coefficient greater than about $\gamma_{xy}(k)=0.7$, as calculated by correlation equation [1]:

$$\gamma_{sy}(k) = \frac{\sum_{n=0}^{N-1}[x(n)-\bar{x}][y(n-k)-\bar{y}]}{\sqrt{\sum_{n=0}^{N-1}[x(n)-\bar{x}]^2 \sum_{n=0}^{N-1}[y(n-k)-\bar{y}]^2}}. \quad [1]$$

where N=the number of samples compared, x(n)=the samples of the finger touch response signal, y(n)=the samples of the pen touch response signal, x=the average of the finger touch response samples, y=the average of the pen touch samples, and k is the time index of the signal y(n) at which the signal x(n) is placed. The correlation coefficient falls within a range 1<xy<1, where +1 indicates a perfectly matched signals.

In some implementations, the touch sensor controller includes front end filtering circuitry configured to demodulate the response signals. The filter circuitry comprises a first demodulator having a first demodulator function to measure the response signals generated in response to a finger touch and a second demodulator having a second demodulator function to measure the response signals generated in response to a pen touch. The controller can be configured to discriminate between the pen touch and the finger touch based on the demodulated response signals. The demodulated response signals generated in response to the probable pen touch have amplitude above a pen detection threshold and the demodulated response signals generated in response to a probable finger touch have amplitude above a touch detection threshold. When the identity of a touch is unclear, a pen touch is indicated if the ratio of filtered response signals generated in response to the pen touch to the filtered response signals generated in response to a finger touch is greater than a predetermined threshold. For example, in some embodiments predetermined threshold may be 1.0.

The first filter and the second filter may comprise hardware filters and can be arranged to operate in parallel. Alternatively, the first and second filters may be implemented by digital signal processing.

As previously discussed, an active pen and a touch sensor may establish a communication connection over which non touch location information is conveyed between the pen and touch sensor. In some embodiments, the range of the communication connection between a touch sensor and pan is limited to reduce the possibility of unintentional communication with other touch sensors and/or pens that are in the vicinity. The wireless communication connection may comprise a radio frequency (RF) connection, for example, that may comply with at least some of the communication protocols of a Wi-Fi® or Bluetooth® connection, for example.

Figure 19:
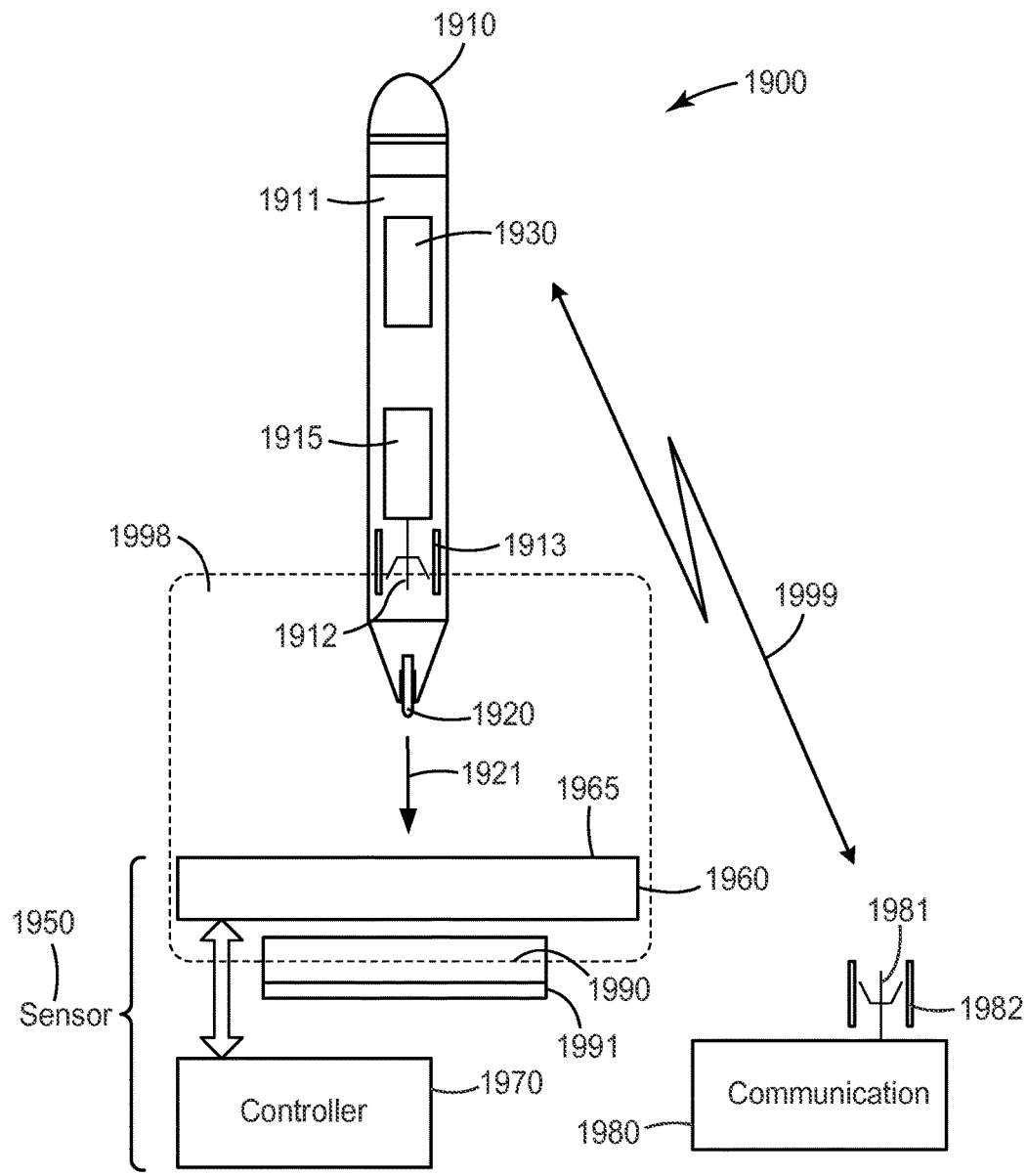
FIG. 19 is a block diagram of a touch system that includes antennas arranged to beamform a transmitted communication signal.

FIG. 19 illustrates a touch system 1900 comprising a sensor 1950 and an active pen 1910. The touch sensor includes a panel 1960 with a surface 1965. The sensor may employ capacitive, electromagnetic, optical, or other sensing techniques to locate pen 1910. Controller circuitry 1970 is configured to acquire touch information from the panel 1960 based a pen drive signal 1961 emitted by the pen 1910. The sensor 1950 also includes sensor communication circuitry 1980 configured to transmit and receive wireless communication signals to provide a communication connection 1999 between the sensor 1950 and the active pen 1910. The sensor communication circuitry includes at least one antenna 1981 configured to transmit and/or receive communication signals to/from the pen. In some embodiments, the sensor is a capacitive touch sensor and the panel includes an array of drive and receive electrodes capacitively coupled at nodes where the receive electrodes and drive electrodes cross. The wireless communication signal can be transmitted on one or more of the drive and receive electrodes. An electromagnetic shield 1982 may be used to attenuate and/or shape the communication signal transmitted from the sensor 1950.

The at least one antenna 1981 may comprise one or more dipole antennas and/or one or more patch antennas, for example. The antenna(s) 1981 may be disposed along a surface of the panel 1960 opposite to the surface 1965 and/or may be arranged along an edge of the panel 1960 or in other suitable locations. For example, in laptop implementations, the antenna(s) 1981 may be arranged under the keyboard or along the portion of the case that supports the keyboard.

In some implementations, the system 1900 includes a display visible through the panel 1960, and the wireless communication signal is transmitted via an antenna located along an opposite surface of the display from the panel 1960.

In some embodiments the sensor communication circuitry 1980 includes at least two antennas arranged to beamform the transmitted communication signal by focusing the transmitted communication signal through at least one of constructive and destructive interference. The at least two antennas may comprises a phased antenna array, wherein the amplitude and/or phase of the communication signal are adjusted to achieve a specified transmission signal range and/or shape. The focused signal may have a working range of less than 3 meters or even less than 0.3 meters from the panel surface. For capacitive touch sensors, the at least two antennas may include the drive and/or receive electrodes of the capacitive touch panel.

The sensor may include shielding 1982 that limits the working range of the wireless communication signal 1999. For example, the shielding may include a ground plane connected and arranged to electromagnetically shield the wireless signal. In some embodiments, the system includes a display 1990 visible through the panel 1965. A ground plane 1991 may be located along an opposite surface of the display from the panel 1960.

The communication signal transmitted from the sensor may be beamformed, attenuated, shielded, and/or otherwise shaped and/or constrained such that at least 50%, of the radiated energy of the communication signal is in a rectangular volume encompassed by the edges of the panel 1960 and a plane about 0.3 meters above the panel surface 1965. In some implementations, at least 50% of the energy of the transmitted communication signal is radiated within a volume that is substantially perpendicular with respect to the panel surface 1865.

The pen includes a pen body 1911 with a pen tip 1920 configured to make contact with a surface 1965 of the sensor 1950. Pen drive circuitry 1930 is disposed within the pen body 1911 and is configured to generate the pen drive signal 1921. Pen communication circuitry 1915 transmits and receives wireless communication signals to provide the communication connection 1999 between the sensor 1950 and the pen 1910. The pen communication circuitry includes at least one antenna 1812 configured to transmit and/or receive signals to/from the sensor 1950. An electromagnetic shield 1913 may be used to attenuate and/or shape the communication signal transmitted from the pen 1910. In some embodiments, the communication connection between the sensor and the pen has a working range 1898 of less than about 3 meters, such as about 0.3 meters.

The communication signal transmitted from the pen 1910 may be beamformed, attenuated, shielded, and/or otherwise shaped and/or constrained such that at least 50%, at least 60%, at least 70%, or at least 80% of the radiated energy of the communication signal is in a volume within about 0.3 meters from the pen body 1911. For example, in capacitive touch systems, the pen may be configured to transmit and receive communication signals at a range comparable to the range of capacitively coupled signals carried on drive electrodes of the touch sensor. In some implementations the communication connection may be disabled until the capacitively coupled signal is detected.

Detection of communication signals from the sensor by the pen or communication signals from the pen to the sensor indicates the proximity of the pen to the sensor. In some implementations, the sensor communication circuitry 1980 may be configured to detect the pen 1910 when the pen is in proximity to the panel 1960 and to convey pen proximity information to the sensor controller 1970 before the pen drive signal 1921 is detected by the controller 1970. To conserve power, transmissions from the sensor and/or the pen may be disabled when the pen and sensor are outside the working range of the communication connection. In embodiments using capacitive pen and touch detection, the communication signal transmitted by the pen may be used by the touch sensor controller to confirm that a touch signal detected by the controller is produced by the pen drive signal.

As previously discussed herein, some active pens used with capacitive touch sensors receive a touch sensor drive signal and emit a pen drive signal in response. This type of pen is referred to herein as a "transponder pen."

Tilting a pen can have a significant effect on the measured position of this type of active pen, particularly if the pen has a transmit or receive portion located an appreciable distance back from the pen tip which makes contact with the touch panel at the touch location. It is preferable that location-determining signals are passed through the pen tip, which is less affected by tilting the pen. According to some embodiments disclosed herein, location of the pen relative to sensor receive electrodes may be calculated based on signals emitted from the pen tip. Location of the pen relative to sensor drive electrodes will be calculated based on signals received at the tip.

A transponder pen body includes a receiver portion configured to receive the sensed drive signals present on the sensor drive electrodes, and an emitter portion configured to emit pen drive signals, which capacitively couple to receive electrodes of a touch sensor. One of these (e.g., the proximal portion) is typically located at the tip (FIG. 10A, 1001*a*) of the pen where during operation, it is closest to the sensor. The other portion (the distal portion) is typically an annular conductive surface behind the tip, further from the sensor (e.g. the cone, shown in FIG. 10A, 1001*b*). The two portions are separated by an insulated grounded shield.

In some transponder pens, the proximal portion is the receiver portion and the distal portion is the emitter portion. When the pen is tilted, the proximal portion moves minimally relative to sensor electrodes, but the distal portion moves appreciably, causing an error in measured position of the pen relative to one dimension.

Embodiments disclosed herein involve a pen that reduces tilt error of the touch location. The pen body includes a first receiver/emitter portion proximal with respect to the touch location and a second receiver/emitter portion distal with respect to the touch location. Pen circuitry disposed within the pen includes receiver circuitry configured to receive a touch sensor drive signals from drive electrodes of the touch sensor. The pen receives the touch sensor drive signals through the first receiver/emitter portion during a first time period and receives the touch sensor drive signals through the second receiver/emitter portion during a second time period. The pen includes signal generator circuitry that generates a pen drive signal based on the received touch sensor drive signals. The pen emits the pen drive signal through the second receiver/emitter portion during the first time period and emits the pen drive signal through the first receiver/emitter portion during the second time period. For example, in some implementations, the first receiver/emitter portion may include all or a portion of the tip of the pen and the second receiver/emitter portion may comprise all or portion of the pen cone.

When the pen is used with a capacitive touch sensor, the pen capacitively couples with the touch panel of the touch sensor at the touch location. Signal generator circuitry of the touch sensor generates the touch sensor drive signals and typically applies the touch sensor drive signals sequentially to drive electrodes of the touch panel. Receiver circuitry of the touch sensor receives response signals present on the receive electrodes of the touch panel. Touch location circuitry determines the touch location based on response signals carried on the receive electrodes, wherein the response signals used to determine the touch location are capacitively coupled to the touch sensor drive signals and to the pen drive signal emitted during the first time period and the second time period. In some embodiments, the touch location along a first coordinate axis can be determined by the touch sensor using the response signals received by the touch sensor during the first time period. The touch location along a second coordinate axis can be determined by the touch sensor using the response signals received by the touch sensor during the second time period. Alternating the pen drive signal between distal and proximal portions of the pen body reduces tilt error in the touch location determined by the touch sensor.

Figure 20A:
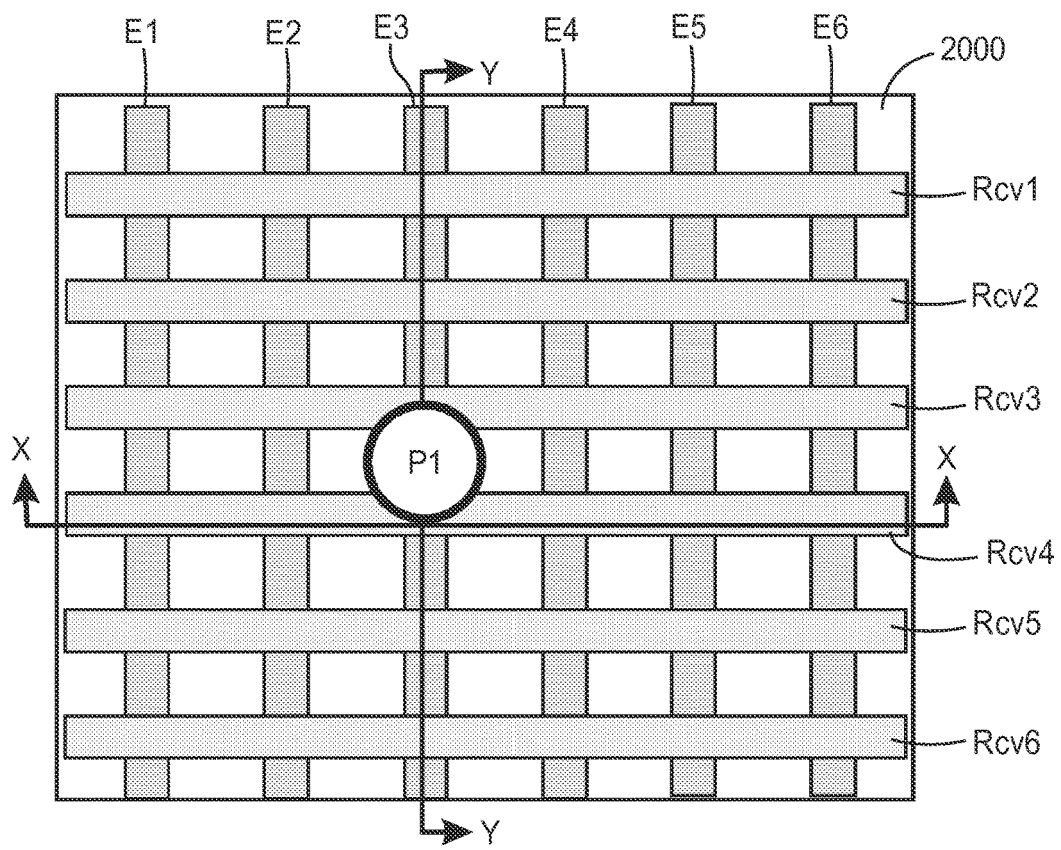
FIG. 20A shows a touch panel surface and the location of a pen touch on the touch panel surface.
Figure 20B:
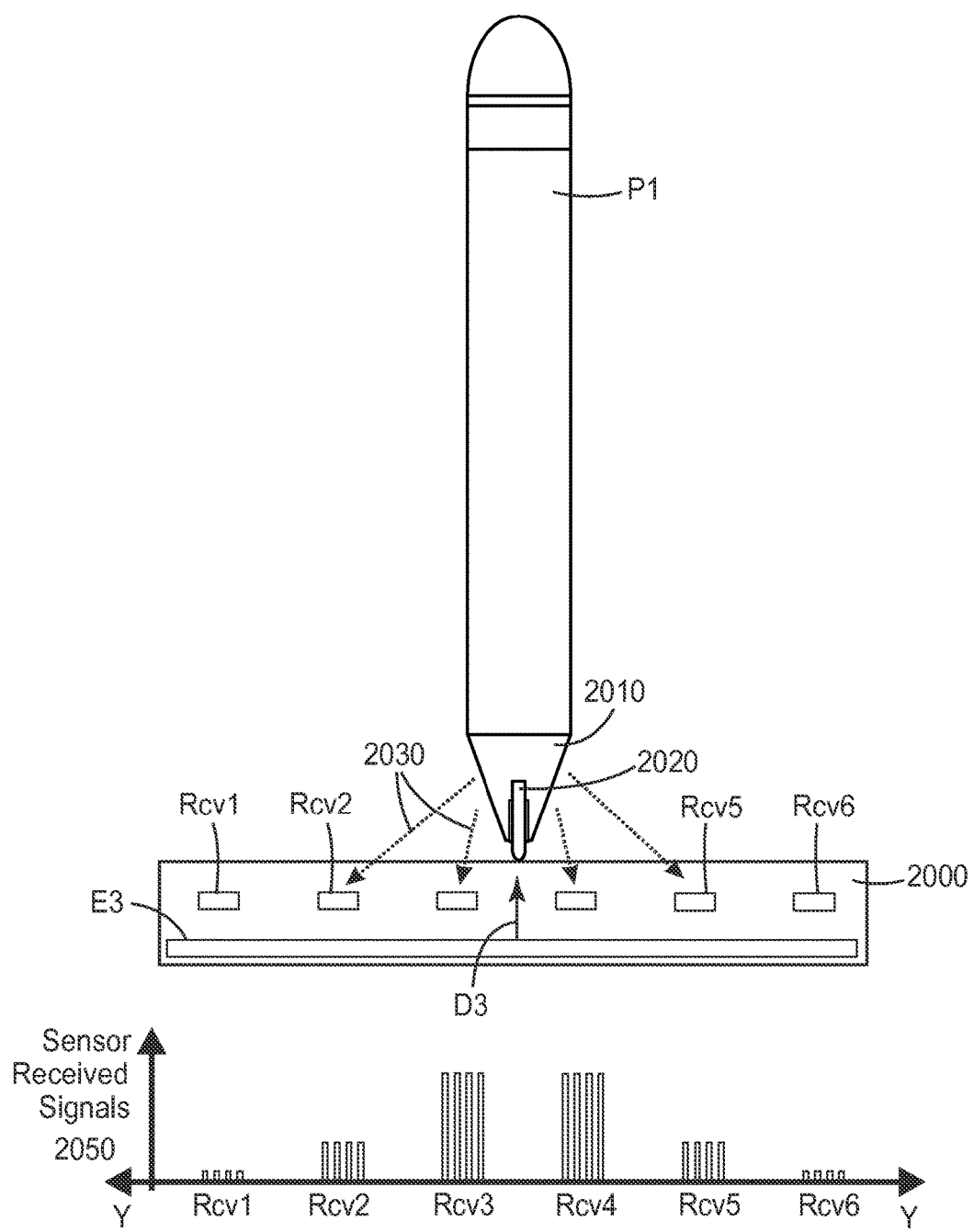
FIG. 20B shows a cross sectional view Y-Y of an electrode matrix of FIG. 19A with pen P1 emitting pen drive signals through a portion further (distal) with respect to the touch location and receiving sensor drive signals through a portion more nearer (proximal) to the touch location.

FIG. 20A shows a simplified sensor electrode matrix 2000 with drive electrodes E1-E6 and receive electrodes Rcv1-Rcv6. Pen P1 is located above E3, between Rcv3 and Rcv4. FIG. 20B shows a cross sectional view Y-Y of electrode matrix 2000 with pen P1 operating as a transponder pen emitting pen drive signal 2030 through a portion 2010 further (distal) with respect to the touch location and receiving sensor drive signal D3 through a portion 2020 more nearer (proximal) to the touch location. When sensor drive electrode E3 emits drive signal D3, pen P1 emits signal 2030 in response, and sensor receive electrodes Rcv1-Rcv6 receive signal 2030 with a magnitude proportional to each electrode's proximity to the pen emitter portion 2010, as indicated in graph 2050.

Figure 20C:
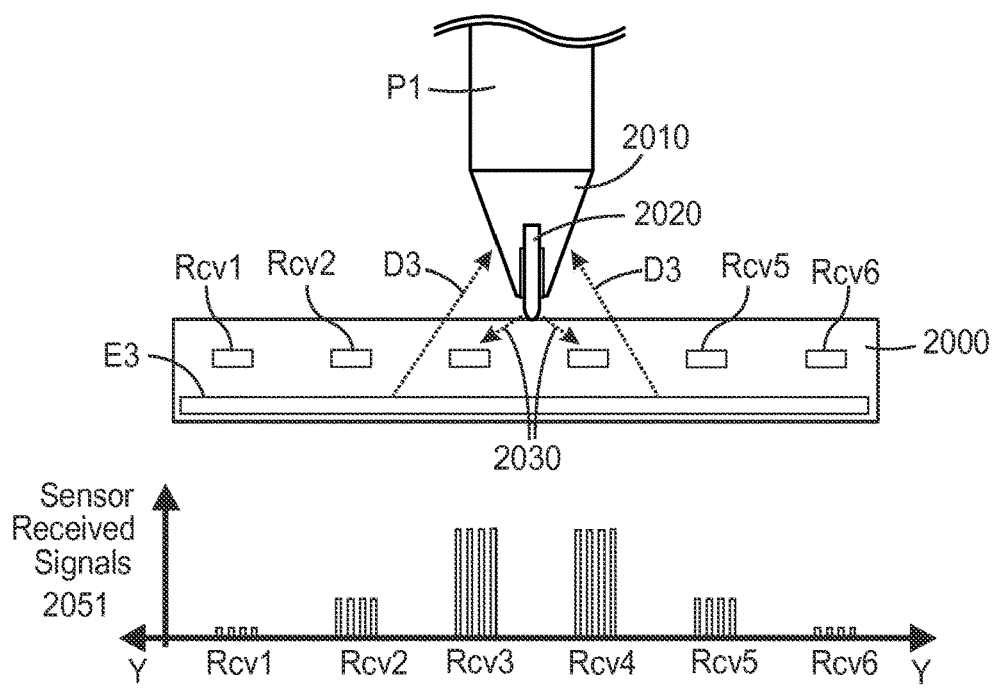
FIG. 20C shows a cross sectional view Y-Y of electrode matrix of FIG. 19A with pen P1 emitting pen drive signals through is proximal portion and receiving sensor drive signal through its distal portion.

FIG. 20C shows a cross sectional view Y-Y of electrode matrix 2000 with pen P1 emitting pen drive signals 2030 through is proximal portion 2020 and receiving sensor drive signal D3 through its distal portion 2010. When sensor drive electrode E3 emits drive signal D3, pen P1 emits signal 2030 in response, and sensor receive electrodes Rcv1-Rcv6 receive signal 2030 with a magnitude proportional to each electrode's proximity to the pen emitter portion 2020, as indicated in graph 2051.

When pen P1 is vertical, the use of proximal drive mode (FIG. 20C) vs. distal drive mode (FIG. 20B) will make little difference in the measurement of position of P1, as indicated by the similarity of graphs 2050 and 2051. However, if pen P1 is tilted to one side in a direction aligned with drive electrode E3, proximal drive and distal drive results may differ significantly.

Figure 20D:
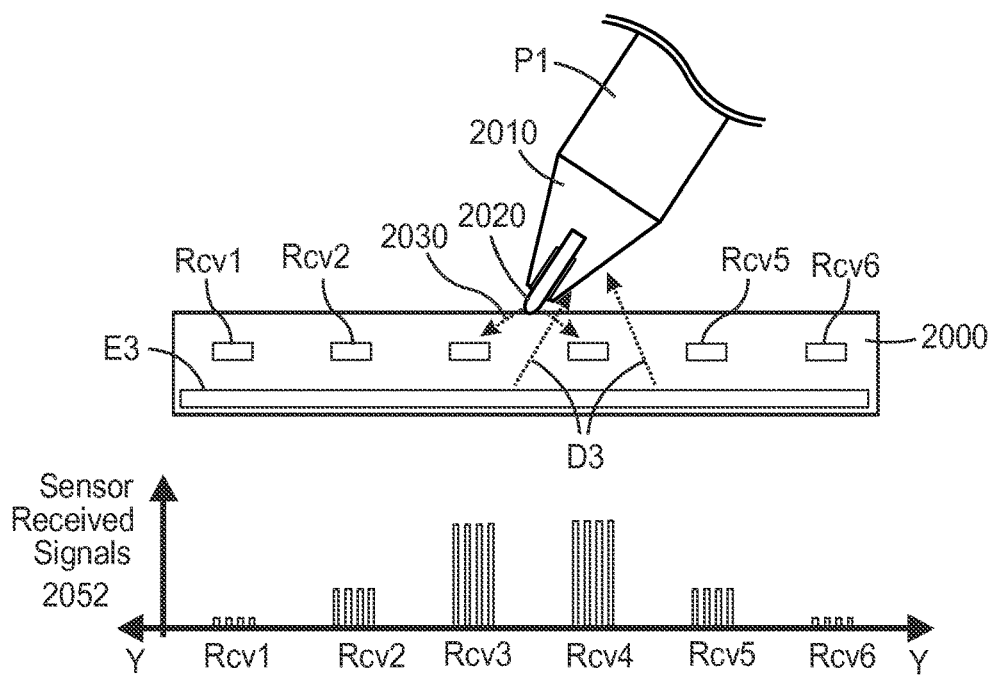
FIG. 20D shows view Y-Y of the electrode matrix of FIG. 19A, indicating a tilt in the Y direction and operating in proximal drive mode.

FIG. 20D shows view Y-Y of electrode matrix 2000, indicating a tilt in the Y direction. A portion of pen P1 is shown, tilted along the axis of drive electrode E3. P1 is operating in proximal drive mode, emitting pen drive signals 2030 through is proximal portion 2020 and receiving sensor drive signal D3 through its distal portion 2010. Tilting of pen P1 may move proximal portion 2020 slightly closer to receive electrode Rcv4, but the change in capacitive coupling between portion 2020 and nearby Rcv electrodes is minor, and graph 2053 indicates the signals on electrodes Rcv1-Rcv6 will result in minimal change in the measured position of P1 relative to Rcv electrodes, compared to measurements of graph 2050 with no pen tilt.

The coupling between drive electrode E3 and distal portion 2010 has moved to the right along electrode E3, but this will not affect the measured location of P1 in the axis perpendicular to drive electrodes, (e.g. movement along a vertical electrode does not affect horizontal location measurements). The magnitude of capacitive coupling between 2010 and E3 may increase if 2010 is closer to E3 due to tilting, but since pen P1 is aligned with the axis of electrode E3, the relative magnitude of capacitive coupling between pen P1 and the closest drive electrodes E3, E2, and E4 increase or decrease proportionally, so the measured location of pen P1 will change minimally in the axis perpendicular to drive electrodes.

Figure 20E:
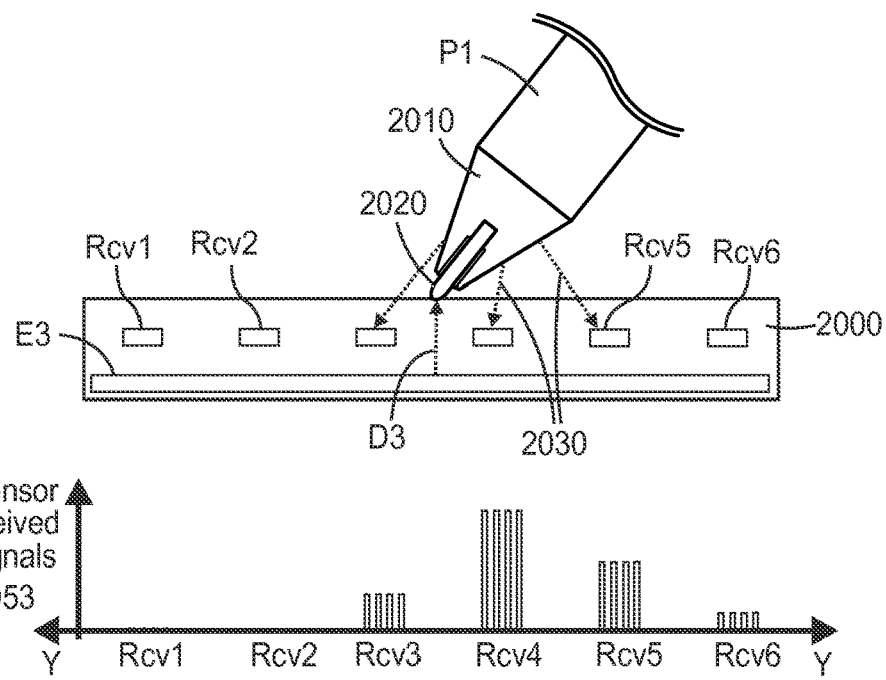
FIG. 20E shows the same view Y-Y of electrode matrix of FIG. 19A with pen P1, tilted in the same position as in FIG. 19D wherein P1 is operating in distal drive mode.

FIG. 20E shows the same view Y-Y of electrode matrix 2000 with pen P1, tilted in the same position as in FIG. 20D. P1 is operating in distal drive mode, emitting pen drive signals 2030 through is distal portion 2010 and receiving sensor drive signal D3 through its proximal portion 2020. Tilting of pen P1 moves distal portion 2010 significantly, and pen drive signals 2030 couple more strongly to electrodes Rcv4 and Rcv5 than to Rcv3, resulting in a change in the profile of received signals in graph 2053, relative to signals in graph 2050. Thus, tilting pen P1 results in a shift in measured position relative to sensor receive electrodes. There is minimal change in coupling between E3 and portion 2020, so there is minimal change in measured position relative to drive electrodes, compared to non-tilted pen P1 operating in distal drive mode, (FIG. 20B).

Figure 20F:
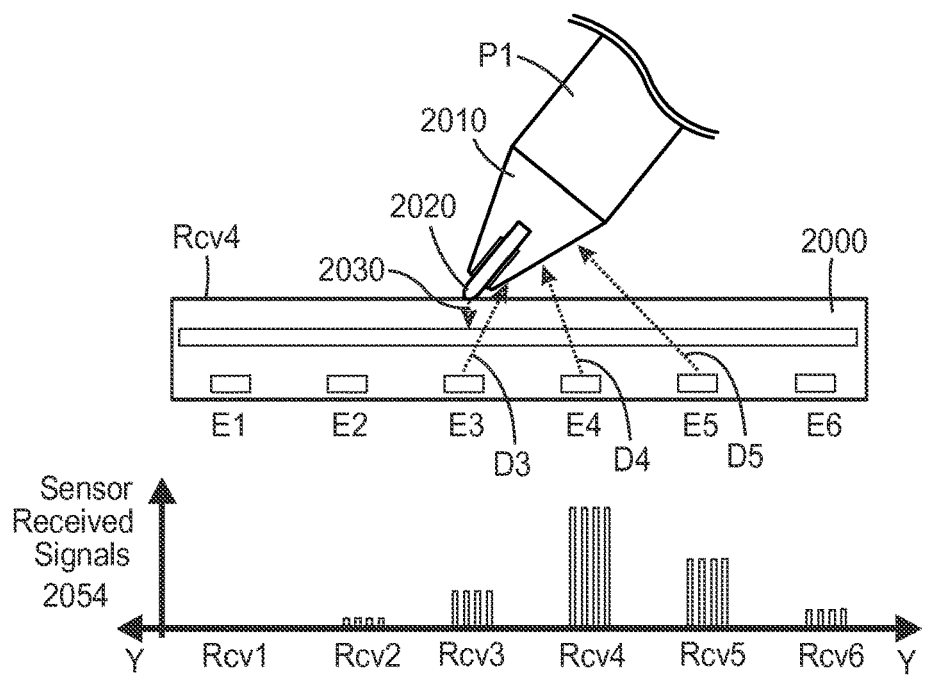
FIG. 20F shows view X-X of the electrode matrix of FIG. 19A, indicating a tilt in the X direction.

FIG. 20F shows view X-X of electrode matrix 2000, indicating a tilt in the X direction. The effect of tilting pen P1 is similar to tilting in the Y direction, but in this case the tilt affects the coupling between pen P1 and drive electrodes D1-D6. A portion of pen P1 is shown, tilted in the axis of receive electrode Rcv4. P1 is operating in proximal drive mode, emitting pen drive signals 2030 through is proximal portion 2020 and sequentially receiving sensor drive signal D3, then D4, then D5 through its distal portion 2010. Tilting of pen P1 may move proximal portion 1720 minimally, but the change in capacitive coupling between distal portion 2010 and nearby sensor drive electrodes E3, E4, and E5, is significant, so the measured position in the X dimension will be significantly affected by tilt. In the example shown, the profile of signals shown in graph 2054 would be interpolated to yield a measured position between electrodes E4 and E5, when the tip of pen P1 is actually located over E3.

Figure 20G:
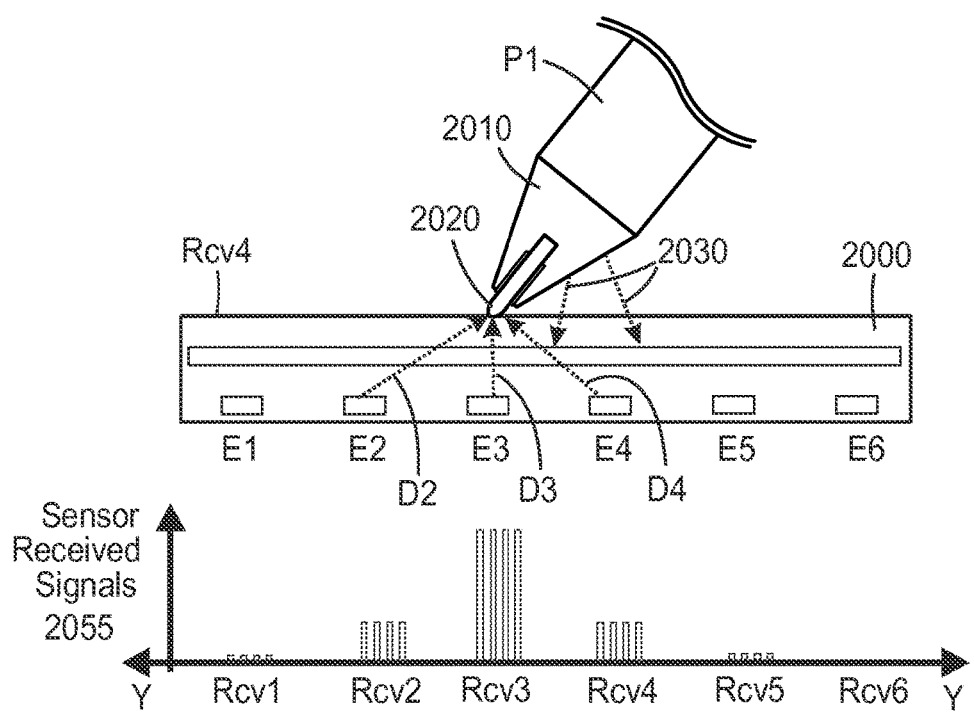
FIG. 20G shows view X-X of the electrode matrix of FIG. 19A, indicating a tilt in the X direction as in FIG. 19F, wherein P1 is operating in distal drive mode.

FIG. 20G shows view X-X of electrode matrix 2000, indicating a tilt in the X direction as in FIG. 20F. P1 is operating in distal drive mode, emitting pen drive signals 2030 through is distal portion 2010 and sequentially receiving sensor drive signal D2, then D3, then D4 through its proximal portion 2020. Tilting of pen P1 may move proximal portion 2020 minimally. In the example shown, the profile of signals shown in graph 2055 would be interpolated to yield a measured position above electrode E3, which corresponds to the location of the tip of sensor P1.

The change in capacitive coupling between distal portion 2010 and nearby sensor receive electrodes Rcv4 and Rcv3 is significant, but the measured position in the X dimension is minimally effected because the relative magnitude of signals 2030 received by Rcv4 relative to Rcv3 remains nearly constant.

As discussed herein a pen alternates between proximal drive and proximal receive modes, and pen position with respect to sensor receive electrodes may be measured using proximal drive mode, and pen position with respect to sensor drive electrodes may be measured using proximal receive (distal drive) mode.

In some embodiments, alternating the drive/receive modes is combined with the use of non-linear signals. For example, if a transponder pen uses one drive mode to measure the touch location in both X and Y dimensions, then signals emitted by the pen are preferably proportional to sensed drive signals. This is preferable because the pen's emitted signal must contain information about magnitude of drive signal in order to interpolate the pen's location with respect to drive electrodes.

If the pen uses separate drive/receive modes (and two separate time periods) to determine pen location in two dimensions, then the signal emitted by pen P1 during proximal drive mode need not be proportional to sensed drive signals. Instead, in some embodiments the signal emitted by the pen may have a predetermined magnitude, e.g., maximum magnitude. For example, any received touch sensor drive signal greater than a threshold value may be converted to a fixed magnitude signal, e.g., maximum magnitude. For example, the pen circuitry may comprise a comparator to compare the received touch sensor drive signal to one or more thresholds. A pen drive signal including pulses at a fixed amplitude conveys location in one dimension. In implementations wherein the fixed amplitude is a relatively large (or maximum) amplitude, the pen drive signal provides a sequence of relatively high magnitude signals that can improve signal to noise ratio. In some scenarios, the response signals that are responsive to the pen drive signal may be used to discriminate a pen from a finger touch. For example, in FIG. 23B, signals 2371, 2372, and 2373 indicate a pen touch because the profile comprising a sequence of three equally modified signals with near-zero change in adjacent signals (2370 and 2378) would be rare for a finger touch.

Also, pen vs. finger discrimination is enhanced by the uniqueness of signals resulting from alternating modes. First, a pen that alternates modes will emit different signals on every other scan, unlike a finger touch.

Figure 21:
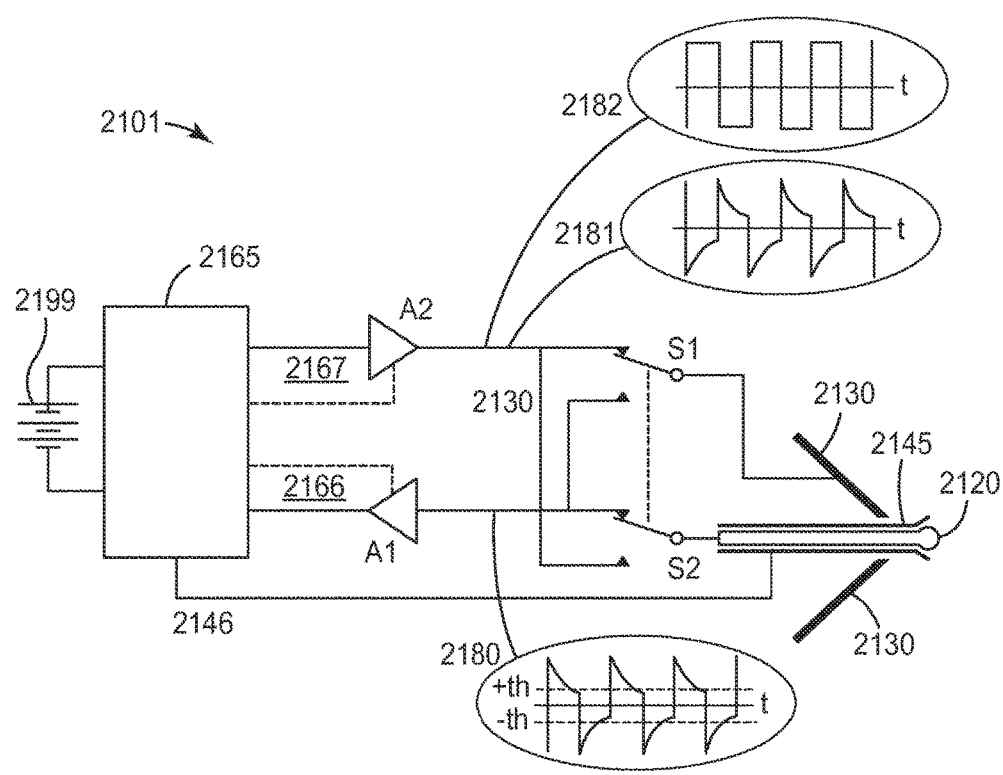
FIG. 21 shows a simplified schematic of a pen with circuitry that alternates between proximal drive and proximal receive.

FIG. 21 shows a simplified schematic of pen 2101 with circuitry that alternates between proximal drive and proximal receive. Proximal portion 2120 (tip) connects to switch S2 that connects 2120 to receiver amplifier A1, or to pen drive amplifier A2. Distal portion 2130 (cone) connects to switch S2 that connects 2130 to receiver amplifier A1, or to pen drive amplifier A2.

With S1 and S2 in positions shown, a sensed drive signal 2180 is received from a sensor (not shown) and conducted to amplifier A1, which buffers the signal and amplifies it. From A1 the signal is processed by signal conditioner 2165 that controls the modulation of signal 2180. As stated previously, modulation may comprise amplitude modulation, phase modulation, quantization, storage and re-transmission after a delay, and/or code modulation.

After processing by signal conditioner 2165, a signal is buffered and amplified by amplifier A2, which applies a pen drive signal to emitter portion of pen 2101. With switch S1 in the position shown, the emitter portion is distal portion 2130. Graphs 2181 and 2182 show two exemplary signal waveforms that may be emitted from pen 2101, resulting from application of different modulation types in signal conditioner 2165. One modulation type is inverting amplification, whereby a linear gain and inversion is applied to signal 2180, resulting in signal waveform 2181 which is emitted by pen 2101. Signal waveform 2181 is proportionate to signal 2180, and is larger in magnitude.

Alternatively, signal 2180 may be quantized, and processed, by signal conditioner 1365, for example, in a window comparator mode, portions of signal 2180 that exceed positive threshold +th may trigger a flip-flop to latch at a high output level, and signals that exceed threshold −th may cause the flip-flop to reset back to a low level. The output of the flip-flop may then be applied to amplifier A2 which amplifies it to the square shape of signal 2182, with high and low magnitudes equal to the maximum limits of A2 output range.

In another embodiment, signal conditioner 2165 may comprise the window comparator described above, and also a sampling circuit that samples the magnitude of signals 2180, (after amplification by A1). The comparator and flip-flop define the positive and negative edges of resulting signal 2182 as described above, and signal conditioner 2165 may control the amplitude of signal 2182 so it is proportional to the sampled magnitudes of signal 2180, rather than maximum, fixed high and low values. Thus, signal conditioner 2165 may generate signals that are proportional to signals 2180, and also modified to be modified in shape (e.g. squared off), and phase additive or phase subtractive with respect to signals 2180.

Signal 2167 is a gain control of amplifier A2. A lower gain may be required to maintain A2 in a linear operating range when A2 is a linear amplifier. The gain of A2 may be increased when A2 operates in non-linear switched output mode as shown with respect to signal waveform 2182. Amplifier A2 may be switched to zero gain for the purpose of emitting a code digit comprising a null, (zero-signal) symbol.

Signal 2166 is a gain control of amplifier A1, which may be used to modulate pen received signals, and to mitigate positive feedback. A portion of the signal on the pen emitter portion is coupled to the pen receive portion, and this feedback may cause undesirable interference. Some functions of signal conditioner 2165 may generate positive feedback, for example the comparator mode that generates signal waveform 2182 may be in phase with signal 2180, as shown. To avoid interference, gain control 2166 may reduce the gain of amplifier A1 to near zero during transitions of waveform 2182. For example, with reference to the comparator function discussion above, the gain of A1 may be adjusted to zero when thresholds +th or −th are crossed, but before the flip-flop is triggered, and may remain at zero for a time sufficient for the transition of signal waveform 2182. The input of amplifier A1 may also be momentarily connected to ground during transitions of signal 2182 to further mitigate interference.

Signal 2146 controls shield 2145, to further reduce feedback from the pen emitter portion to the pen receiver portion. Signal 2146 may connect shield 2145 to a low impedance DC level such as local ground, or a signal may be applied to shield 2145. Pen 2101 may be powered by battery 2199. Additional functions (not shown) may be present in pen 2101, for example an RF transceiver, microprocessor, and memory.

A transponder type pen preferably senses one or more sequential measureable signals from the drive electrodes closest to the pen location during each scan of a sensor. In some embodiments, the pen may measure the sensed signals, and perform a transfer function on the sensor drive signals, then re-transmit them in a pen drive, e.g., with minimal delay. In some embodiments, a delay may be added before the retransmission as discussed in more detail below.

Figure 23A:
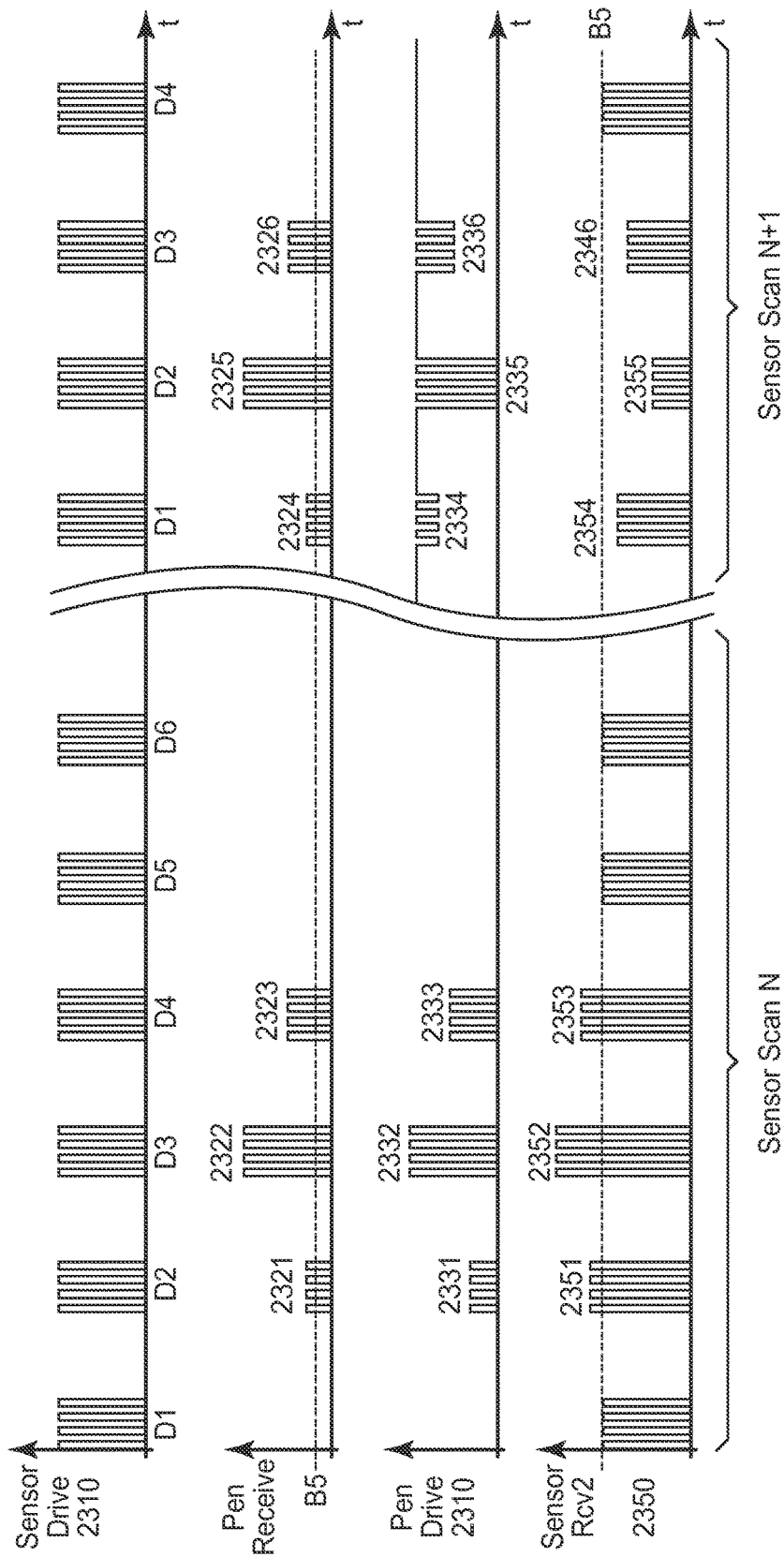
FIG. 23A illustrates modification of the received touch sensor drive signal by amplitude modulation.
Figure 23B:
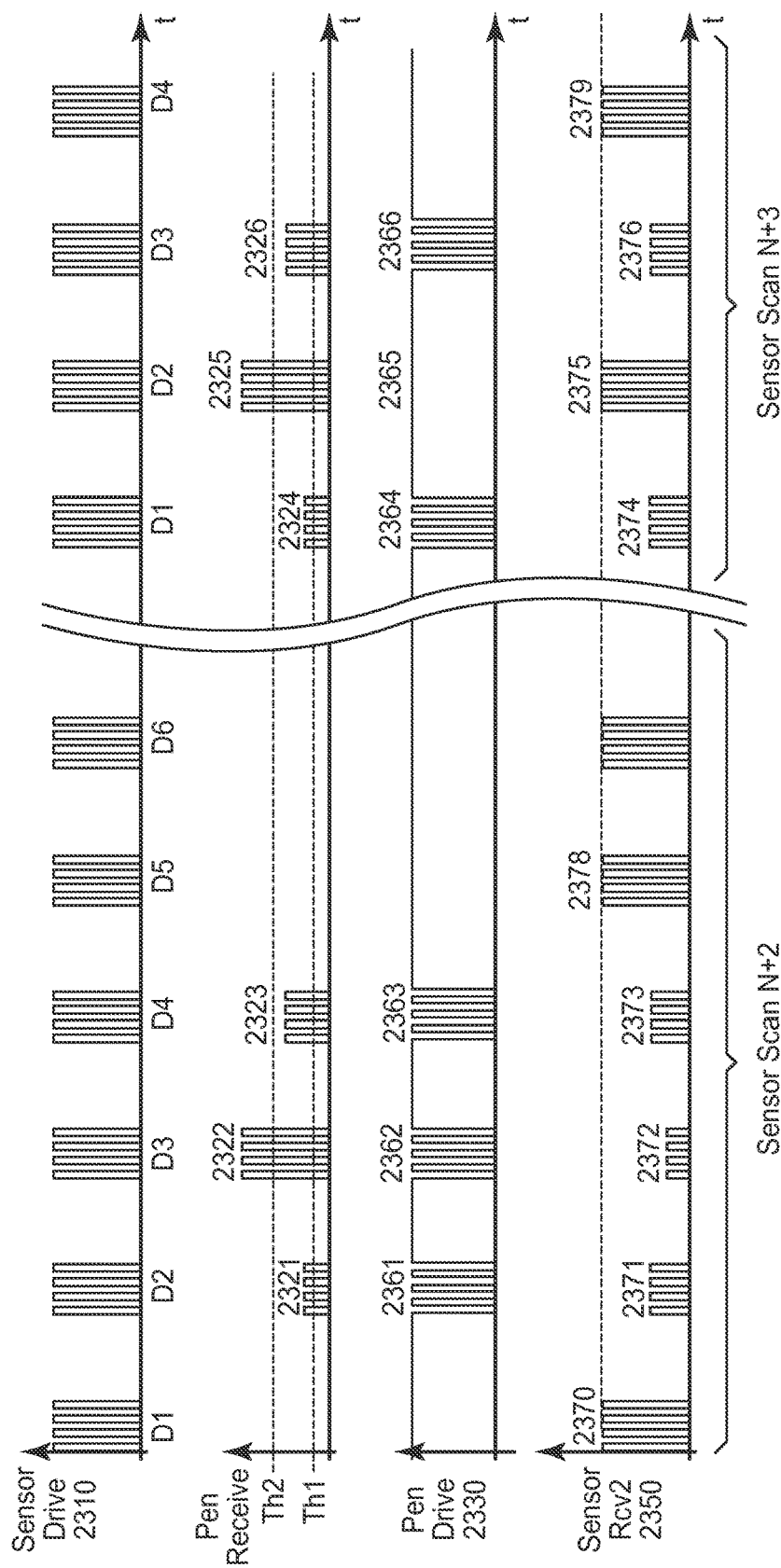
FIG. 23B illustrates modification of received touch sensor drive signals using a quantization approach.
Figure 23C:
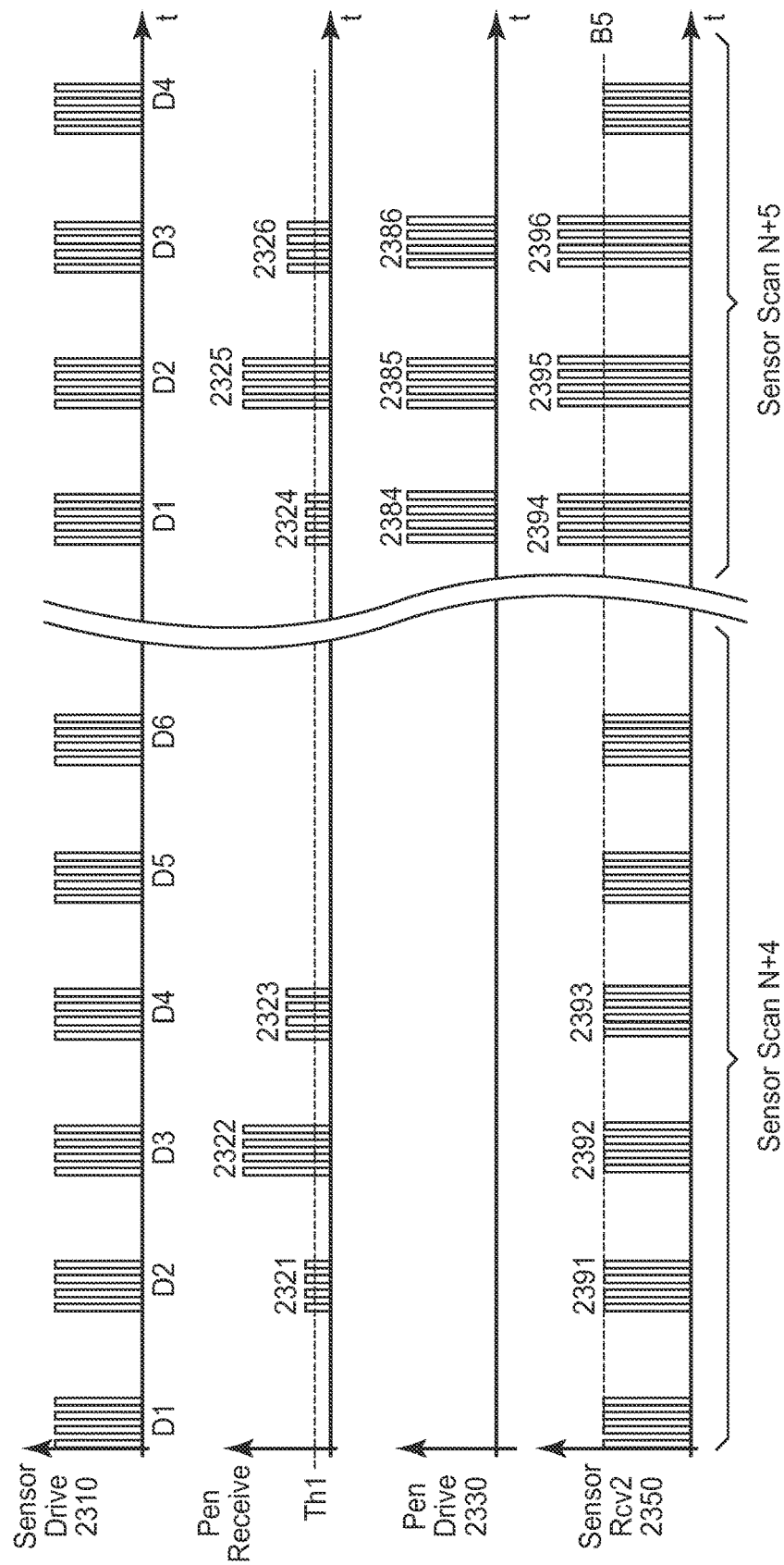
FIG. 23C illustrates modification of the received touch sensor drive signals wherein the pen receives touch sensor drive signals and emits no pen drive signal.

FIGS. 23A-C show examples of signals from a capacitive transponder pen system wherein each of the sequential pen received signals is modified with transfer function that may represent a digit of a code.

The use of pen codes having digits with three or more states allow for more unique code symbols when compared to binary codes that only use binary digits. Non-linear modulation may be used to increase the number of possible "symbols" used in a code. For example, binary code digits have only two possible symbols per digit. Octal digits have eight unique symbols, etc. A code digit may be emitted by a pen during the active period that a pulse train is applied to one drive electrode, or a two-part code digit may be emitted during two (or more) sequential active periods. The active period is per row and can consist of 1-10 pulses per row, for example.

In some embodiments, code digits may have three or more states, so pen codes can be conveyed in fewer digits and/or fewer digitizer scans. Electromagnetic (E-M) transponder pens may detect pen received signals and alter their phase in predefined ways to encode information such as pen tip pressure and/or other information. In some embodiments, 1000 levels of pressure are encoded in a single pen emitted signal, (symbol) in response to a single sensor drive signal. E-M pens typically start emitting during a sensor drive signal, and the modified, re-transmitted pen drive signal is measured after each sensor drive signal ends.

In some embodiments, real time synchronization through a second communication connection, e.g., RF, Wi-Fi®, Bluetooth® is not required. In some embodiments, one message conveyed via the second communication connection per scan cycle of the touch panel is sufficient to synchronize pen codes. In some embodiments, multiple pens can be detected and separately located in X and Y dimensions, based on signal magnitudes measured in the receive electrodes. In some embodiments, multi-pen location in X and Y can be performed, independent of coding.

As previously discussed, a touch panel emits touch drive signals on sequentially driven drive electrodes and senses response signals on receive electrodes. Various transfer functions may be performed on the sensor drive signals received by the pen circuitry to generate the pen drive signal. Some transfer functions may operate substantially equally on the sensor drive signal received by the pen from multiple, e.g., two or three, drive electrodes closest to the touch location. Some transfer functions may operate on the received sensor drive signal received from each of the multiple drive electrodes differently. After the pen circuitry applies the transfer function, the pen re-transmits the transformed signal as a pen drive signal which is modified according to a code. For example, a digit of the code may be represented by modifications comprising pen drive signal that is a phase-modified or amplitude-modulated form of the received sensor drive signal. In these implementations, the pen receives a touch drive signal from several drive electrodes nearest to the touch location and re-transmits pen drive signal of proportional magnitude to the touch drive signal received from each of the drive electrodes. The resulting pen drive signal may be used by the sensor to indicate presence of a pen and/or to indicate the touch location with respect to drive electrodes. Because the pen drive signal is proportional to the sensor drive signal received from the drive electrodes nearest to the touch location, the pen drive signal may be used in interpolation algorithms and locate the touch location with respect to the drive electrodes near the touch location. The phase or amplitude modified pen drive signal may also indicate a digit of the pen code.

Figure 22:
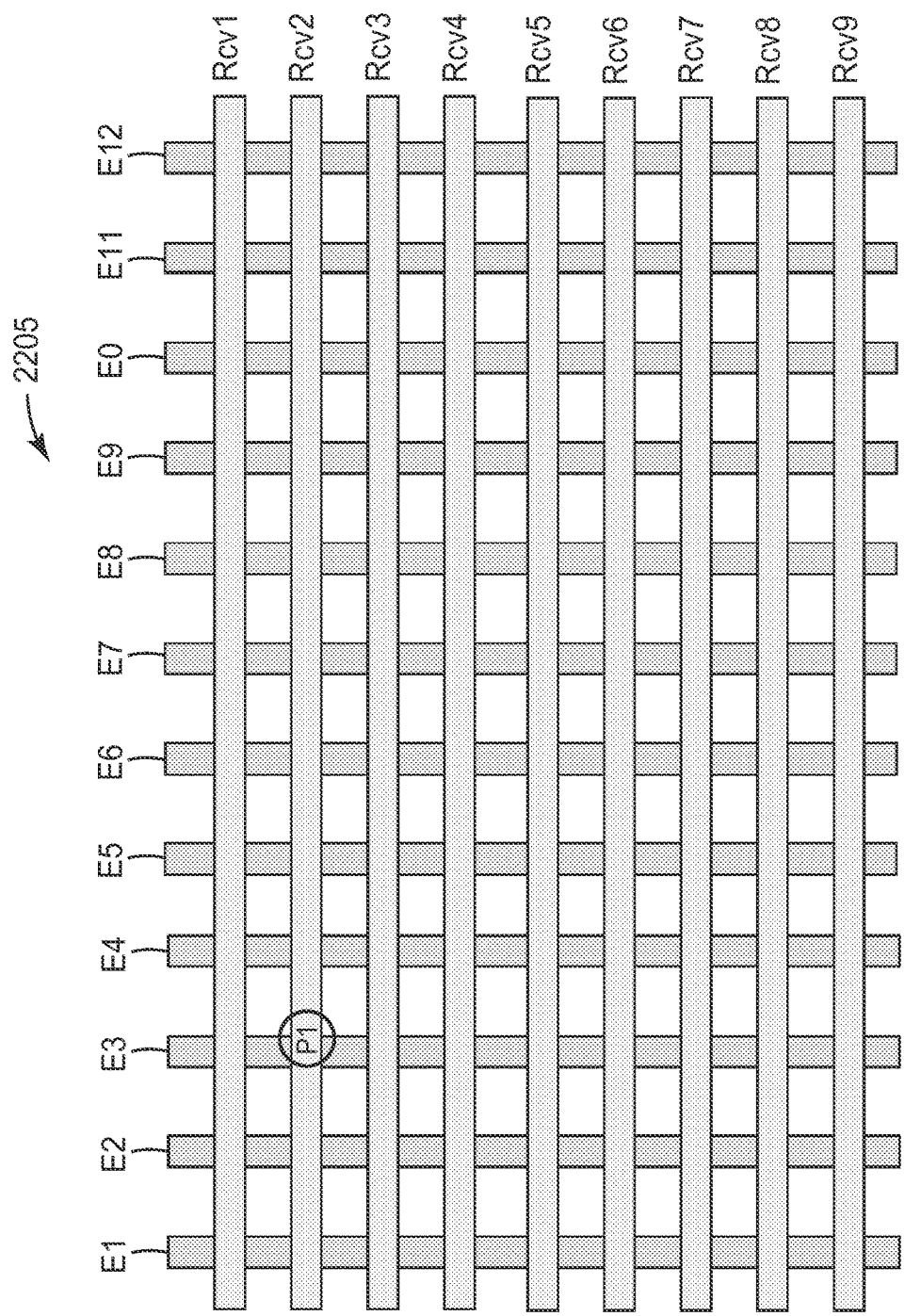
FIG. 22 shows a touch panel having twelve drive electrodes and nine receive electrodes.

FIG. 22 shows signals of capacitive touch panel 2205 having twelve drive electrodes E1-E12 and nine receive electrodes Rcv1-Rcv9. Touch drive signals are driven sequentially onto twelve drive electrodes E1-E12. During each scan of the touch panel 205, pe2n P1 will sense signals that are capacitively coupled from the closest touch drive electrodes to the pen, (E2, E3, and E4) and perform a transfer function on the received touch sensor drive signal, and re-transmit a pen drive signal to the nearest receive electrodes, (Rcv1, Rcv2, and Rcv3).

FIGS. 23A-C show touch drive signals 10, driven sequentially onto drive electrodes of touch panel 2105. Drive electrode E1 is driven during time D1, E2 is driven during time D2; E3 is driven during time D3, etc. Stylus P1 is located above electrode E3, offset slightly closer to E4 than E2, as indicated by the magnitudes of the signals 2321, 2322, 2323 that are coupled to the stylus.

According to some embodiments, the pen drive signal is an amplitude-modulated version of the touch sensor drive signal received by the pen. The first scan cycle shown in FIG. 23A (sensor scan N) illustrates modification of the received touch sensor drive signal by amplitude modulation. Portions of two sensor scan cycles are shown in FIG. 23A. During sensor scan N, pen P1 receives touch sensor drive signals 2321, 2322, and 2323, amplifies these signals, and re-transmits them with minimal phase shift. The relative magnitudes of 2321, 2322, and 2323 are preserved in the pen drive signals 2331, 2332, and 2333. Pen drive signals 2331, 2332, and 2333 are coupled most strongly to receive electrode Rcv2, where signals 2351, 2352, and 2353 comprise inter-electrode coupling directly from E2, E3, and E4 to Rcv2, combined with pen drive signals 2331, 2332, and 2333 to yield sensor received signals 2351, 2352, and 2353.

The signal on Rcv2 may be used to locate stylus P1 by interpolation, using the differences in signals 2351, 2352, and 2353 relative to baseline B5. In-phase additive signals like 2351, 2352, and 2353 cannot be generated by a passive touch, so these signals indicate a pen at the P1 location.

According to some embodiments, the pen drive signal is a phase-modulated version of the touch sensor drive signal received by the pen. Sensor scan N+1 of FIG. 23A illustrates phase modulation of the received touch sensor drive signal. During sensor scan N+1, pen P1 receives signals 2324, 2325, and 2326, inverts these signals, and re-transmits them with 180° phase shift. The relative magnitudes of 2324, 2325, and 2326 are preserved in the pen drive signals 2334, 2335, and 2336. Pen drive signals 2334, 2335, and 2336 are coupled most strongly to receive electrode Rcv2, where signals 2354, 2355, and 2356 comprise inter-electrode coupling directly from D2, D3, and D4 to Rcv2, combined with pen drive signals 2331, 2332, and 2333 to yield sensor received signals 2351, 2352, and 2353.

Signal Rcv2 may be used to locate stylus P1 by interpolation, using the differences in signals 2354, 2355, and 2356 relative to baseline B5. Opposite-phase signals like 2354, 2355, and 2356 are similar to those generated by a passive touch, so it is preferable that these signals are used as symbols in a code sequence that includes other symbols generated by other modulation types. FIG. 23A shows a code sequence of two digits, one emitted during Scan N, and the next emitted during scan N+1. These digits convey a code that could be used to locate a pen and identify it among pens with other code sequences.

According to some embodiments, the pen drive signal is a quantized form of the received touch sensor drive signal, e.g. the output is a fixed high level if the received touch sensor drive signal is above a threshold and a fixed low level if the stylus input signal is below a threshold. Pen drive signals that are a quantized form of the touch sensor drive signals may be used to detect touch presence and to convey a pen code. Modification of received touch sensor drive signals using a quantization approach is illustrated in FIG. 23B, scan cycle N+2. During sensor scan N+2, pen P1 receives signals 2321, 2322, and 2323, compares them to a threshold value Th1, and re-transmits the inverted comparator output. The relative magnitudes of 2321, 2322, and 2323 are not preserved in the pen drive signals 2361, 2362, and 2363. Pen drive signals 2361, 2362, and 2363 are coupled most strongly to receive electrode Rcv2, where signals 2371, 2372, and 2373 comprise inter-electrode coupling directly from D2, D3, and D4 to Rcv2, combined with pen drive signals 2361, 2362, and 2363.

Signal Rcv2 may be used to indicate the presence of pen P1 at an approximate location, and interpolation may be used to locate P1. Diminished signals like 2371, 2372, and 2373 are similar to those generated by a passive touch, but the profile of equal-size signals 2371, 2372, and 2373 flanked by signals 2370 and 2378 having minimal change would be unusual for a passive finger touch, so a code symbol comprising this signal profile is indicative of a pen.

In some implementations, the pen drive signal is a quantized form of the received touch sensor drive signal relative to two thresholds, e.g. the pen drive signal is a fixed first magnitude, e.g., a fixed high level, if the received touch sensor drive signal is above one threshold and a fixed second magnitude, e.g., a fixed low level, if the received touch sensor drive signal is above a second threshold. The pen detects received touch sensor drive signals that greater than a threshold touch drive signals and re-transmits pen drive signals of a fixed first magnitude to indicate a digit of the stylus code. Stylus detects received touch sensor drive signals that are below a threshold and re-transmits a pen drive signal of a fixed second magnitude. For example, in some implementations, if the pen detects touch sensor drive signals greater than a first threshold and re-transmits pen drive signals of fixed magnitude. If the pen detects touch sensor drive signals greater than a second threshold, the pen emits pen drive signals of zero magnitude to indicate a digit of the pen code.

Pen drive signals that are a quantized version of received touch sensor drive signals provide resulting response signals detected by the touch sensor that may be used to indicate presence of a pen and/or to indicate a digit of the stylus code.

Scan cycle N+3 illustrated in FIG. 23B illustrates a pen drive signal that is a quantized form of the received touch sensor drive signal relative to two thresholds. During sensor scan N+3, pen P1 receives signals 2324, 2325, and 2326, compares them to a threshold value Th1, and re-transmits the inverted comparator output, unless the received signal exceeds threshold Th2, in which case no signal is emitted by the pen. The relative magnitudes of 2324, 2325, and 2326 are not preserved in the pen drive signals 2364, 2365, and 2366. Pen drive signals 2364, 2365, and 2366 are coupled most strongly to receive electrode Rcv2, where signals 2374, 2375, and 2376 comprise inter-electrode coupling directly from D2, D3, and D4 to Rcv2, combined with pen drive signals 2364, 2365, and 2366.

Signal Rcv2 may be used to indicate the presence of pen P1 at an approximate location, but it cannot be used to locate stylus P1 by interpolation. Diminished signals like 2374 and 2376 are similar to those generated by a passive touch, but the profile of diminished signals 2374 and 2376 with unchanged signal 2375 between them and 2379 also having minimal change, would be very unusual for a passive finger touch, so a code symbol comprising this signal profile is indicative of a pen.

In some implementations, the pen drive signal is a null form of the received touch sensor drive signal, e.g., the output is zero (unchanging) when received touch sensor drive signal is greater than a threshold value. An example of this type of modulation is shown in sensor scan N+3 of FIG. 23B. During sensor scan N+3, pen P1 receives signals 2324, 2325, and 2326, compares them to a threshold value Th1, and re-transmits the inverted comparator output, unless the received signal exceeds threshold Th2, in which case no signal is emitted by the pen. The relative magnitudes of 2324, 2325, and 2326 are not preserved in the pen drive signals 2364, 2365, and 2366. Pen drive signals 2364, 2365, and 2366 are coupled most strongly to receive electrode Rcv2, where signals 2374, 2375, and 2376 comprise inter-electrode coupling directly from D2, D3, and D4 to Rcv2, combined with pen drive signals 2364, 2365, and 2366.

Signal Rcv2 may be used to indicate the presence of pen P1 at an approximate location, but it cannot be used to locate stylus P1 by interpolation. Diminished signals like 2374 and 2376 are similar to those generated by a passive touch, but the profile of diminished signals 2374 and 2376 with unchanged signal 2375 between them and 2379 also having minimal change, would be very unusual for a passive finger touch, so a code symbol comprising this signal profile is indicative of a pen.

In some implementations, the pen receives touch sensor drive signals and emits no pen drive signal, as illustrated in scan N+4 of FIG. 23C. During sensor scan N+4, pen P1 receives signals 2324, 2325, and 2326, and no signal is emitted by the pen. No pen presence or location information is conveyed by this no-signal condition, but this no-signal symbol may be used as one of the digits within a code sequence.

Sensor scan cycle N+5 illustrates another example of a pen drive signal that is a quantized form of the received touch sensor drive signal. In this example, the pen drive signal is a non-inverted version of the received touch sensor drive signal. During sensor scan N+5, pen P1 receives signals 2321, 2322, and 2323, compares them to a threshold value Th1, and re-transmits the non-inverted comparator output. The relative magnitudes of 2321, 2322, and 2323 are not preserved in the pen drive signals 2384, 2385, and 2386. Pen drive signals 2384, 2385, and 2386 are coupled most strongly to receive electrode Rcv2, where signals 2394, 2395, and 2396 comprise inter-electrode coupling directly from D2, D3, and D4 to Rcv2, combined with pen drive signals 2384, 2385, and 2386.

Signal Rcv2 may be used to indicate the presence of pen P1 at an approximate location, but it cannot be used to locate pen P1 by interpolation. In-phase additive signals like 2394, 2395, and 2396 cannot be generated by a passive touch, so three of these signals in sequence are a strong indication of a pen at the P1 location. Uniqueness of this signal type make it a good symbol to use as a wildcard and/or as a start indicator for an asynchronous code sequence as discussed in more detail below. Simultaneous in-phase re-transmission must be done in a way that avoids positive feedback. For example, the pen receive circuitry may be turned off during transitions of the pen drive signal.

In some implementations, the pen drive signals can be re-transmitted contemporaneously with the received touch sensor drive signals. In other implementations, the pen drive signals can be delayed by a period of time as discussed further below.

In some embodiments, the pen receives a sensor drive signal and emits the pen drive signal based on the received sensor drive signal immediately or with little delay. In some embodiments, the pen receives a sensor drive signal and emits the pen drive signal based on the received sensor drive signal after a delay. Delaying the emission of the pen can reduce the possibility that the pen drive signals will generate positive feedback. Embodiments discussed herein allow a pen to synchronously re-transmit pen drive signals in phase with the touch sensor drive signals, with no or reduced positive feedback.

An exemplary capacitive touch system includes a touch sensor, comprising a matrix of drive and receive electrodes, capacitively coupled at a plurality of node and a controller. The controller includes signal generator circuitry configured to generate touch sensor drive signals and to apply the touch sensor drive signals sequentially to each the drive electrodes during a scan cycle. Receiver circuitry in the touch sensor receives response signals in the receive electrodes. The touch location can be determined based on the response signals. A pen used with the touch sensor includes a pen body having a receiver portion and an emitter portion. The pen circuitry includes receiver circuitry that receive a touch sensor drive signal from at least a first drive electrode of the touch sensor through the receiver portion of the pen body during a scan of the first drive electrode by the touch sensor. Signal generator circuitry in the pen generates a pen drive signal based on the touch sensor drive signal received from the first drive electrode and emits the pen drive signal through the emitter portion of the pen body during a scan of a second drive electrode of the touch sensor. The scan of the second electrode is separated in time from the scan of the first drive electrode by a predetermined time delay.

The touch drive signals are applied to drive electrodes sequentially during a scan cycle, with a period of Td. In some embodiments, a pen used with the touch panel receives the touch drive signals and the pen reports the received touch sensor drive signal magnitudes to a controller/Host. The controller/Host determines the location of the pen relative to the drive electrodes. In some embodiments the pen may generate pen drive signals that are proportional to the magnitudes of the received touch sensor drive electrodes. In these embodiments, information about the touch location of the pen relative to the drive electrodes is included in the response signals due to the proportionality of the pen drive signals to the received touch sensor drive signals. In some embodiments, a pen used with the touch panel receives the touch drive signals and the pen may determine a pen location relative to the drive electrodes based on the received touch sensor drive signals. The pen reports the touch location relative to the drives electrodes to the controller/Host via the communication connection, e.g., wireless, RF, Bluetooth®, Wi-Fi®.

In some implementations, the pen may emit pen drive signals that are delayed by an integral number of scan periods, e.g. 2× the scan period, Td. The delay allows the touch sensor to locate the pen with respect to receive electrodes, while avoiding the possibility that pen drive signals will generate positive feedback. For example, pen drive signals may be delayed by any whole number (>0) of scan periods Td. In some implementations, multiple pen drive signals may be coded as shown in FIG. 24, or a single pulse burst may be transmitted to indicate stylus position relative to touch panel receive electrodes.

The implementations discussed herein allow multi-digit codes to be transmitted to a controller/Host in a single scan cycle. Furthermore, it is possible for the locations of multiple pens to be determined relative to the drive electrodes, based on signal magnitudes measured in the pen. The locations of multiple pens can be determined relative to the receive electrodes based on response signal magnitudes measured in the receive electrodes. The multiple pen location with respect to the drive and receive electrodes can be performed independently of pen coding.

FIG. 24 shows signals of a touch system with touch drive signals 2410, driven sequentially onto eleven adjacent drive electrodes. Electrode E1 is driven during time D1, E2 is driven during time D2; E3 is driven during time D3, etc. Referring back to the touch panel shown in FIG. 22, pen P1 is located above electrode E3, offset slightly closer to E4 than E2. The position of the pen P1 is indicated by the magnitudes of the touch sensor drive signals 2421, 2422, 2423 that are received by the pen.

The pen measures signals 2421, 2422, 2423 that are above threshold Th1. The pen may transmit the magnitudes of signals 2421, 2422, 2423 to a controller/Host via the communication connection (e.g. Bluetooth). The pen may also interpolate received touch sensor drive signals 2431, 2422, 2423 to calculate a touch location relative to drive electrodes E2, E3, E4.

The pen detects that signal 2422 is the largest of the three above-threshold signals. In the illustrated embodiment, in response to the above-threshold measured signals, the pen waits for two periods after the maximum signal (2422) that it received, then transmits, for example, three consecutive pen drive signals 2431, 2432, 2433 that are equal in magnitude.

Pen drive signals 2431, 2432, 2433 are simultaneous with (and phased with respect to) the next three touch drive signals (D5, D6, and D7). The pen may transmit signals that are in phase with the touch sensor drive signals D5, D6, D7, or one or more of the pen drive signals may be out of phase with the touch sensor drives signals D5, D6, D7, according to the specific code the pen is conveying. In the example of FIG. 24, the pen is transmitting a 1,0,1 code, wherein pen drive signal 2431 is in phase with touch sensor drive signal D5, pen drive signal 2432 is 180 degrees out of phase with touch sensor drive signal D6, and pen drive signal 2433 is in phase with touch sensor drive signal D7.

Response signals 2440 represent the signals received by touch sensor receive electrode X. During most receive times, (D1-D4 and D8-D11) the magnitude of signals is at Th3. A touch will reduce one or more of these signals, as previously described herein. When the stylus is emitting in-phase signals, (e.g. 2431 and 2433) the pen drive signals 2430 will add to the touch sensor response signal 2440. During D5 and D7, response signals 2441 and 2443 are increased in magnitude in response to in-phase signals 2431 and 2433 that were coupled from the stylus. Response signal 2442 is reduced in magnitude due to the influence of out-of-phase stylus signal 2432.

Pen codes can be conveyed to the touch sensor by these in phase and out of phase stylus signals with one code digit included in the pen drive signals for each scan cycle as shown in FIG. 8B. However, with the approach illustrated in FIG. 24, multi-digit codes may be conveyed in a single scan cycle rather than requiring multiple scans.

The delay between the time of the received touch sensor drive signals and the time that the pen drive signals are transmitted will be taken into account when determining pen location. For example, in the example provided by FIG. 24, pen drive signals starting at D5 actually indicate a pen location nearest to D3.

Some embodiments use pen timestamps and sensor timestamps to identify and track locations of multiple pens. As discussed below, some embodiments involve a pen for use with a sensor. The pen circuitry includes touchdown detection circuitry configured to detect touchdown of the pen on a surface of the sensor. Signal generator circuitry in the pen generates pen drive signals that are emitted while the pen is in contact with the sensor surface. Clock circuitry in the pen generates a pen timestamp associated with the touchdown of the pen on the sensor surface. The pen circuitry includes communication circuitry that provides a communication connection, e.g., RF, Bluetooth®, Wi-Fi®, with the touch sensor. The pen timestamp is transmitted to the sensor through the communication connection.

The pen system includes a sensor that comprises a panel having a contact sensitive surface and a controller. The controller includes contact detection circuitry configured to detect contact events on the sensor surface. In some embodiments, a contact event is a pen touch, and in other embodiments it may comprise pen or finger touch. Clock circuitry generates a sensor timestamps when the contact events are detected. Communication circuitry communicatively connects the pens and the sensor, allowing the pens to send pen timestamps to the sensor. Contact event tracking circuitry in the controller correlates the pen timestamps with the sensor timestamps and uses these timestamp correlations to identify and track movements of the pens. The contact tracking circuitry may also discriminate between a pen and a finger touch. The sensor timestamps and the pen timestamps can be asynchronous with respect to each other.

For example, the contact tracking circuitry can, for each touch, calculate a difference between a sensor timestamp for the contact and a pen timestamp for the contact. The contact tracking circuitry uses differences between the sensor timestamps and the pen timestamps to track movements of multiple pens. The latency for associating a pen timestamp with a sensor timestamp can be greater than the latency of the communication connection between the sensor and the pen.

In some implementations, the sensor is a capacitive touch sensor that includes a touch panel having drive electrodes and receive electrodes capacitively coupled at nodes. The controller includes signal generator circuitry configured to generate touch sensor drive signals and to apply the touch sensor drive signals sequentially to the drive electrodes. Receiver circuitry in the touch controller receives response signals on the receive electrodes that indicate contact events on the touch panel. A contact event may be a touch of a finger, or a touch of a pen.

In other implementations, the sensor is an electromagnetic sensor that includes a panel having electrodes that drive and receive magnetically coupled signals. The controller includes signal generator circuitry configured to generate sensor drive signals and to apply the sensor drive signals sequentially to the electrodes. Receiver circuitry in the controller receives response signals on the electrodes that indicate pen contact events on the panel.

The systems that use timestamps as discussed in several embodiments herein allow identification of multiple pens used with a sensor without needing a unique code to identify each pen. The touch sensor time stamps all contact events as they are detected on a sensor using the local clock of the sensor. Pens may also time stamp all contact events, each pen using its internal clock. Pen time stamps are correlated with sensor time stamps by comparing contact events. Pens communicate with the sensor over a communication connection, e.g. Bluetooth®. Correlation of time stamps may exceed the latency of the communication connection. Embodiments disclosed herein uses pen time stamps in conjunction with sensor time stamps to discriminate a pen touch from a finger touch, and to discriminate and identify several pens with or without pen identification codes, and with minimal reliance on short communication link latency. Timing and latency of the communication between the pen and sensor is less critical due to use of pen time stamps with sensor time stamps. Time stamps can enhance pen signal detection vs. noise.

Figure 25:
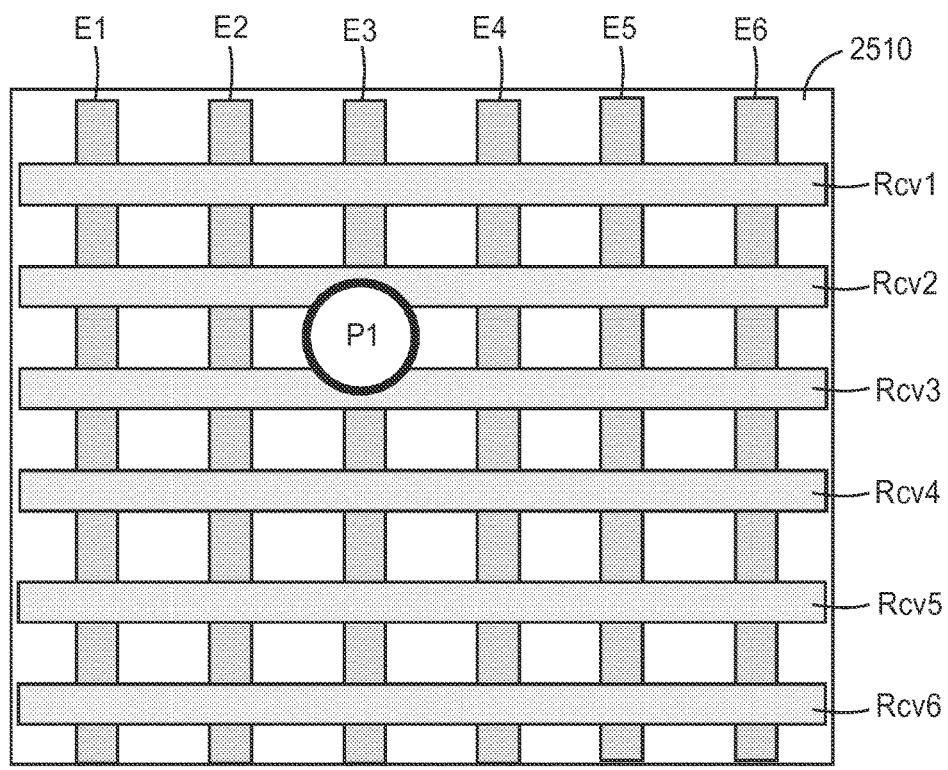
FIGS. 25 and 26 show a simplified sensor electrode matrix with drive electrodes E1-E6 and receive electrodes Rcv1-Rcv6.
Figure 26:
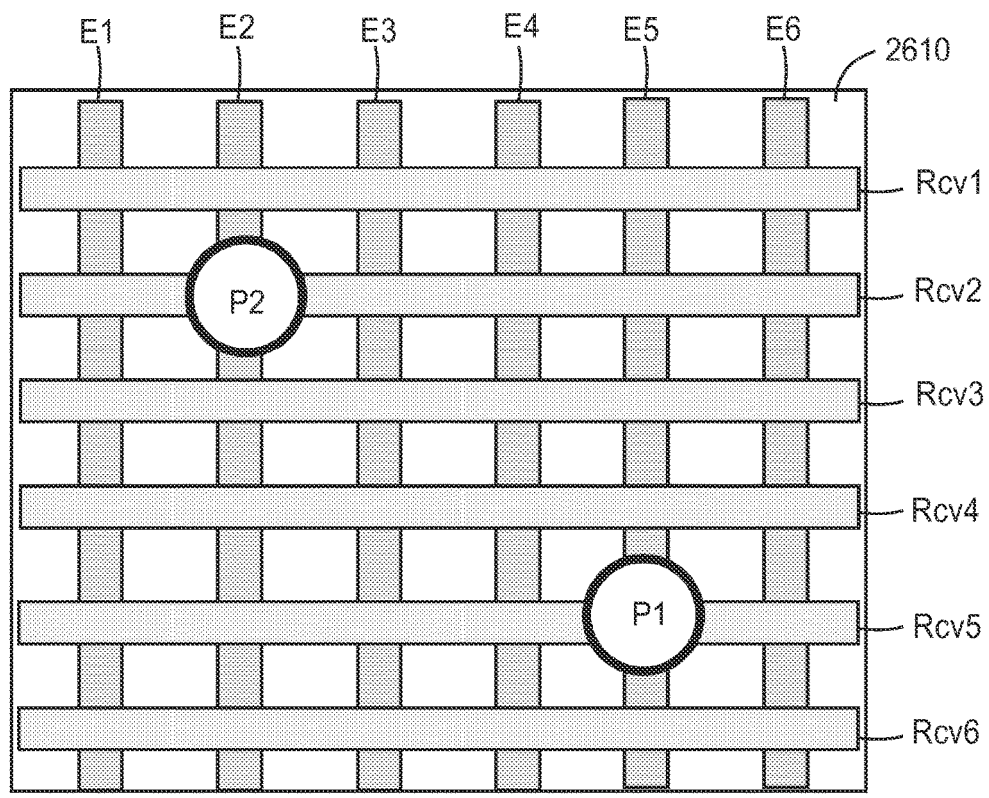

As shown in FIGS. 25 and 26, exemplary touch systems may comprise a sensor 2510 with a capacitive touch panel and controller, and one or two pens, P1, P2. FIGS. 25 and 26 show a simplified sensor electrode matrix with drive electrodes E1-E6 and receive electrodes Rcv1-Rcv6. In FIG. 25, pen P1 is located above E3, between Rcv3 and Rcv4. In FIG. 26, P1 is located above E5 and Rcv5 and Pen P2 is located between E3 and E4, above Rcv5. It is understood that typical sensors have a touch panel matrix considerably larger than 6×6, but size is limited for illustration purposes, as will be evident during discussion of the time line in Table 1.

Sensor 2510 has a clock that is sampled to create time stamps corresponding to contact events, which may be touch events or pen events. Contact events comprise a greater-than-threshold (>th) change in a received signal occurring during a sensor drive signal. Each contact event gets a sensor time stamp (tS).

In one embodiment, pens P1 and P2 operate as follows: When a tip switch of the pen is closed, the pen detects sensor drive signals. If the signals are above a threshold, the pen emits a pen drive signal. Pen drive signals may comprise pulses of maximum magnitude that are in phase with received touch sensor drive signals, (resulting in increased signal magnitude at receive electrodes, rather than the typical magnitude reduction of a finger touch). Thus due to the phase additive nature of the pen drive signals, response signals due to pen touches may be discriminated from response signals generated by finger touches. In other embodiments where pen contact can be unambiguously discriminated from finger touches, (e.g. E-M pens) it is only necessary for a pen to emit its signal in response to signals received from the sensor.

Each pen P1, P2 has a clock that is sampled to create time stamps corresponding to pen events. Pen events comprise a greater-than-threshold (>th) change in a received touch sensor drive signal. Each pen event is time stamped. Valid pen events should only occur during a sensor drive period, so one pen time stamp (tP) may be assigned for each sensor drive period. Pen clocks are asynchronous with each other, and asynchronous with the sensor clock. Pen and sensor clocks may have similar time resolution, and the resolution may be at least sufficient to resolve one electrode drive time from another.

Table 1 shows a time line of events during scanning of sensor 2510. The time line of Table 1 is simplified for illustration purposes. For example, the resolution of time stamps for two pens and for the sensor are all 0.3 msec, and electrode drive time is also 0.5 msec. This is much longer than typical drive times, but 6×6 sensor 10 is also smaller than typical, so total sensor scan time is within a typical range.

TABLE 1

| A | B | C | D E | F | G | H I | J | K | L |
| --- | --- | --- | --- | --- | --- | --- | --- | --- | --- |
|   |   |   | Pen P1 |   | Sensor |   | Pen P2 |   |   |
| Time (e.g. mSec) | Electrode driven | Pen event | Timestamp tP1 | Sensor event | Sensor processing | Timestamp tS / Comm event | Pen event | Timestamp tP2 | Comments |
| 17.0 | E | 5 |   |   |   |   |   |   |   |

TABLE 1-continued

| A Time (e.g. mSec) | B Electrode driven | C | Pen P1 | | Sensor | | | I Comm event | Pen P2 | | L Comments |
|---|---|---|---|---|---|---|---|---|---|---|---|
| | | | D Pen event | E Time-stamp tP1 | F Sensor event | G Sensor processing | H Time-stamp tS | | J Pen event | K Time-stamp tP2 | |
| 17.5 | E | 6 | | | | | | | | | |
| 18.0 | None | | P1 Tip Switch closed | | | | | | | | |
| 18.5 | E | 1 | | | | | | | | | |
| 19.0 | E | 2 | Receive & re-transmit | 20.0 | Receive (+) signal | Pen indicated | 69.0 | | | | |
| 19.5 | E | 3 | Receive & re-transmit | 20.5 | Receive (+) signal | Pen indicated | 69.5 | | | | |
| 20.0 | E | 4 | Receive & re-transmit | 21.0 | Receive (+) signal | Pen indicated | 70.0 | | | | Pen (?) is indicated |
| 20.5 | E | 5 | Noise | | Baseline | | | | | | |
| 21.0 | E | 6 | Noise | | Baseline | | | | | | |
| Intrim1 | | | Time passes, (e.g. 2 Sec) during which P1 continues to send signals to the sensor. (FIG. 1A) | | | | | P1 sends Comm with tP1 = 21.0 touchdown stamp | | | Pen P1 is confirmed; Synch (tP1 = 21.0) = (tS = 70.0) |
| 2021.0 | None | | Noise | | 0 | | | | | | |
| 2021.5 | E | 1 | Noise | | Baseline | | | | | | |
| 2022.0 | E | 2 | Receive & re-transmit | 2023.0 | Receive (+) signal | Pen possible | 2072.0 | | | | |
| 2022.5 | E | 3 | Receive & re-transmit | 2023.5 | Receive (+) signal | Pen possible | 2072.5 | | | | |
| 2023.0 | E | 4 | Receive & re-transmit | 2024.0 | Receive (+) signal | Pen possible | 2073.0 | | | | |
| 2023.5 | E | 5 | P1 Tip Switch opened | | Baseline | | | | | | |
| Intrim2 | | | Time passes, (e.g. 0.5 Sec) during which pen P1 moves, then re-contacts the sensor. Simultaneously, another contact is detected by the sensor, (FIG. 1B) | | | | | P1 sends Comm with tP1 = 2023.5 liftoff stamp | | | Re-Synch (tP1 = 2024) = (tS = 2073) |
| 2521.0 | None | | P1 Tip Switch closed | | 0 | | | | P2 Tip Switch closed | | |
| 2521.5 | E | 1 | Noise | | Receive (+) signal | Pen possible | 2571.5 | | Receive & re-transmit | 3721.5 | |
| 2522.0 | E | 2 | Noise | | Receive (+) signal | Pen possible | 2572.0 | | Receive & re-transmit | 3722.0 | |
| 2522.5 | E | 3 | Noise | | Receive (+) signal | Pen possible | 2572.5 | | Receive & re-transmit | 3722.5 | Pen (?) is indicated |
| 2523.0 | E | 4 | Receive & re-transmit | 2524.0 | Receive (+) signal | Pen possible | 2573.0 | | | | |
| 2523.5 | E | 5 | Receive & re-transmit | 2524.5 | Receive (+) signal | Pen possible | 2573.5 | | | | |
| 2524.0 | E | 6 | Receive & re-transmit | 2525.0 | Receive (+) signal | Pen possible | 2574.0 | | | | Pen (?) is indicated |
| 2524.5 | None | | Noise | | 0 | | | | | | |
| 2525.0 | E | 1 | Noise | | Receive (+) signal | Pen possible | 2575.0 | | Receive & re-transmit | 3725.0 | |
| 2525.5 | E | 2 | Noise | | Receive (+) signal | Pen possible | 2575.5 | | Receive & re-transmit | 3725.5 | |
| Intrim3 | | | Time passes, during which P1 & P2 continue to send signals to the sensor. (FIG. 1B) | | | | | P2 sends tP2 = 3701.5 touchdown | | | Pen P2 is confirmed; Synch clocks |

TABLE 1-continued

| A | B | C | D | E | F | G | H | I | J | K | L |
|---|---|---|---|---|---|---|---|---|---|---|---|
| | | | Pen P1 | | | Sensor | | | | Pen P2 | |
| Time (e.g. mSec) | Electrode driven | Pen event | Time-stamp tP1 | Sensor event | Sensor processing | Time-stamp tS | Comm event | Pen event | Time-stamp tP2 | Comments |
| | | | | | | | stamp; P1 sends Comm with tP1 = 2504 touchdown stamp | | | at (tP2 = 3701.5) = (tS = 2551.5); & P1 is Re-Synch'ed P1, (tP1 = 2504) = (tS = 2553) |

In Table 1,
Col. A shows real time, in 0.5 msec increments.
Col. B & C show which electrode of sensor 2510 is being driven during each time increment.
Col. D describes events that occur within pen P1.
Col. E shows time stamps applied by P1. These time stamps do not reflect real time, (nor do sensor times). In the example, the P1 clock has arbitrarily been given a 1 msec offset from real time.
Col. F shows events detected by the sensor.
Col. G shows results/conclusions of sensor processing of events.
Col. H shows time stamp values applied by the sensor clock.
Col. I shows communication events.
Col. J describes events that occur within pen P2.
Col. K shows time stamps applied by P2. The P2 clock has arbitrarily been given a 3.5 msec offset from real time.
Col. L shows comments on events.

In this simplified example, electrodes 1-6 are sequentially scanned in 0.5 msec intervals, followed by a 0.5 msec no-scan period. At t=18.0 msec, the tip switch of P1 is closed, activating P1. At t=19 msec, P1 receives an above-threshold signal from electrode 2 (see FIG. 27). P1 re-transmits a pen drive signal in response, and stores time stamp tP1=19.0. Sensor 2510 receives an above-threshold signal from P1, measures it, and the signal is identified as a potential pen signal. Time stamp tS=69 is stored by sensor 2510. During the next two time periods, 19.5 and 20.0, two additional above-threshold signals are received by P1, time stamped as tP1=20.5 and tP21.0, and re-transmitted to sensor 10 where they are received, time stamped tS=69.5 and tS=70. The resulting signal profile 2716 (FIG. 27) comprising three responses on adjacent electrodes of near-equal magnitude also serve to confirm that the profile 2716 of P1 indicates a pen rather than a touch response.

By the end of time period 21, sensor 2510 can interpret and interpolate received signals and determine unambiguous pen signal (not a touch signal) at the location centered on electrode E3, and between Rcv2 and Rcv3, using methods described herein. The identity of the pen is still unknown, because communication has not been received from P1. Scanning continues, and additional sets of signals are exchanged between P1 and sensor 2510. Time stamps of additional sets of signals may be stored, but in this example, only the time stamp immediately following touchdown is stored, and the pen status corresponding to the time stamp is also stored.

Figure 27:
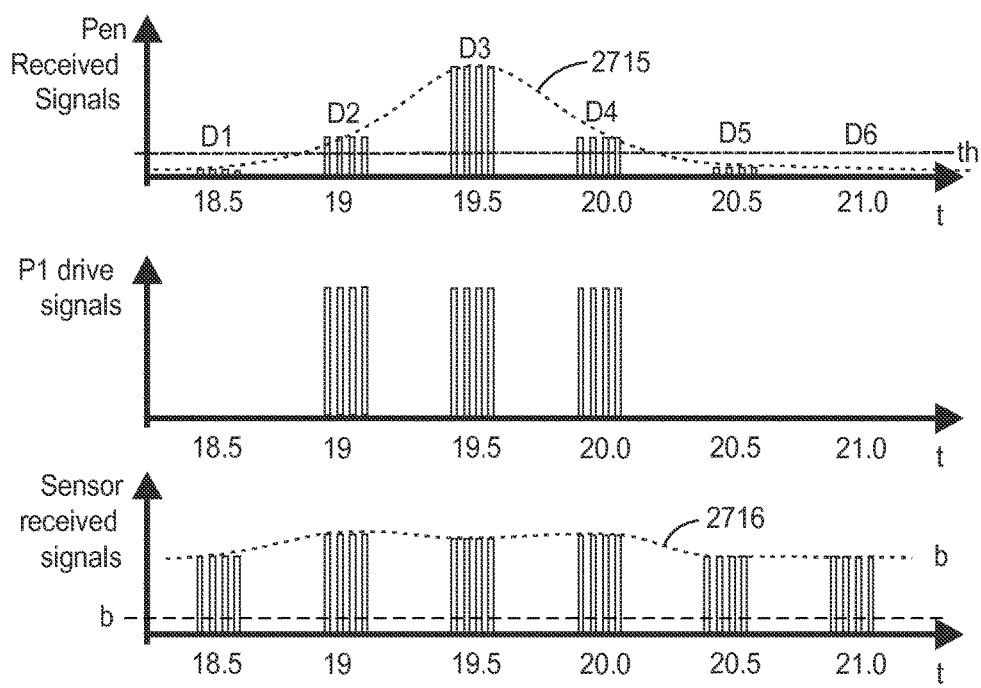
FIG. 27 illustrates a pen drive signal profile comprising three responses on adjacent electrodes of near-equal magnitude that are in phase with the received touch sensor drive signals.

At a time during the period labeled Intriml, P1 sends a communication (comm) signal with its stored time stamps and other status, (e.g. tip pressure, serial number, etc.). All three signal times corresponding to the three post-touch-down signals may be transmitted or, in this example, one time stamp is used to indicate that a set of three signals ended at tP1=21.0. Also during the time period Intriml, sensor 2510 receives the communication message from P1, and (for capacitive systems where pen and touch must be discriminated), confirms that the contact event was a pen, using one or more of the following criteria:

1. Pen signal magnitude change: In this example, an increase in signals indicates a pen.
2. Pen signals profile: (relative magnitudes of the set of received signals during one scan, e.g. FIG. 27 item 2716) may be unique to a pen, and unlikely due to a touch. In this example, profile 2716 has three adjacent positive signal changes, and flanking receive electrodes have minimal changes in signals relative to a baseline, b, (FIG. 27). Profile 2716 indicates a pen rather than a finger profile. Even if profile 2716 had shown three adjacent reduced signals, with minimal changes from signals on flanking receive electrodes, a pen would be more probable than a finger touch.
3. Pen code: A pen may change its pen drive signal in a manner uncharacteristic of a touch, as shown in the timeline of Table 1.
4. Correlation in time between contact event and pen communication message.

Given the pen event followed by communication from P1, sensor 2510 can determine that:
  The pen located over E3 and Rcv3 has the serial number of P1.
  Pen time stamp tP1=21.0 corresponds to sensor time stamp tS=70. The time difference between tS and tP1 clocks is 70−21=49.

After a correlation in time stamps between P1 and sensor 2510 has been established, P1 may be located among multiple pen or touch events by using the difference between its time stamp and a sensor time stamps. For example, referring again to the time line in Table 1, P1 continues to emit signals until it lifts off. Its tip switch is open at t=2023.5 msec, causing P1 to store its last above-threshold signal (lift-off) time stamp at tP1=2024 msec. Sensor 2510 also stores its last P1-related above-threshold (lift-off) time stamp of tS=2073. At some later time, P1 sends its lift-off time stamp via communication to sensor 10, and sensor 10 re-synchronizes to P1 by storing tP1=2024 corresponds to tS=2073.

Some time later, after intrm time 2 (an arbitrary amount of time, typically <10 seconds assuming P1 is in active use), P1 touches down again when its tip switch closes at t=2522.0. In this near worst-case scenario, pen P1 re-touches at a different location than it lifted off, and also pen P2 touches down at the same time as P1, and nearly in the same location previously occupied by P1. During a subsequent scan of sensor 10, P2 receives and re-transmits signals between t=2521.5 and t=2522.5 and P1 re-transmits between t=2523 and t=2524. Sensor 10 records touch-down signals at one location ending with a time stamp of tS=2572.5 and at a second location ending with a time stamp of tS=2574.0. Subsequently, (and at different times) P1 and P2 send communication messages to sensor 2510, comprising touch-down status, time stamps, and a serial number.

Sensor 2510 may then identify one pen as P1. Given a previously calculated time difference of 49 msec between tS and tP1 clocks, Sensor 2510 calculates the differences between the two recently-received time stamps from its tS clock and the two received time stamps from the yet unidentified contacts. For P1, the difference tS-tP1 is 2574-2525=49, which is the known difference with P1. Thus, the contact centered on electrodes E5 and Rcv5 is P1. The other contact must be P2, so now the time difference between tS and tP2 may be calculated to be 2572.5-3722.5=2250. This difference may be updated when P2 lifts off, and it may be used to identify P2 during subsequent events including touch-down, lift off, or when pen signals are immeasurable due to noise or rapid movement.

In another scenario, Pen P3 cannot emit in-phase (additive) signals like P1 and P2, so it emits a code sequence as shown in time line 2, shown in Table 2.

TABLE 2

| A | B | C | D Pen P3 | E | F | G Sensor | H | I | J |
|---|---|---|---|---|---|---|---|---|---|
| Time (e.g. mSec) | Electrode driven | | Pen event | Time-stamp tP3 | Sensor event | Sensor processing | Time-stamp tS | Comm event | Comments |
| 17.0 | E | 5 | | | Baseline | | | | |
| 17.5 | E | 6 | P3 Tip Switch closed | | Baseline | | | | |
| 18.0 | None | | | | 0 | | | | |
| 18.5 | E | 1 | Noise | | Baseline | | | | |
| 19.0 | E | 2 | Receive & re-transmit | 21.0 | Receive (−) signal | Pen possible | 81.0 | | |
| 19.5 | E | 3 | Receive & re-transmit | 21.5 | Receive (−) signal | Pen possible | 81.5 | | |
| 20.0 | E | 4 | Receive & re-transmit | 22.0 | Receive (−) signal | Pen possible | 82.0 | | Pen is possible, based on profile |
| 20.5 | E | 5 | Noise | | Baseline | | | | |
| 21.0 | E | 6 | Noise | | Baseline | | | | |
| 21.5 | None | | Noise | | 0 | | | | |
| 22.0 | E | 1 | Noise | | Baseline | | | | |
| 22.5 | E | 2 | Receive | | Baseline | | | | |
| 23.0 | E | 3 | Receive | | Baseline | | | | |
| 23.5 | E | 4 | Receive | | Baseline | | | | P1 emits no signals during the second scan only |
| 24.0 | E | 5 | Noise | | Baseline | | | | |
| 24.5 | E | 6 | Noise | | Baseline | | | | |
| 25.0 | None | | | | 0 | | | | |
| 25.5 | E | 1 | Noise | | Baseline | | | | |
| 26.0 | E | 2 | Receive & re-transmit | 28.0 | Receive (−) signal | Pen possible | 88.0 | | |
| 26.5 | E | 3 | Receive & re-transmit | 28.5 | Receive (−) signal | Pen possible | 88.5 | | |
| 27.0 | E | 4 | Receive & re-transmit | 29.0 | Receive (−) signal | Pen possible | 89.0 | | Pen is confirmed, based on 1 skipped signal sequence |
| 27.5 | E | 5 | Noise | | Baseline | | | | |
| 28.0 | E | 6 | Noise | | Baseline | | | | |
| 28.5 | None | | Noise | | 0 | | | | |
| 29.0 | E | 1 | Noise | | Baseline | | | | |
| 29.5 | E | 2 | Receive & re-transmit | 31.5 | Receive (−) signal | Pen possible | 91.5 | | |
| 30.0 | E | 3 | Receive & re-transmit | 32.0 | Receive (−) signal | Pen possible | 92.0 | | |
| 30.5 | E | 4 | Receive & re- | 32.5 | Receive (−) | Pen possible | 92.5 | | Pen (?) is possible |

TABLE 2-continued

| A | B | C | D | E | F | G | H | I | J |
|---|---|---|---|---|---|---|---|---|---|
| | | | \multicolumn{2}{c}{Pen P3} | | \multicolumn{2}{c}{Sensor} | | |
| Time (e.g. mSec) | Electrode driven | Pen event | Time-stamp tP3 | | Sensor event | Sensor processing | Time-stamp tS | Comm event | Comments |
| Intrim1 | | transmit P3 continues to send signals to the sensor. At some time, P3 sends Comm to sensor 10. | | signal | | | | P3 sends Comm with tP3 = 22 touchdown stamp and tP3 = 29 code-end stamp. identification of P3 | Pen P3 is confirmed; Synch clocks at Synch (tP1 = 29) = (tS = 89) for future |

In Table 2,
Col. A shows real time, in 0.5 msec increments.
Col. B & C show which electrode of sensor 2510 is being driven during each time increment.
Col. D describes events that occur within pen P1.
Col. E shows time stamps applied by P1. These time stamps do not reflect real time, (nor do sensor times). In the example, the P1 clock has arbitrarily been given a 1 msec offset from real time.
Col. F shows events detected by the sensor.
Col. G shows results/conclusions of sensor processing of events.
Col. H shows time stamp values applied by the sensor clock.
Col. I shows communication events.
Col. J shows comments on events.

Figure 28:
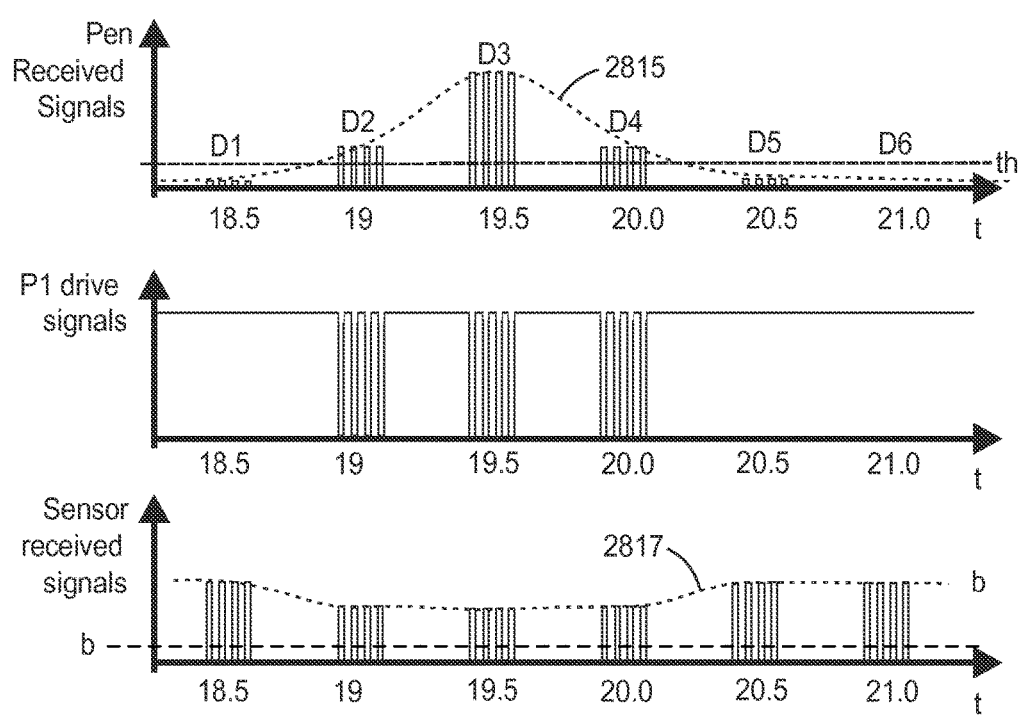
FIG. 28 shows a pen drive signal profile comprising three responses on adjacent electrodes of near-equal magnitude that are out of phase with the received touch sensor drive signals.

On the first scan after touch-down, P3 receives and re-transmits opposite-phase signals, (as shown in FIG. 28). Opposite-phase signals sensor received signals, as do finger touches. However, this profile may be identified as a probable pen, in that three received signals at t=19, 19.5, and 20 are approximately equal, (see profile 2817 in FIG. 28). Also the signal flanking these (t=18.5 and 20.5) are at baseline b, meaning they have essentially no influence from a touch. This signal sequence would be very unusual for a finger touch, but pen P3 uses an additional signal code to ensure that its emissions are unambiguously identified as a pen.

On the second scan after touchdown, P3 emits receives sensor signals and emits no signals. After that, P3 receives and re-transmits opposite-phase signals for all subsequent scans until lift-off. This is shown in time line 2 in Table 2, where P3 receives and re-transmits signals at three times ending at t=20.0, then P3 receives three above-threshold signals ending at t=23.5, but it emits no signals in response. In the following scan, P3 receives and re-transmits signals at three times ending at t=27, completing a code sequence that may be identified by sensor 10 as unique to a pen, not a finger touch. After the scan in which P3 emits no signals, (any time after t=25 msec) P3 sends a communication message comprising a time stamp t=22 indicating touchdown. Unlike some other codes described herein, this code is not intended to uniquely identify pen P3 from other pens, but just to discriminate P3 from a finger touch. As described before with respect to P1, Sensor 2510 stores the serial number of P3 associated with the clock difference (tS=82−(tP3=22)=60 msec, and this is used to identify P3 during later touchdown events as described above.

Another example of alternating pen profiles was discussed above, wherein the pen tip alternates between serving as a receiver portion and an emitter portion. When a pen operates that way, the sensor will receive different signals during alternating scans. This may be used to unambiguously discriminate between a pen and a finger touch, even if the pen uses opposite-phase drive signals.

P3 may continue to skip one scan after every touchdown, or sensor 2510 may send a communication message to P3 indicating that identification has been made, and P3 can re-transmit without skipping, as long as the communication connection with sensor 2510 is maintained. Optionally, P3 may send a second time stamp at t=29, indicating completion of a code.

Clocks of pens may be re-synchronized as described above to maintain accurate time differences relative to a sensor clock, but there are circumstances when clocks will drift and lose accuracy, or times when a pen or sensor clock may be turned off. When this happens, the process of initially identifying a pen and synchronizing its clock (as was described for P1, starting at t=18) must be repeated. Preferably, time clock synchronization is maintained during a session of pen use. Even if clocks drift significantly, they can reliably identify a pen during fast moves, and brief lift-offs for purposes such as dotting I's, crossing t's, and between words.

The sensor clock used for time stamps is preferably synchronous with the sensor electrode drive timing. If pen clocks have sufficient resolution, for example, if the clock period is less than the time to drive one sensor electrode, then pen time stamps may be used to approximately locate a pen in the dimension perpendicular to the drive electrodes. For example, a pen may receive sensor signals, and also convey a time stamp corresponding to the received signals to a sensor. In some circumstances, the sensor may receive a time stamp, but not have received any pen signals. This could happen due to noise, or because the pen emitted no signals, (as in the case of P3 at t=23). Given a pen time stamp and a known difference in clocks, the sensor could calculate which drive electrodes correspond to the pen time stamp, and thus the location (in one dimension) of the pen.

Generally in touch systems, the sensor may not report a contact on the first scan of the panel (referred to as the "skip scan") after contact and the contact is not reported until the second scan of the panel after contact. Using the skip scan to transmit the first digit of the pen code allows more codes and thus more pens that can be concurrently used in the touch system. FIG. 29 shows a chart 2999 that illustrates using the skip scan for pen codes for several scenarios. The latency of a tap touch is estimated to be about 2.5 scan times. "F" indicates a finger contact in lines 2920 and a pen contact of a pen emitting a pen drive signal that is phase subtractive Line 2910 of chart 2999 indicates the scan number after first contact. In this example, four scans including the skip scan are illustrated. Line 2920 illustrates operation of a pen after a finger contact occurs. During the skip ($1^{st}$) scan after the finger contact, the response signal received by the sensor indicates a finger contact. During the second scan after the finger contact, the response signal received by the sensor indicates a finger contact and the finger contact is reported to the Host after the finger contact is detected during the second scan.

Lines 2931-2933 of table 2999 illustrate an implementation in which the system can identify three pens and a pen contact is reported at the second scan after the contact occurs. Upon contact with the panel, the pen tip switch is depressed and the pen begins to emit pen drive signals. As previously discussed, the pen drive signal can be phase subtractive from the sensor drive signal which decreases the capacitive coupling and resembles a finger touch (indicated by an "F" in lines 2931-2962). The pen drive signal can alternatively be phase additive with the sensor drive signal which increases the capacitive coupling (indicated by a "P" in lines 2931-2962). For example, phase subtractive signals may represent the code digit "0" and phase additive signals may represent the code digit "1." For this scenario, the first digit of the pen code is included in the pen drive signals and is present on the response signals of the sensor during the skip scan (first scan after pen contact). During the second scan after the pen contact, the second digit of the pen code is included in the pen drive signal, the second digit of the pen code is received by the sensor via the response signals and the pen contact and pen code is reported to the Host.

Lines 2941-2946 of table 2999 illustrate an implementation in which the system can identify six pens and a pen contact is reported at the third scan after the pen contact occurs. Upon contact with the panel, the pen tip switch is depressed and the pen begins to emit pen drive signals. For this scenario, the first digit of the pen code is included in the pen drive signals and is present on the response signals of the sensor during the skip scan (1st scan after pen contact). During the second scan after the pen contact, the second digit of the pen code is included in the pen drive signal and the second digit of the pen code is received by the sensor via the response signals. During the third scan after the pen contact, the third digit of the pen code is included in the pen drive signal, the third digit of the code is received by the sensor via the response signals, and the pen contact and pen code is reported to the Host.

Lines 2951-2962 of table 2999 illustrate an implementation in which the system can identify twelve pens and a pen contact is reported at the fourth scan after the pen contact occurs. Upon contact with the panel, the pen tip switch is depressed and the pen begins to emit pen drive signals. For this scenario, the first digit of the pen code is included in the pen drive signals and is present on the response signals of the sensor during the skip scan (1st scan after pen contact). During the second scan after the pen contact, the second digit of the pen code is included in the pen drive signal and the second digit of the pen code is received by the sensor via the response signals. During the third scan after the pen contact, the third digit of the pen code is included in the pen drive signal and the third digit of the pen code is received by the sensor via the response signals. During the fourth scan after the pen contact, the fourth and final digit of the pen code is included in the pen drive signal, and the fourth digit of the code is received by the sensor via the response signals. The pen contact and pen code is reported to the Host.

Figure 30:
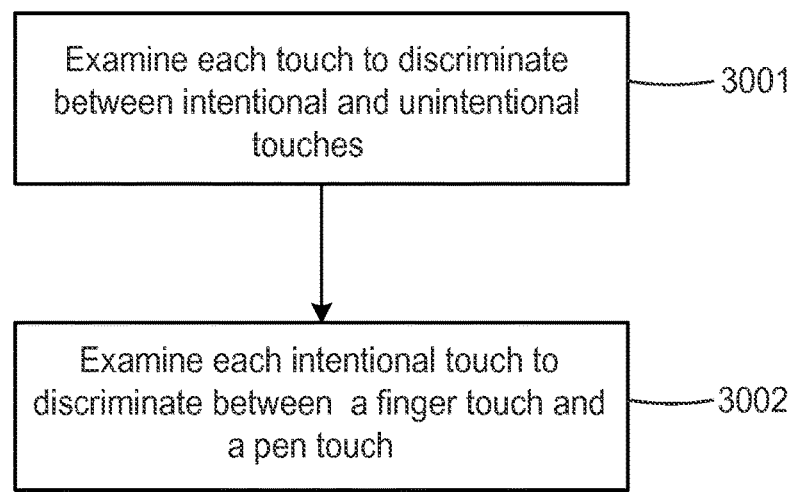
FIG. 30 is a flow diagram of a two tiered touch process that first discriminates between intentional and unintentional touches and between a pen touch and a finger touch.

Touch sensors are subject to inaccuracy when unintentional touches are erroneously identified as intentional touches. One source of unintentionally touches occurs when either a pen or a finger intentionally touches a touch panel, and the user rests a palm or wrist on the touch panel. The palm or wrist may create one or more unintentional touches that temporally overlap the intentional touch. The touch controller needs to reject unintentional touches while accepting one or multiple temporally concurrent intentional touches. As discussed herein, and illustrated in the flow diagram of FIG. 30, a touch process involves a two-tiered process that first discriminates 3001 between intentional and unintentional touches using a first process comprising a first discrimination method and/or first set of criteria. Next, for each identified intentional touch discriminates 3002 between a pen touch and a finger touch using a second process comprising a second discrimination method and/or second set of criteria.

The example illustrated in FIG. 31 below (and other examples discussed herein) are provided within the context of a mutual capacitive touch screen system with drive electrodes and receive electrodes. The electrodes may have a variety of shapes, such as diamonds, simple rectangles, etc. A node occurs at an intersection of drive and receive electrodes. A touch signal indicates the change in measured capacitance at an intersection of drive and receive electrodes caused by contact with some object. A contact occurs when there is a measureable interaction of the touchscreen system's electrostatic field with a physical object. Touch profile size means a substantially contiguous area of nodes that are interacting with a physical object. Contacts that are rejected are determined to be unintended and/or undesired by the user and are not reported by the touch sensor controller.

A passive pen (~5 mm width tip) is small relative to bar pitch (~5 mm), compared with a finger (~9 mm). The pen produces a signal which varies with its position relative to the electrode pattern. The strength of the electrostatic field produced by the touch screen system varies in a predictable way, directly over the nodes and between the nodes. This variation is noticeable as the pen moves over the surface of the sensor. A finger, being wider, tends to have less high/low signal variation, as it starts to interact with an adjacent peak in the field before it stops interacting with another adjacent peak in the field as the finger moves over the surface of the sensor. A finger has higher signal, generally, than a pen as the wider finger can interact with more electrostatic field lines than the pen.

This lower signal level for the pen must be accepted, while still being able to reject unintended touches (such as palm) of a much higher level. This is done by qualifying the pen touch with a set of rules which are more restrictive than the rules for a finger touch.

The process for identifying potential finger contacts has been described in commonly owned U.S. Pat. No. 8,493,355 which is incorporated herein by reference. Identifying potential finger touches is performed for nodes down to a finger (low hysteresis) threshold. Unintentional touch (palm) rejection is performed according to the touch profile size of these contacts, the palm measured by an object's interaction with the nodes at levels well below the acceptable touch level, even below pen touch levels. Potential contacts that are disqualified as fingers, due to the touch profile size, are marked as reserved. Exceptions are made according to the shape of the touch profile, so that certain objects that produce a larger touch profile will not be rejected. Exceptions are also made according to touch profile shape, so that certain objects of a smaller touch profile size will be rejected.

Where the potential finger contact signal level is not over the finger touchdown (high hysteresis) threshold, it is further examined to determine if it qualifies as a pen contact. If so, the contact is marked for special handling as a pen, so that it is exempted from the finger touchdown (high hysteresis) threshold.

A similar process then looks at lower level signals using more restrictive rules for the pen qualification. The pen touch must maintain a greater distance from the reserved nodes than a finger touch. Also, the surrounding nodes at a specified radius are required to be near ambient level. Ambient means a signal level indicating no interaction with an object. Near may mean a fixed, low level, amount of interaction or a value that varies with the level of the contact.

Optionally, if a contact does qualify as a pen, all other contacts may be rejected. Optionally, where multiple pen contacts are permitted, only non-pen contacts within proximity of the pen contact may be rejected. Optionally, only non-pen contacts located at a certain position relative to the pen contact would be rejected. This position may be defined within the context of the application. (e.g., side-of-palm when capturing a signature.)

A contact, during its lifetime, may not be permitted to change identity (pen vs. finger). A contact, during its lifetime, may be permitted to change identity from pen to finger, but not allowed to change identity from finger to pen. A low level pen contact may take longer (several samples) to be recognized and reported as a pen in order to increase reliability and reduce false contacts.

Non-circular contact shapes may be used in pen tips to produce a measurable difference in the X or Y (be it receive or transmit) interaction with the field lines, depending on the rotational alignment of the pen with the touchscreen electrodes. The pen tip shape itself may be measurable independent of alignment.

Active pens (~1 mm or 2 mm width tip) may be designed to mimic fingers or passive pens. In some modes of operation, the active pen does not try to provide a unique signal that positively identifies it as a pen. Such a pen may actually produce a wider touch profile than passive pens with wider tips. This is due to a greater (than passive pen) coupling into the receive electrodes adjacent to the closest receive electrode. Here, the rules for pen qualification may differ from the passive pen in that a larger radius is specified for the surrounding nodes which must be near ambient level. Ambient means a signal level indicating no interaction with an object. The specified radii may also define a surrounding oval rather than a circle, (or rectangle vs. square area).

Figure 31:
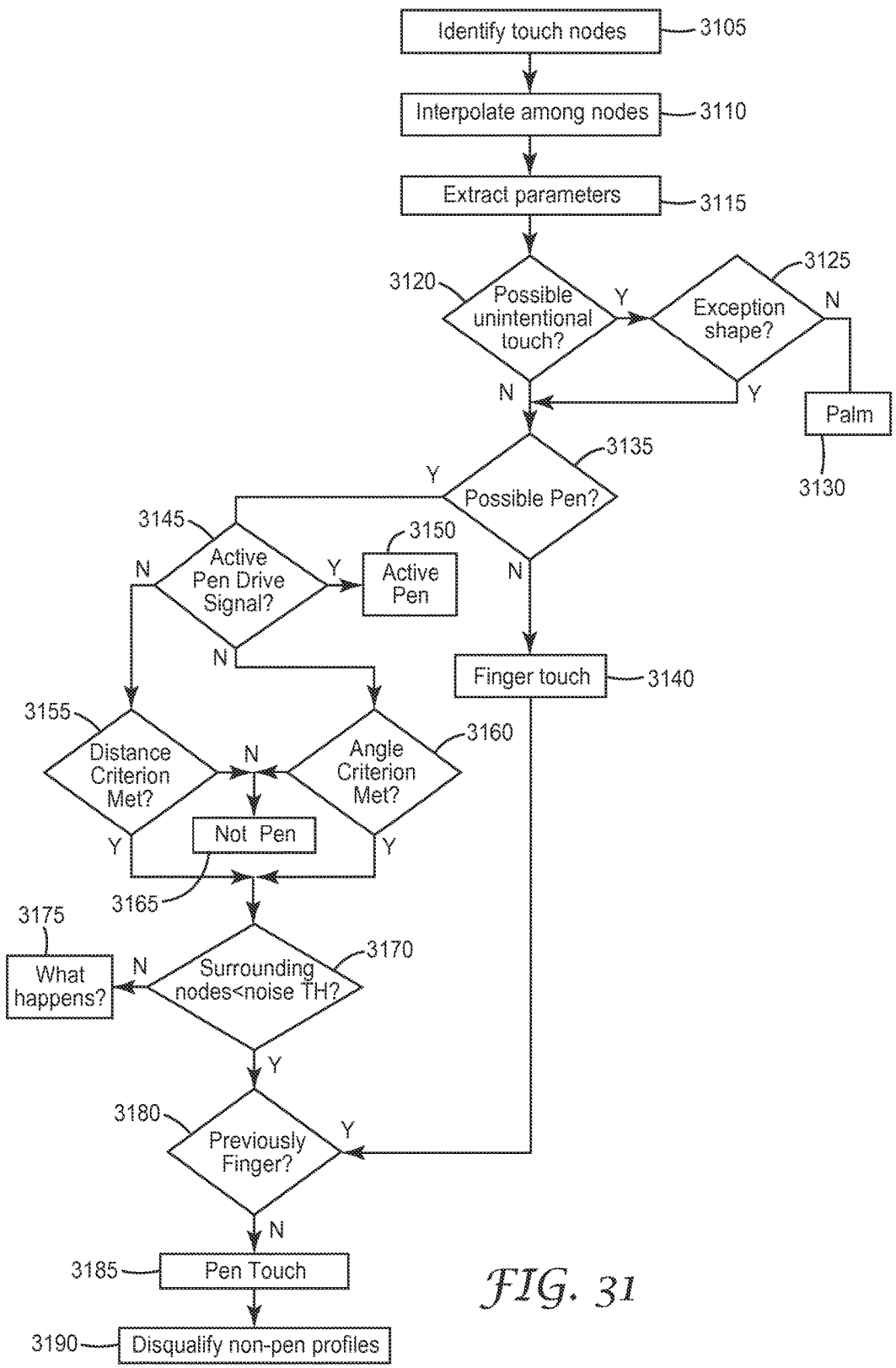
FIG. 31 is a flow diagram illustrating a process of discriminating unintentional touches from intentional touches and subsequently processing each identified intentional touch to discriminate a pen touch from a finger touch.

FIG. 31 is a flow diagram illustrating a process of discriminating unintentional touches from intentional touches and subsequently processing each identified intentional touch to discriminate a pen touch from a finger touch. The process involves identifying unintentional (palm) touches, pen touches, finger touches, and/or possibly other touches not defined as palm, pen, or finger and "reserving" nodes associated with touch profiles. The process includes identifying touch nodes 3105 by scanning the touch panel electrodes to find nodes with the strongest signal above a touch threshold. If this node and the nodes in the area adjacent to the node have not been previously reserved, then this node is reserved along with the nodes within a predetermined area adjacent to area. Reserving a node means identifying the node as associated with the palm, pen, finger or other touch, which removes the node from further scanning to identify additional touches. Alternatively, rather than relying on a predetermined area, nodes adjacent to, and increasingly distant from, the center node can be scanned and reserved until they are found to be below the touch threshold, but this may increase processing time. The process iteratively scans all unreserved nodes in the array in this manner, until the maximum number of supported touches is reached or no additional touches are found.

The new touches are compared to a list of old touches. If a new touch is paired with an old touch, the new touch takes the place of the old touch in a list of current touches. In one approach, pairing new and old touches is achieved by comparing a distance between the new and old touch. The new and old touches are paired in order of closest distance and the new touches in the pairs take the place of the old touches in the list of current touches. Additional processing may optionally be applied to correct for fast motion artifacts so that the new and old touches are appropriately paired.

Resolution of the location of the identified touches may optionally be enhanced by interpolating 3110 between the receive electrodes where the touches occur. For example, interpolation can involve scaling the ratio of the signal strength between the nodes. In some implementations, scaling the ratio involves scaling the ratio of the signal strength of two adjacent receive electrodes. Additional information about processes to identify touches is described in commonly owned U.S. Pat. No. 8,493,355 which is incorporated herein by reference.

The edges, areas, slopes and/or other parameters of the touch profiles can be extracted B15 from a two dimensional data array of measured signal levels at the nodes (or interpolated locations) of the two dimensional electrode array of the touch panel. A complex array of measured signal levels can be resolved into one or more sub arrays representing component profiles, e.g., multiple touch profiles, using correlation techniques. Such techniques are described in detail in commonly owned U.S. Patent Application Ser. No. 61/809,549 filed on Apr. 8, 2013, which is incorporated herein by reference.

The parameters of the touch profiles extracted in process 3115 are examined to discriminate 3120 between an intentional touch or an unintentional touch, e.g., made by a palm. This discrimination may involve applying first criteria to each touch profile, e.g., by comparing the size of the touch profile to a size threshold associated with a finger touch. If the size of the touch profile is greater than the threshold, additional processing may be performed 3125 to determine if the touch profile is consistent with one or more exception shapes that indicate a multi-touch event. If the touch profile is not consistent 3130 with an exception shape, then the touch is identified as an unintentional touch, e.g., a palm, and the touch profile of the palm is reserved.

If the size of the touch profile is less than the threshold, or is consistent with an exception shape, then the touch may be identified as a finger touch, a pen touch or multi-touch of pen or finger. The process illustrated in FIG. 31 can discriminate 3135 between a finger touch 3140 and a possible pen touch by analyzing the touch signals with respect to second criteria. In the some embodiments, the analysis involves comparing the peak magnitude of the touch signal to one or more magnitude thresholds. If the magnitude of the touch signal is greater than a first threshold associated with a finger touch, the touch is identified as a finger touch; and if the magnitude of the touch signal is above a third threshold but below a second threshold, the touch is identified as a pen touch. For touches having signal levels between the second and third thresholds, the touch may be a pen or finger and further processing maybe applied to discriminate between pen and finger touch. In some embodiments pen/finger touch discrimination analysis may involve comparing the slopes of the signal magnitudes at the touch profile edges to a slope threshold. Steeper slopes indicate a possible pen touch. More gradual slopes indicate a finger touch.

As previously discussed, pen touches may be made by an active pen that emits a pen drive signal or a passive pen that operates like a user's finger. The presence of an active pen can be recognized 3145, 3150 due to discernible differences in the response signal if the active pen signal drives the receive electrode and/or due to a separate communication link between the pen and touch sensor controller, for example.

If the pen is a passive pen, one or more touch profile parameters may be compared to one or more additional thresholds to confirm the pen touch. For example, the distance between the touch profile being analyzed and the closest reserved touch profile, e.g., the shortest distance or distance between peaks, may be compared 3155 to a distance profile. In some embodiments, an angle between the touch profile being analyzed and one or more reserved touch profiles may be compared 3160 to an ambient threshold. Touch profiles not meeting these criteria may be identified as a non-pen touch 3165.

In some embodiments, the signal levels of surrounding nodes within a predetermined radius of a pen touch may be tested 3170. If the signal levels of the surrounding nodes are greater than the noise threshold, the touch profile may be identified 3175 as a non-pen profile. Non-pen profiles and may optionally be reserved or disqualified 3190. Disqualification of a touch profile means that the touch profile is not reserved. Disqualification of non-pen profiles may be based on additional criteria. For example non-pen profiles within a predetermined distance from a pen profile may be disqualified and/or a within a predetermined angle of a pen profile may be disqualified.

Touch profiles that are consistent with a pen touch may nevertheless be reserved as a finger touch if the touch was previously identified 3180 as a finger touch. If the new touch that is identified as a pen touch is paired with an old touch that was identified as a finger touch, the new touch may be re-identified as a finger touch. If the new (pen) touch is paired with an old pen touch, the touch may be identified 3185 as a pen touch.

Discriminating an intentional touch from an unintentional touch may be based on size, shape, and/or the relationship between the peaks of the touch profile and the size and/or shape of the profile. Size, shape, and peak values are extracted from the two dimensional array of touch signal measurement data. If the touch profile size is less than a maximum finger size threshold and has at least one peak value above a peak threshold, then the touch is determined to be either a pen touch or a finger touch. The touch profile is further examined to discriminate pen from finger touch as previously discussed. If the touch profile size is less than the maximum finger size threshold and has no peak value, then the touch profile is reserved and disqualified (rejected) as an unintentional touch If the touch profile has a size that exceeds a maximum blob threshold, the touch profile may be reserved and rejected as an unintentional touch. Even after the maximum blob threshold is reached, analysis of the data array of touch signal values continues to ascertain the boundaries of the rejected touch profile. Touch profiles having sizes greater than maximum finger threshold and less than the maximum blob threshold may be further analyzed to determine if the touch profile is consistent with an exception profile.

Figure 32A:
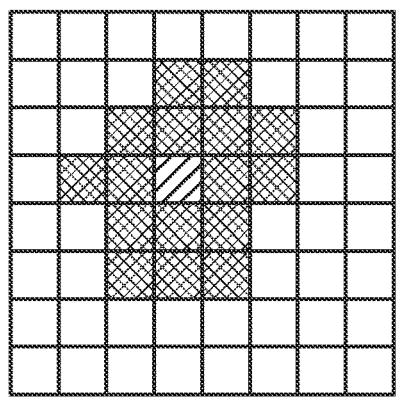
FIG. 32A shows an example touch profile having a size less than the maximum finger size and having a peak above the peak threshold.

FIG. 32A shows an example touch profile having a size less than the maximum finger size and having a peak above the peak threshold. This touch profile identified as an intentional touch and further analysis is performed.

Figure 32B:
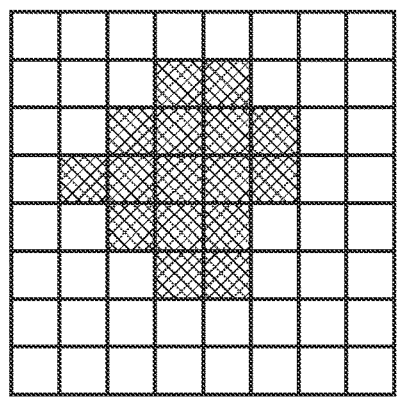
FIG. 32B shows an example touch profile having a size less than the maximum finger size and having no peak above the peak threshold.

FIG. 32B shows an example touch profile having a size less than the maximum finger size and having no peak above the peak threshold. This touch profile identified as an unintentional touch and is rejected.

Figure 32C:
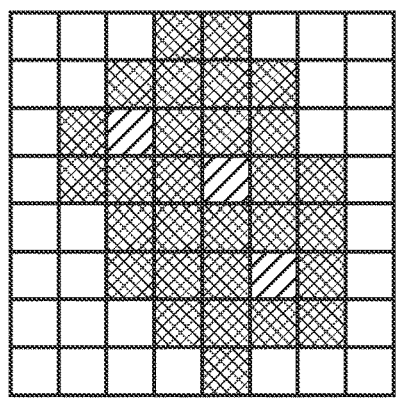
FIG. 32C shows an example touch profile having a size greater than the maximum blob size and having three peaks above the peak threshold.

FIG. 32C shows an example touch profile having a size greater than the maximum blob size and having three peaks above the peak threshold. This touch profile identified as an unintentional touch and is rejected.

Figure 32D:
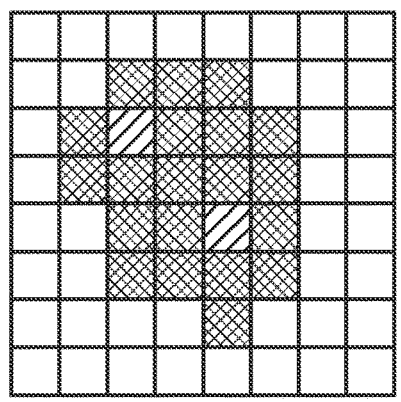
FIG. 32D shows an example touch profile having a greater than the maximum finger size, less than the maximum blob size, and having two peaks.

FIG. 32D shows an example touch profile having a greater than the maximum finger size, less than the maximum blob size, and having two peaks. Even though the touch profile is larger than a maximum finger size threshold, the touch is identified as an intentional touch because the size per number of peaks is less than a size/peak threshold for an intentional touch.

Figure 32E:
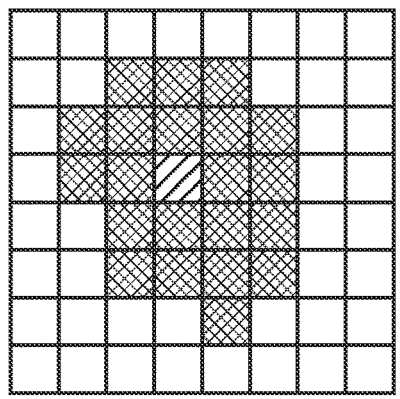
FIG. 32E shows an example touch profile having a greater than the maximum finger size, less than the maximum blob size, and having one peak.

FIG. 32E shows an example touch profile having a greater than the maximum finger size, less than the maximum blob size, and having one peak. The size and shape of the touch profile of FIG. 32E is the same as the size and shape of the touch profile of FIG. 32D. However, the touch profile of FIG. 32D has two peaks above the peak threshold and FIG. 32E has only one peak above the peak threshold. Thus, the touch profile of FIG. 32E is identified as an unintentional touch because the size per number of peaks is greater than a size/peak threshold for an intentional touch.

Figure 32F:
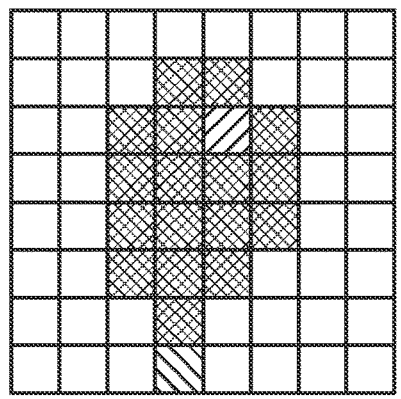
FIG. 32F shows an example touch profile that is identified as an unintentional touch based on touch profile shape.

FIG. 32F shows an example touch profile that is identified as an unintentional touch based on touch profile shape. The size of the touch profile is less than the maximum finger size profile, however, the profile is identified as an unintentional touch because the distance between one of the nodes and the peak is greater than a node to peak threshold.

The rules listed above are examples of rules that may be used to discriminate between intentional and unintentional touches. Other rules may be employed in the analysis and/or other pattern recognition techniques.

Figure 33:
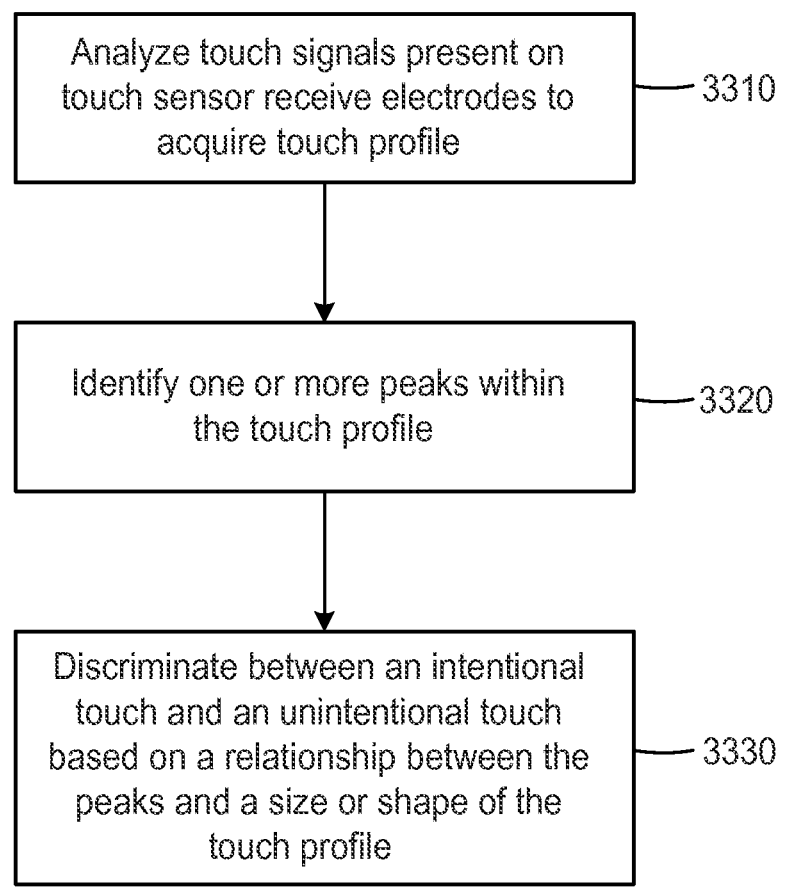
FIG. 33 is a flow diagram of method of operating a touch sensor in accordance with some embodiments.

FIG. 33 is a flow diagram of method of operating a touch sensor in accordance with some embodiments. The touch signals are analyzed 3310 to acquire a profile of a touch on a surface of the touch sensor. The touch profile is bounded by an edge of connected nodes that have a signal value greater than a touch threshold. One or more peak nodes corresponding to signal peaks within the touch profile are identified 3320. Discrimination between an intentional touch and an unintentional touch is based 3330 on a relationship between the one or more peak nodes and an area or shape of the touch profile.

In some implementations, the touch is determined to be an unintentional touch if the touch profile includes one peak node and the size of the profile is greater than a threshold size for a finger touch. The touch may be determined to be unintentional if the touch profile includes multiple peak nodes and the size of the profile is greater than a threshold area for multiple touches within the touch profile. The touch may be determined to be unintentional based on the size of the touch profile per number of peak nodes. The touch may be determined to be unintentional if the distance between at least one non-peak node in the profile and the peak node nearest to the non-peak node exceeds a threshold distance.

In some embodiments classifying the touch as unintentional or intentional is based on a history of one or more touch profile parameters over multiple scans of the touch panel. The touch profile parameters may comprise at least one of: number of peak nodes within the touch profile, profile size, profile shape, and connections between touch profile nodes over the multiple scans. In some embodiments, continuing unintentional touches are identified. In one implementation, a touch profile is classified as unintentional based on a first scan of the touch panel. On the next scan, any node having a signal value above the touch threshold that is connected to a node of the unintentional touch profile of the previous scan is classified as a node within a profile of a continuing unintentional touch. The continuing unintentional touch continues until it is reset by at least one scan in which each node of the unintentional touch has a touch signal value below the touch threshold. A subsequent touch that falls within the touch profile of an unintentional touch is identified as an intentional touch after there has been at least one scan of the touch panel for which no nodes within the profile of the unintentional touch have a signal value above the threshold value.

Discrimination between an intentional touch and an unintentional touch may occur during a first process of the touch analysis. After the intentional touches are identified, the touch profiles of the intentional touches are further analyzed to discriminate between intentional finger touches and intentional pen touches.

Various embodiments are discussed herein, including the following items:

Item 1. A pen for use with a touch sensor, comprising:
a pen body comprising:
a first end configured to provide a touch input to the touch sensor and to operate in active mode; and
a second end configured to provide a touch input to the touch sensor and to operate in active or passive mode.

Item 2. The pen of item 1, wherein the second end is configured to operate in passive mode.

Item 3. The pen of any of items 1 through 2, further comprising a switch configured to switch the second end between active mode and passive mode.

Item 4. The pen of item 3, wherein:
the first end comprises a first electrically conductive emitter portion; and
the second end comprises a second electrically conductive emitter portion; and
the pen circuitry comprises pen drive circuitry configured to emit first pen drive signals through the first emitter portion of the first end and to emit second pen drive signals through the second emitter portion of the second end.

Item 5. The pen of item 4, wherein the pen body includes a gripping portion and the second emitter portion is electrically insulated from a gripping portion of the pen body when the second pen end is operating in active mode and is electrically connected to the gripping portion of the pen body when the pen end is operated in passive mode.

Item 6. The pen of item 4, wherein at least one of the first and second pen drive signals includes a code.

Item 7. The pen of item 6, wherein the code is an identification code for the pen.

Item 8. The pen of item 6, wherein the code is an identification code for the pen end.

Item 9. The pen of item 6, wherein the code comprises a function code that indicates a function of at least one of the first and the second pen end.

Item 10. The pen of item 9, further comprising one or more switches wherein the function of at least one of the first and second pen ends is determined by a state of the one or more switches.

Item 11. The pen of any of items 1 through 10, further comprising a first pressure activated switch arranged to activate the pen when a first force above a first threshold level is applied to a tip at the first end of the pen.

Item 12. The pen of item 11, further comprising a second pressure activated switch arranged to activate the pen when a force above a threshold level is applied to a tip at the second end of the pen.

Item 13. The pen of item 12, wherein the pen is deactivated if the first force is below the first threshold level and the second force is below the second threshold level.

Item 14. The pen of any of items 1 through 13, wherein the pen circuitry includes communication circuitry configured to establish a communication connection with the touch sensor.

Item 15. The pen of item 14, wherein the touch sensor is configured to provide information about a function of a pen end to the pen through the communication connection.

Item 16. The pen of item 14, wherein the pen circuitry further comprises at least one switch that changes a pen function and the pen circuitry is configured to communicate information about the pen function to the touch sensor via the communication connection.

Item 17. The pen of item 16, wherein the switch is configured to change the pen function from erase to mark.

Item 18. The pen of item 1, wherein the first end comprises a first pen tip and the second end comprises a second pen tip and the first pen tip has a smaller cross sectional diameter than the second pen tip.

Item 19. The pen of item 18, wherein the first pen tip has a cross sectional diameter of in a range of about 0.7 mm to 1.7 mm and the second pen tip has a cross sectional diameter of in a range of about 3 mm to about 7 mm.

Item 20. A pen for use with a touch sensor, comprising:
a pen body comprising an electrically conductive emitter portion; and
pen circuitry comprising:
communication circuitry configured to provide a communication connection between the pen an external device and to receive a code through the communication connection; and
pen drive circuitry configured to generate pen drive signals that include the code, the pen drive signals emitted through the emitter portion of the pen body.

Item 21. The pen of item 20, wherein:
the pen body comprises an electrically conductive receiver portion that is electrically insulated and electrostatically shielded from the emitter portion; and
the pen drive circuitry comprises receiver circuitry configured to receive touch sensor drive signals from drive electrodes of the touch sensor,
wherein the pen drive circuitry generates the pen drive signals based on the touch sensor drive signals received from the drive electrodes.

Item 22. The pen of item 21, wherein the pen drive signals that include the code comprise at least one of:
pulses that are inverted with respect to the touch sensor drive signals; and
pulses that are neither phase additive nor phase subtractive with the touch sensor drive signals.

Item 23. The pen of item 21, wherein the pen drive signals that include the code comprise pulses that are out of phase with respect to the touch sensor drive signals.

Item 24. The pen of item 23, wherein the pulses are at least one of:
0 degrees out of phase;
180 degrees out of phase;
+90 degrees out of phase; and
−90 degrees out of phase.

Item 25. The pen of item 21, wherein the pen drive circuitry is configured to include the code in the pen drive signals by phase modulating the received touch sensor drive signals.

Item 26. The pen of item 21, wherein the pen drive circuitry is configured to include the code in the pen drive signals by amplitude modulating the received touch sensor drive signals.

Item 27. The pen of item 21, wherein the pen drive circuitry is configured to simultaneously receive the touch sensor drive signals and to generate the pen drive signals.

Item 28. The pen of item 20, wherein the external device comprises the touch sensor.

Item 29. The pen of any of items 20 through 28, wherein the external device comprises a central processor that communicates with one or more pens and one or more touch sensors.

Item 30. The pen of any of items 20 through 29, wherein the code is an identification code for the pen.

Item 31. The pen of any of items 20 through 30, wherein the communication connection is a wireless connection.

Item 32. The pen of any of items 20 through 31, wherein the pen circuitry is configured to transmit to the external device via the communication connection information associated with at least one of:
pen tilt angle;
pen barrel switch state;
pen tip switch state;
battery level;
globally unique identifier;
drive signal locked; and
received touch sensor drive signal magnitude.

Item 33. The pen of any of items 20 through 32, wherein the pen circuitry is configured to receive from the external device via the communication connection information associated with at least one of:
a number of touch sensor drive signal burst pulses;
a touch sensor drive signal frequency;
a command to enable or disable the pen drive signal;
a command to enable or disable tip switch gating of the pen drive signal;
the pen code;
a pen drive signal level; and
an identifier for the wireless connection between the pen and the touch sensor.

Item 34. The pen of any of items 20 through 33, wherein the pen circuitry is configured to emit the pen drive signals after the communication connection is established and the pen code is received.

Item 35. The pen of any of items 20 through 34, wherein the pen circuitry further comprises a pressure sensitive tip switch, and wherein the pen circuitry is configured to emit the pen drive signals after the pressure sensitive tip switch is activated.

Item 36. A touch system, comprising:
a touch sensor, comprising:
a matrix of drive and receive electrodes capacitively coupled at a plurality of nodes;
a controller configured to:
generate touch sensor drive signals and to apply the touch sensor drive signals to the drive electrodes;
detect a touch based on response signals present on the receive electrodes; and
a pen for use with a touch sensor, the pen comprising:
pen circuitry comprising:
communication circuitry configured to provide a communication connection with an external device and to receive a code through the communication connection; and
pen drive circuitry configured to generate a pen drive signals that includes the code and to emit the pen drive signals;
wherein the pen drive signals are capacitively coupled to the receive electrodes of the touch sensor when the pen is near the receive electrodes and the touch sensor controller is configured to receive the code from the pen through the receive electrodes.

Item 37. The system of item 36, wherein the external device is the touch sensor controller.

Item 38. The system of item 36, wherein the external device is a central processor that communicates with multiple pens and multiple touch sensors.

Item 39. The system of item 36, wherein the controller is configured to identify the pen based on the code and to transmit a touch location and pen identification information to a central processor.

Item 40. The system of any of items 36 through 39, wherein the controller is configured to suppress finger contact output to a central processor if pen contact is detected.

Item 41. A touch system, comprising:
multiple touch sensors;
multiple pens, each pen, comprising:
a pen body; and
pen circuitry disposed within the pen body, the pen circuitry configured generate pen drive signals that include an identification code; and
a central processor communicatively coupled to each pen and to each touch sensor, the central processor configured to transmit identification codes to the multiple pens and to transmit to the pen identification codes to multiple touch sensors.

Item 42. A pen for use with a touch sensor, comprising:
a pen body; and
pen circuitry disposed within the pen body, the pen circuitry comprising:
communication circuitry configured to provide a communication connection with the touch sensor and to receive a coordination message from the touch sensor via the communication connection; and
pen drive circuitry configured to generate pen drive signals that include a multi-digit code sequence, wherein the pen drive circuitry restarts the multi-digit code sequence in response to the coordination message.

Item 43. The pen of item 42, further comprising receiver circuitry configured to receive information about touch sensor drive signals, wherein the pen drive signals are generated based on the touch sensor drive signal information.

Item 44. The pen of item 43, wherein the information about the touch sensor drive signals comprises a synchronization signal received from the touch sensor.

Item 45. The pen of item 42, wherein:
the pen body comprises an electrically conductive receiver portion that is electrically insulated and electrostatically shielded from the emitter portion;
the pen drive circuitry comprises receiver circuitry configured to receive a touch sensor drive signal from drive electrodes of the touch sensor; and wherein the pen drive circuitry generates the pen drive signals that includes the multi-digit code sequence based on touch sensor drive signals received from the drive electrodes.

Item 46. The pen of item 45, wherein for each scan of the touch sensor drive signal, a pen drive signal includes one digit of the multi-digit code sequence.

Item 47. The pen of item 45, wherein each digit comprises one bit of the multi-digit code.

Item 48. The pen of item 45, wherein each digit comprises multiple bits of the multi-digit code.

Item 49. The pen of item 45, wherein the pen drive circuitry is configured to include the multi-digit code in the pen drive signals by phase modulating the received touch sensor drive signals.

Item 50. The pen of item 45, wherein the pen drive circuitry is configured to include the multi-digit code in the pen drive signal by amplitude modulating the touch sensor drive signals.

Item 51. The pen of item 42, wherein the multi-digit code sequence comprises a four digit code sequence.

Item 52. A touch system, comprising:
a touch sensor including communication circuitry configured to send a coordination message; and
a pen, comprising:
a pen body; and
pen circuitry disposed within the pen body, the pen circuitry comprising:
communication circuitry configured to receive the coordination message from the touch sensor; and
pen drive circuitry configured to generate pen drive signals that include a repeating multi-digit code sequence, wherein in response to the coordination message, the pen drive circuitry restarts the multi-digit code sequence.

Item 53. A touch system, comprising:
a touch sensor including communication circuitry configured to send a coordination message comprising a digit count; and
a pen, comprising:
a pen body; and
pen circuitry disposed within the pen body, the pen circuitry comprising:
communication circuitry configured to receive the coordination message from the touch sensor; and
pen drive circuitry configured to generate pen drive signals that include a repeating multi-digit code sequence, wherein in response to the coordination message, the pen drive circuitry emits a digit indicated by the digit count.

Item 54. A pen for use with a touch sensor, comprising:
a pen body; and
pen circuitry disposed within the pen body, the pen circuitry configured to generate a start code indicator followed by a pen drive signal that includes an identification code for the pen.

Item 55. The pen of item 54, wherein:
the pen body includes an optical or infrared window; and
the pen circuitry includes an optical or infrared emitter and the start code indicator is an optical signal emitted by the optical or infrared emitter through the optical window.

Item 56. The pen of any of items 54 through 55, wherein the pen drive signal includes the start code indicator followed by digits of the identification code.

Item 57. The pen of item 56, wherein the start code indicator is a code sequence that is uniquely distinguishable from the digits of the code.

Item 58. The pen of item 56, wherein the start code has a phase that is different from a phase of the digits the identification code.

Item 59. The pen of item 56, wherein the start code indicator has a magnitude that is different from a magnitude of the digits the identification code.

Item 60. The pen of item 56, wherein:
the pen body includes a receiver portion; and
the pen circuitry includes receiver circuitry configured to receive a touch sensor drive signal through the receiver portion, and wherein the start code indicator comprises a quantized form of the received touch sensor drive signal.

Item 61. The pen of item 60, wherein the pen circuitry is configured to compare a signal level of the received touch sensor drive signal to a threshold and to include a start signal indicator in the pen drive signal, the start code indicator having a first signal level if a magnitude of the received touch sensor drive signal is greater than the threshold and a second signal level if a magnitude of the received touch sensor drive signal is less than the threshold.

Item 62. The pen of item 61, wherein the first signal level is inverted with respect to the second signal level.

Item 63. A touch system, comprising:
a pen for use with a touch sensor, comprising:
a pen body; and
pen circuitry disposed within the pen body, the pen circuitry configured to emit a start code indicator followed by a pen drive signal that includes an identification code for the pen.
the touch sensor comprising:
a touch panel including a matrix of drive and receive electrodes; and
a controller including:
signal generator circuitry configured to generate touch drive signals and to apply the touch drive signals to the drive electrodes; and
receive circuitry configured to receive the start code indictor from the pen and to receive response signals on the receive electrodes, wherein the response signals include the code emitted by the pen.

Item 64. The system of item 63, wherein:
the pen body includes an optical or infrared window; and
the pen circuitry includes an optical or infrared emitter and the start code indicator is an optical or infrared signal emitted by the optical or infrared emitter through the optical window; and
the touch sensor includes an optical or infrared detector configured to detect the optical or infrared signal.

Item 65. The system of any of items 63 through 64, wherein:
the pen drive signal includes the start code indicator followed by digits of the identification code; and
the touch sensor response signals include the start code indicator and the code emitted by the pen.

Item 66. A pen for use with a touch sensor, comprising:
a pen body; and
pen circuitry disposed within the pen body, the pen circuitry configured to generate and emit a pen drive signal, the pen drive signal including a first code if the pen is in a first state and including a second code, different from the first code, if the pen is in a second state.

Item 67. The pen of item 66, wherein:
when the pen is in the first state, the pen interacts with the touch sensor according to a first set of functions; and
when the pen is in the second state, the pen interacts with the touch sensor according to a second set of functions, different from the first set.

Item 68. A pen for use with a touch sensor, comprising:
a pen body; and
pen circuitry disposed within the pen body, the pen circuitry comprising pen drive circuitry configured to generate a pen drive signal that includes a code, the pen drive signal coupled to electrodes of the touch sensor when the pen is in proximity to the touch sensor, wherein the code comprises a first code before the pen is mated with the touch sensor and the code comprises a second code, different from the first code, after the pen is mated with the touch sensor.

Item 69. The pen of item 68, wherein the first code is a wildcard code that is used by all unmated pens and the second code comprises an identification code that identifies the pen with respect to other pens interacting with the touch sensor.

Item 70. The pen of any of items 68 through 69, wherein:
before the pen is mated with the touch sensor, the pen interacts with the touch sensor according to a limited set of functions; and
after the pen is mated with the touch sensor, the pen interacts with the touch sensor according to an expanded set of functions.

Item 71. The pen of any of items 68 through 70, wherein the pen circuitry comprises communication circuitry configured to establish a wireless communication connection with the touch sensor and to receive the second code from the touch sensor through the communication connection.

Item 72. The pen of item 71, wherein:
the second code is an identification code for the pen;
the communication circuitry is configured to establish a communication connection with each of multiple touch sensors; and
the pen is configured to emit a different identification code for each of the multiple touch sensors.

Item 73. The pen of any of items 68 through 72, wherein the pen drive circuitry is configured to include the first code in the pen drive signal in response to at least one of:
interacting with the touch sensor for a predetermined period of time; and
a predetermined input.

Item 74. The pen of any of items 68 through 73, wherein the pen circuitry is configured to receive the second code from the touch sensor.

Item 75. The pen of item 74, wherein the second code is transmitted by at least one of an electromagnetic signal, an optical signal, and a magnetic signal.

Item 76. The pen of item 75, wherein the optical signal is transmitted to the pen through a touch panel of the touch sensor.

Item 77. The pen of any of items 68 through 76, wherein the pen circuitry comprises one or more input devices and the pen drive circuitry receives the second code based on states of the one or more input devices.

Item 78. The pen of item 77, wherein the one or more input devices comprise one or more of switches, a pressure sensor, a tilt detector, and an accelerometer.

Item 79. The pen of any of items 68 through 78, wherein:
the pen body further comprises:
an electrically conductive receiver portion; and
an electrically conductive emitter portion electrically insulated from the receiver portion, and electrically coupled to the pen drive circuitry, the pen drive signal emitted by the emitter portion; and
the pen circuitry further comprises:
receiver circuitry configured to receive a sensor drive signal applied to a drive electrode of the sensor through the receiver portion of the pen body, wherein the pen drive signal includes waveforms that are modulated versions of the sensor drive signal.

Item 80. The pen of item 79, wherein the pen drive signal that includes the code includes at least one pulse that is phase subtractive with the sensor drive signal.

Item 81. The pen of item 79, wherein the pen drive signal that includes the code comprises at least one waveform that includes signals that are phase subtractive with the touch sensor drive signal.

Item 82. A system, comprising:
at least one sensor comprising:
a matrix of drive and receive electrodes;
a controller configured to:
generate sensor drive signals and to apply the sensor drive signals to the drive electrodes; and
detect a pen based on response signals present on the receive electrodes; and
at least one pen, comprising:
a pen body; and
pen circuitry disposed within the pen body, the pen circuitry comprising:
pen drive circuitry configured to generate a pen drive signal that includes a code, the pen drive signal coupled to electrodes of the sensor when the pen is in proximity to the sensor, wherein the code comprises a first code before the pen is mated with the sensor and the code comprises a second code after the pen is mated with the sensor.

Item 83. The system of item 82, comprising communication circuitry configured to establish a wireless communication connection between the pen and the sensor.

Item 84. The system of any of items 82 through 83, wherein the sensor is configured to maintain a list of used pen codes and a list of available pen codes.

Item 85. The system of any of items 82 through 84, wherein:
the sensor is configured to send a code request to the pen circuitry via the communication connection; and
in response to the code request, the pen circuitry is configured to emit the second code if the pen is mated with the sensor and to emit the first code if the pen is not mated with the sensor.

Item 86. The system of item 82, wherein the sensor compares the second code emitted by the pen to a list of used codes and recognizes the pen as a previously mated pen if the second code is included in the list.

Item 87. The system of any of items 82 through 86, wherein the sensor is configured to assign the second code to the pen if the pen emits the first code.

Item 88. The system of item 87, wherein the sensor is configured to:
confirm that the pen is emitting the assigned second code;
add the second code assigned by the sensor to the list of used codes in response to the confirmation; and
flag the pen as mated.

Item 89. The system of any of items 82 through 88, wherein the pen is configured to establish a wireless communication connection with each of multiple touch sensors.

Item 90. The system of any of items 82 through 89, wherein the sensor includes a reset area and the controller sends the second code to the pen through the sensor drive electrodes when the pen touches the reset area.

Item 91. The system of any of items 82 through 90, wherein the system includes a display, wherein instructions on how to reset the pen code are displayed on the display.

Item 92. The system of item 91, wherein the sensor sends the second code to the pen through the sensor drive electrodes in response to successful completion of the instructions.

Item 93. A pen for use with a sensor, comprising:
a pen body comprising:
an emitter portion; and
an optical window; and
pen circuitry comprising:
photodetector circuitry configured to sense an optical signal transmitted through the optical window; and
signal generator circuitry configured to generate a pen drive signal that includes an identification code in response to the optical signal and to emit the pen drive signal through the emitter portion.

Item 94. The pen of item 93, wherein the pen drive circuitry is configured to emit a pen drive signal including a wildcard code before a change in the optical signal is detected and to begin emitting the pen drive signal including the identification code after the change in the optical signal is detected.

Item 95. The pen of item 94, wherein the pen drive circuitry is configured to continue emitting the pen drive signal including the generic code if the change in the optical signal is not detected.

Item 96. The pen of item 94, wherein the change comprises one or more of a change in intensity and a change in color.

Item 97. The pen of any of items 93 through 96, wherein:
the pen circuitry comprises receive circuitry configured to receive a sensor drive signal from the sensor; and
the signal generator circuitry is configured to begin emitting the pen drive signal after the sensor drive signal is received.

Item 98. The pen of any of items 93 through 97, wherein the pen circuitry includes communication circuitry configured to provide a communication connection with the sensor and the identification code is transmitted to the pen through the communication connection.

Item 99. The pen of any of items 93 through 98, wherein the pen circuitry includes receive circuitry configured to receive localized signals from the sensor and the identification code is transmitted to the pen through the localized signals.

Item 100. The pen of any of items 93 through 99, wherein the identification code is programmed into the pen hardware or firmware.

Item 101. The pen of any of items 93 through 100, wherein the signal generator circuitry is configured to change the pen identification code based on the optical signal.

Item 102. A system, comprising:
a sensor, comprising:
a sensor panel, wherein an optical signal provided by a display is viewable through the panel;
a controller configured to:
generate sensor drive signals and to detect pen touches based on at least one signal change from the sensor panel;
a pen for use with the sensor, comprising:
pen circuitry configured to couple to the panel, causing a signal change locatable by the sensor; and
photodetector circuitry configured to sense the optical signal;
signal generator circuitry configured to generate a confirmation signal in response to the optical signal, and to emit the confirmation signal.

Item 103. The system of item 102, wherein the confirmation signal comprises an identification code.

Item 104. The system of any of items 102 through 103, wherein the panel comprises a capacitive sensor panel.

Item 105. The system of any of items 102 through 103, wherein the panel comprises a force sensor panel.

Item 106. The system of any of items 102 through 103, wherein the panel comprises an acoustic sensor panel.

Item 107. The system of any of items 102 through 103, wherein the panel comprises an optical sensor panel.

Item 108. The system of any of items 102 through 107, wherein the controller is configured to determine a location of a touch and to control the display to provide the optical signal at the location of the touch.

Item 109. The system of item 108, wherein the optical signal comprises a cursor.

Item 110. The system of any of items 102 through 109, wherein the controller is configured to determine locations of multiple concurrent touches and to control the display to provide optical signals at the locations of the touches.

Item 111. The system of any of items 102 through 110, wherein the controller is configured to:
determine locations of multiple concurrent touches;
identify one or more of the locations that are most likely to be pen touch locations; and
control the display to provide optical signals at the one or more most likely pen touch locations.

Item 112. The system of any of items 102 through 111, wherein the controller is configured to control the display to increase and decrease an intensity of the optical signal.

Item 113. The system of any of items 102 through 112, wherein the controller is configured to control the display to change a color of the optical signal.

Item 114. The system of any of items 102 through 113, wherein the controller is configured to receive the identification code via the response signals.

Item 115. The system of any of items 102 through 114, wherein:
the confirmation signal comprises a pen identification code; and
the controller is configured to:
determine a location of a touch;
control the display to change the optical signal at the location of the touch;
associate the identification code with the pen if the identification code is received from the pen via the touch sensor response signals; and
discontinue the optical signal and identify the touch as an unmated pen or a finger touch if the identification code is not received.

Item 116. The system of any of items 102 through 115, wherein the controller is configured to:
determine a location of a touch;
control the display to change the optical signal at the location of the touch;
receive a confirming signal indicating that the optical signal was received by a pen; and
to discontinue the optical signal and identify the touch as a passive pen or a finger touch if the confirming signal is not received.

Item 117. A system, comprising:
a magnetic digitizer, comprising:
a digitizer panel;
a controller configured to:
generate digitizer drive signals and to detect pens based on changes in magnetic fields in the digitizer;
an optical signal provided by a display viewable through the digitizer;
a pen for use with the digitizer, comprising:
a pen body comprising:
a pen circuit configured to magnetically couple to the digitizer, causing a magnetic field change locatable by the digitizer;
and
pen circuitry comprising:
photodetector circuitry configured to sense the optical signal;

signal generator circuitry configured to generate a confirmation signal in response to the optical signal, and to emit the signal.

Item 118. The system of item 117, wherein the confirmation signal comprises a change in the pen magnetic field.

Item 119. The system of item 117, wherein the confirmation signal comprises a pen identification code.

Item 120. A pen for use with a sensor panel, comprising:
a pen body; and
pen circuitry that includes pen drive circuitry disposed within the pen body, the pen drive circuitry configured to emit a pen drive signal, wherein the pen drive signal includes a first code if a rate of movement of the pen is below a threshold and the pen drive signal includes a second code, different from the first code if the rate of movement of the pen is above the threshold.

Item 121. The pen of item 120, further comprising:
a pen sensor configured to generate a signal in response to the movement of the pen; and
movement circuitry configured to determine if the movement of the pen exceeds the threshold based on the sensor signal.

Item 122. The pen of item 121, wherein the pen sensor comprises an accelerometer.

Item 123. The pen of any of items 120 through 122, further comprising communication circuitry configured to provide a communication connection with the sensor panel, wherein pen movement information is received by the pen from the touch sensor via the communication connection.

Item 124. The pen of any of items 120 through 123, wherein:
the first code is an identification code that identifies the pen; and
the second code is a generic code.

Item 125. The pen of item 124, wherein the generic code is selected to have minimum time required for recognition, relative to other codes.

Item 126. The pen of item 124, wherein the generic code is selected to have maximum signal/noise ratio, relative to other codes.

Item 127. A system, comprising:
a sensor panel;
movement circuitry configured to determine if a rate of movement of the pen body exceeds a threshold;
a pen, comprising:
a pen body; and
pen circuitry that includes pen drive circuitry disposed within the pen body, the pen drive circuitry configured to emit a pen drive signal wherein the pen drive signal includes a first code if a rate of movement of the pen is below a threshold and the pen drive signal includes a second code, different from the first code, if the rate of movement of the pen is above the threshold.

Item 128. The system of item 127, wherein the first code is an identification code for the pen and the second code is a generic code used by multiple pens interacting with the touch sensor.

Item 129. The system of any of items 127 through 128, wherein the pen circuitry includes the movement circuitry.

Item 130. The system of any of items 127 through 129, further comprising:
a controller coupled to the sensor panel, the controller comprising the movement circuitry; and
communication circuitry configured to provide a communication connection between the pen and the controller, wherein the controller sends movement information to the pen via the communication connection.

Item 131. A system, comprising:
a sensor panel and a controller; and
an active pen configured to interact with the sensor panel, wherein the controller identifies the pen when the pen is operating in a first state and the pen sends a code that identifies the pen when the pen is operating in a second state, different from the first state.

Item 132. The system of item 131, wherein:
the first state comprises rate of movement of the pen relative to a sensor surface of the sensor panel below a threshold rate; and
the second state comprises rate of movement of the pen relative to the sensor surface above the threshold rate.

Item 133. The system of any of items 131 through 132, wherein the controller identifies the pen based on a pen identification code emitted by the pen when the pen is operating in the first state and the controller identifies the pen through touch location processing when the pen is operating in the second state.

Item 134. The system of any of items 131 through 133, wherein controller is configured to transition between identifying the pen based on the pen identification code to identifying the pen based on touch location processing.

Item 135. A touch system, comprising:
a touch sensor, comprising:
a matrix of drive and receive electrodes capacitively coupled at a plurality of nodes;
a controller configured to:
generate a touch sensor drive signal and to apply the touch sensor drive signal to the drive electrodes;
detect a touch based on response signals present on the receive electrodes; and
a pen for use with the touch sensor, comprising:
a pen body comprising:
an electrically conductive emitter portion; and
pen circuitry comprising:
signal generator circuitry configured to generate a pen drive signal based on the touch sensor drive signal and to emit the pen drive signal through the emitter portion of the pen body, wherein when the pen drive signal is capacitively coupled to the receive electrodes, response signals that occur on the receive electrodes in response to the pen drive signal have a substantially similar waveshape when compared to response signals that occur in response to a finger touch.

Item 136. The system of item 135, wherein the pen drive signal generated by the signal generator circuitry simulates the effect of a finger touch.

Item 137. A pen for use with a touch sensor, comprising:
a pen body comprising:
an electrically conductive emitter portion; and
pen circuitry comprising:
signal generator circuitry configured to generate a pen drive signal and to emit the pen drive signal through the emitter portion of the pen body, wherein when the pen drive signal is capacitively coupled to the receive electrodes, response signals that occur on receive electrodes of the touch sensor in response to the pen drive signal have a substantially similar waveshape when compared to response signals that occur on receive electrodes in response to a finger touch.

Item 138. A touch sensor, comprising:
  a matrix of drive and receive electrodes capacitively coupled at a plurality of nodes;
  a controller comprising:
    sensor signal generator circuitry configured to generate a touch sensor drive signal and to apply the touch sensor drive signal to the drive electrodes;
    sensor receive circuitry configured to receive response signals present on the receive electrodes; and
    filter circuitry configured to filter the response signals, wherein a demodulation efficiency for filtered response signals that occur in response to a pen touch is substantially similar to a demodulation efficiency of filtered response signals that occur in response to a finger touch.

Item 139. A touch sensor, comprising:
  a matrix of drive and receive electrodes capacitively coupled at a plurality of nodes;
  a controller comprising:
    sensor signal generator circuitry configured to generate a touch sensor drive signal and to apply the touch sensor drive signal to the drive electrodes;
    sensor receive circuitry configured to receive response signals present on the receive electrodes; and
    filter circuitry configured to filter the response signals, wherein the filter is configured to operate with a first demodulator function to measure the response signals generated in response to a finger touch and to operate with a second demodulator function to measure the response signals generated in response to a pen touch.

Item 140. The touch sensor of item 139, wherein the controller is configured to discriminate between the pen touch and the finger touch based on the filtered response signals.

Item 141. The touch sensor of item 140, wherein filtered response signals generated in response to the pen touch include signals that have an amplitude above a touch detection threshold and response signals generated in response to a finger touch include signals that have an amplitude below a touch detection threshold.

Item 143. A pen configured to capacitively couple with a touch sensor at a touch location, the pen comprising:
  a pen body comprising:
    a first receiver/emitter portion proximal with respect to the touch location;
    a second receiver/emitter portion distal with respect to the touch location; and pen circuitry comprising:
    receiver circuitry configured to receive a touch sensor drive signal from drive electrodes of the touch sensor, the receiver circuitry configured to receive the touch sensor drive signal through the first receiver/emitter portion during a first time period and to receive the touch sensor drive signal through the second receiver/emitter portion during a second time period; and
    signal generator circuitry configured to generate a pen drive signal based on the received touch sensor drive signal and to emit the pen drive signal through the second receiver/emitter portion during the first time period and to emit the pen drive signal through the first receiver/emitter portion during the second time period.

Item 144. The pen of item 143, wherein:
  the first receiver/emitter portion comprises a tip of the pen; and
  the second receiver/emitter portion comprises a cone of the pen.

Item 145. The pen of any of items 143 through 144, wherein the signal generator circuitry is configured to generate the pen drive signal by modulation of the touch sensor drive signal.

Item 146. The pen of item 145, wherein the modulation comprises one or more of amplitude modulation, phase modulation, quantization, storage and re-transmission after a delay and code modulation.

Item 147. The pen of any of items 143 through 146, wherein a magnitude of the pen drive signal is proportional to a magnitude of the touch sensor drive signal.

Item 148. The pen of any of items 142 through 146, wherein a magnitude of the pen drive signal is a fixed value.

Item 149. The pen of item 148, wherein the pen circuitry comprises a comparator arranged to compare the magnitude of the touch sensor drive signal to a threshold, and wherein the magnitude of the pen drive signal is the fixed value if the magnitude of the touch sensor drive signal is above the threshold.

Item 150. The pen of item 148, wherein the magnitude of the pen drive signal is a first fixed value if the magnitude of the touch sensor drive signal is above a first threshold and the magnitude of the pen drive signal is a second fixed value if the magnitude of the touch sensor drive signal is below a second threshold.

Item 151. A system, comprising:
  a pen configured to capacitively couple with a touch sensor at a touch location, the pen comprising:
    a pen body comprising:
      a first receiver/emitter portion proximal with respect to the touch location;
      a second receiver/emitter portion distal with respect to the touch location; and pen circuitry comprising:
      receiver circuitry configured to receive a touch sensor drive signal from drive electrodes of the touch sensor, the receiver circuitry configured to receive the touch sensor drive signal through the first receiver/emitter portion during a first time period and to receive the touch sensor drive signal through the second receiver/emitter portion during a second time period; and
      signal generator circuitry configured to generate a pen drive signal based on the received touch sensor drive signal and to emit the pen drive signal through the second receiver/emitter portion during the first time period and to emit the pen drive signal through the first receiver/emitter portion during the second time period; and
  the touch sensor, comprising:
    a touch panel comprising capacitively coupled drive electrodes and receive electrodes; touch sensor circuitry configured to:
      generate the touch sensor drive signal;
      determine a touch location based on response signals carried on the receive electrodes, the response signals responsive to the touch sensor drive signal and to the pen drive signal emitted during the first time period and the second time period.

Item 152. The system of item 151, wherein the touch sensor circuitry is configured to:
  determine the touch location along a first coordinate axis using a portion of the response signal that is responsive to the pen drive signal emitted during the first time period; and
  determine the touch location along a second coordinate axis using a portion of the response signal that is responsive to the pen drive signal emitted during the second time period.

Item 153. A pen configured to capacitively couple with a touch sensor at a touch location, the pen comprising:
a pen body comprising an emitter portion and a receiver portion; and
pen circuitry comprising:
receiver circuitry configure to receive a touch sensor drive signal through the receiver portion; and
signal generator circuitry configured to generate a pen drive signal based on the received touch sensor drive signal and to emit the pen drive signal through the emitter portion, the pen drive signal modulated according to digits of a code.

Item 154. The pen of item 153, wherein the digits of the code are a phase modulated form of the received touch sensor drive signal.

Item 155. The pen of item 153, wherein the digits of the code are an amplitude modulated form of the received touch sensor drive signal.

Item 156. The pen of item 153, wherein digits of the code are a quantized form of the received touch sensor drive signal.

Item 157. The pen of item 153, wherein the digits of the code are a fixed first amplitude if the received touch sensor drive signal is above a threshold and a fixed second amplitude if the received touch sensor drive signal is below the threshold.

Item 158. The pen of item 153, wherein the digits of the code are a fixed first amplitude if the received touch sensor drive signal is above a first threshold and a fixed second amplitude if the received touch sensor drive signal is below a second threshold.

Item 159. The pen of item 153, wherein the digits of the code are a null form of the received touch sensor drive signal if the received touch sensor drive signal is above a threshold.

Item 160. The pen of item 159, wherein the null form comprises a zero level or unchanging level output.

Item 161. A system, comprising:
a touch sensor, comprising:
a touch panel comprising capacitively coupled drive electrodes and receive electrodes;
touch sensor circuitry comprising:
signal generator circuitry configured to generate a touch sensor drive signal;
touch location circuitry configured to determine a touch location based on response signals carried on the receive electrodes, the response signals responsive to the touch sensor drive signal and to a pen drive signal; and
a pen configured to capacitively couple with the touch sensor at the touch location, the pen comprising:
a pen body comprising an emitter portion and a receiver portion; and
pen circuitry comprising:
receiver circuitry configure to receive a touch sensor drive signal through the receiver portion; and
signal generator circuitry configured to generate the pen drive signal based on the received touch sensor drive signal and to emit the pen drive signal through the emitter portion, the pen drive signal modulated according to digits of a code.

Item 162. The system of item 161, wherein the pen drive signal has an amplitude that is proportional to the received touch sensor drive signal.

Item 163. The system of item 162, wherein the proportionality of the pen drive signals to the received touch sensor drive signals is reproduced in the response signals and the touch location circuitry is configured to determine the location of the pen with respect to the drive electrodes based on the proportionality of the pen drive signal to the received touch sensor drive signal.

Item 164. The system of item 162, wherein the touch location circuitry is configured to interpolate the touch location with respect to the drive electrodes based on the proportionality of the pen drive signal to the received touch sensor drive signal.

Item 165. A pen for use with a touch sensor, comprising:
a pen body comprising:
a receiver portion; and
an emitter portion; and
pen circuitry comprising:
receiver circuitry configured to receive a touch sensor drive signal from at least a first drive electrode of the touch sensor through the receiver portion of the pen body during a scan of the first drive electrode by the touch sensor; and
signal generator circuitry configured to generate a pen drive signal based on the received touch sensor drive signal and to emit the pen drive signal through the emitter portion of the pen body during a scan of a second drive electrode of the touch sensor separated in time by a predetermined delay from the scan of the first drive electrode.

Item 166. The pen of item 165, wherein:
the receiver circuitry is configured to receive touch sensor drive signals during scans of a group of touch sensor drive electrodes that includes the first touch sensor drive electrode; and
the pen circuitry further comprises touch location circuitry configured to determine a local touch location based on the touch sensor drive signals received from the group of touch sensor drive electrodes.

Item 167. The pen of item 166, wherein the touch sensor drive signal received by the receiver circuitry during a scan of the first electrode has a larger amplitude when compared to the touch sensor drive signal received during scans of other touch sensor drive electrodes of the group.

Item 168. The pen of any of items 165 through 167, wherein a scan period between adjacent touch sensor drive electrodes is Td and the predetermined delay is an integer multiple of Td.

Item 169. The pen of any of items 165 through 168, wherein the pen drive signal includes a multi-digit code.

Item 170. The pen of item 169, the pen drive signal includes multiple pulse sequences emitted during a scan cycle of a group of touch sensor drive electrodes, the group of touch sensor drive electrodes including the first touch sensor drive electrode; and
the code is included in the pen drive signal during the scan cycle of the group of touch sensor drive electrodes.

Item 171. The pen of item 170, wherein the code includes at least one pulse sequence of the pen drive signal is phase subtractive with respect to the touch sensor drive signal and at least another pulse sequence of the pen drive signal is phase additive with respect to the touch sensor drive signal.

Item 172. The pen of item 165, wherein one digit of the multi-digit code is included in the pen drive signal for each scan cycle of the touch sensor drive electrodes.

Item 173. The pen of item 165, wherein one digit of a multi-digit code is represented in the pen drive signal as a pulse train including pulses that are phase additive or phase subtractive with the touch sensor drive signal.

Item 174. The pen of item 165, wherein two or more digits of a multi-digit code are included in the pen drive signal for each scan cycle of the touch sensor drive electrodes.

Item 175. The pen of any of items 165 through 174, wherein:
the pen circuitry further comprises communication circuitry configured to provide a communication connection between the pen and the touch sensor; and
the pen circuitry is configured to send an amplitude of the received touch sensor drive signal to the touch sensor through the communication connection.

Item 176. The pen of any of items 165 through 174, wherein the pen circuitry comprises:
communication circuitry configured to provide a communication connection between the pen and the touch sensor; and
touch location circuitry configured to determine a touch location of the pen with respect to the drive electrodes, wherein the pen circuitry is configured to send the touch location to the touch sensor through the communication connection.

Item 177. The pen of item 176, wherein the pen is configured to interpolate the touch location of the pen based on the touch sensor drive signals received by the pen.

Item 178. A touch system, comprising:
a touch sensor, comprising:
a matrix of drive and receive electrodes capacitively coupled at a plurality of nodes;
a controller comprising:
signal generator circuitry configured to generate a touch sensor drive signal and to apply the touch sensor drive signal sequentially to each the drive electrodes during a scan cycle;
receiver circuitry configure to receive response signals from the receive electrodes; and
touch location circuitry configured to determine a touch location based on response signals present on the receive electrodes; and
a pen for use with the touch sensor, comprising:
a pen body comprising:
a receiver portion; and
an emitter portion; and
pen circuitry comprising:
receiver circuitry configured to receive the touch sensor drive signal from at least a first drive electrode of the touch sensor through the receiver portion of the pen body during a scan of the first drive electrode by the touch sensor; and
signal generator circuitry configured to generate a pen drive signal based on the touch sensor drive signal and to emit the pen drive signal through the emitter portion of the pen body during a scan of a second drive electrode of the touch sensor separated in time by a predetermined delay from the scan of first drive electrode.

Item 179. The system of item 178, further comprising communication circuitry configured to provide a communication connection between the pen and the touch sensor, wherein the touch sensor receives a touch location of the pen with respect to the drive electrodes from the pen through the communication connection and the touch location circuitry determines the touch location with respect to the receive electrodes.

Item 180. The system of any of items 178 through 179, wherein:
a scan period between adjacent touch sensor drive electrodes during the scan cycle is Td and the predetermined delay is an integer multiple of Td; and
the touch location circuitry is configured to take into account the predetermined delay when determining the touch location.

Item 181. A pen for use with a sensor, comprising:
pen circuitry comprising:
touchdown detection circuitry configured to detect touchdown of the pen on a surface of the sensor;
signal generator circuitry configured to generate pen drive signals and to emit the pen drive signals while the pen is in contact with the sensor surface;
clock circuitry configured to generate a pen timestamp associated with the touchdown of the pen on the touch sensitive surface; and
communication circuitry configured to provide a communication connection with the touch sensor, and to send the pen timestamp to the sensor through the communication connection.

Item 182. The pen of item 181, wherein the pen comprises:
a pen body, comprising:
an receiver portion; and
an emitter portion, and
the pen circuitry comprises a receiver portion configured to receive sensor drive signal through the receiver portion of the pen, and wherein the signal generator circuitry is configured to generate the pen drive signals based on the received sensor drive signals.

Item 183. The pen of item 182, wherein the signal generator circuitry is configured to modulate the sensor drive signal in a way that is uncharacteristic of a finger touch.

Item 184. The pen of item 182, wherein at least some of the pen drive signals are phase additive with respect to the touch sensor drive signals.

Item 185. The pen of item 182, wherein the signal generator circuitry is configured to generate a pen drive signal having pulses of a predetermined level if a touch sensor drive signal is above a threshold.

Item 186. The pen of item 185, wherein the predetermined level is a fixed positive or negative amplitude.

Item 187. The pen of item 185, wherein the predetermined level is a zero level output.

Item 188. A system, comprising:
a sensor, comprising:
a panel comprising a pen sensitive surface;
a controller comprising:
pen detection circuitry configured to detect pens on the pen sensitive surface;
clock circuitry configured to generate a sensor timestamps when the pens are detected;
communication circuitry configured to provide communication links with one or more pens and to receive pen timestamps from the pens;
pen tracking circuitry configure to correlate the pen timestamps with the sensor timestamps and to identify and track movements of the pens based on the correlation between the pen time stamps and the sensor time stamps.

Item 189. The system of item 188, further comprising:
a pen, comprising:
detection circuitry configured to detect pen contact with a pen sensitive surface;
a clock and logic circuitry configured to timestamp the time of contact with a pen sensitive surface; and
communication circuitry configured to provide communication links with one or more sensors and to transmit pen timestamps to the sensor.

Item 190. The system of any of items 188 through 189, wherein sensor timestamps and the pen timestamps are asynchronous with respect to each other.

Item 191. The system of any of items 188 through 190, wherein the touch tracking circuitry is configured:

for each touch, to calculate a difference between a sensor timestamp for the touch and a pen timestamp for the touch; and to track movements of multiple pens based on differences in the sensor timestamps and the pen timestamps for the multiple pens.

Item 192. The system of any of items 188 through 191, wherein a latency for associating a pen timestamp with a sensor timestamp is greater than a latency of the communication connection.

Item 193. The system of any of items 188 through 192, wherein the touch tracking circuitry is further configured to discriminate between a pen and a finger touch.

Item 194. The system of any of items 188 through 193, wherein:

the panel comprises drive electrodes and receive electrodes \; and the controller comprises:

signal generator circuitry configured to apply the sensor drive signals sequentially to the drive electrodes; and receiver circuitry configured to receive response signals on the receive electrodes, the response signals indicative of the pen touches; and further comprising the one or more pens configured to couple to the electrodes at the pen touch locations.

Item 195. The system of item 194, wherein a profile of the response signals indicates that a set of adjacent signals represents a pen touch.

196. The system of any of items 188 through 195, wherein the communication circuitry of the touch sensor is configured to send a message to a pen after the pen has been identified by the touch sensor.

Item 197. The system of any of items 188 through 196, wherein the pen drive signals sent by a pen include a code that identifies the pen.

Item 198. A pen for use with a touch sensor, comprising:

pen circuitry comprising:

touchdown detection circuitry configured to detect touchdown of the pen on a touch sensitive panel of the touch sensor;

signal generator circuitry configured to generate pen drive signals based on touch sensor drive signals during scans of the panel by the touch sensor, the pen drive signals including a pen code, wherein the pen drive signals include a first code digit during a first scan of the panel after the touchdown detection circuitry detects the touchdown and the pen drive signals include subsequent code digits during subsequent scans of the panel.

Item 199. The pen of item 198, wherein at least one digit of the pen code is phase additive with the touch sensor drive signal.

Item 200. The pen of item 198, wherein at least one of the first two digits of the pen code is phase additive with the touch sensor drive signal.

Item 201. A method of determining a touch location on a touch surface of a touch panel comprising a matrix of intersecting electrodes with nodes at intersections of the electrodes, the method comprising:

discriminating between one or more intentional touches and one or more unintentional touches on the touch surface using first criteria; and for each touch identified as an intentional touch, discriminating between a finger touch and a pen touch using second criteria.

Item 202. The method of item 201, wherein the intentional touches comprise multiple temporally overlapping touches.

Item 203. The method of any of items 201 through 202, wherein discriminating between the intentional and unintentional touches using the first criteria comprises identifying a touch as an unintentional touch based on at least one of:

a size of a profile of the touch on the touch surface;

a number of peaks within the profile; and a distance between a peak of the profile and nodes of the profile.

Item 204. The method of any of items 201 through 203, wherein discriminating between the pen touch and the finger touch using the second criteria comprises:

determining a slope of a profile of a touch on the touch surface;

identifying the touch as a finger touch if the slope is greater than a slope threshold; and identifying the touch as a potential pen touch if the slope is less than the slope threshold.

Item 205. The method of any of items 201 through 204, wherein discriminating between the finger touch and the pen touch comprises identifying the touch as a pen touch if a distance between a touch and a profile of a previously identified intentional or unintentional touch is greater than a distance threshold.

Item 206. The method of any of items 201 through 205, wherein discriminating between the finger touch and the pen touch comprises identifying the touch as a pen touch if nodes within the predetermined radius of a profile of the touch have signal values less than an ambient threshold.

Item 207. The method of any of items 201 through 206, further comprising re-identifying the pen touch as a finger touch if the pen touch was previously identified as a finger touch.

Item 208. The method of any of items 201 through 207, wherein discriminating between the intentional and the unintentional touch comprises:

determining a profile of a touch on the touch surface; and identifying the touch as an unintentional touch based on one or more of:

a size of the profile;

a number of peaks within the profile; and a distance between a peak of the profile and nodes of the profile.

Item 209. A touch sensor, comprising:

a touch panel having a touch surface and a matrix of electrodes with nodes at intersections of the electrodes; and a touch controller configured to discriminate between one or more intentional touches and one or more unintentional touches on the touch surface using first criteria; and for each touch identified as an intentional touch, discriminates between a finger touch and a pen touch using second criteria.

Item 210. The touch sensor of item 209, wherein the intentional touches comprise multiple temporally overlapping touches.

Item 211. The touch sensor of any of items 209 through 210, wherein the controller discriminates between the intentional and unintentional touches using the first criteria by identifying a touch as an unintentional touch based on at least one of:

a size of a profile of the touch on the touch surface;
a number of peaks within the profile; and
a distance between a peak of the profile and nodes of the profile.

Item 212. The touch sensor of any of items 209 through 211, wherein the controller discriminates between the pen touch and the finger touch using the second criteria by:
determining a slope of a profile of a touch on the touch surface;
identifying the touch as a finger touch if the slope is greater than a slope threshold; and
identifying the touch as a potential pen touch if the slope is less than the slope threshold.

Item 213. The touch sensor of any of items 209 through 212, wherein the controller discriminates between the finger touch and the pen touch by identifying the touch as a pen touch if a distance between a touch and a profile of a previously identified intentional or unintentional touch is greater than a distance threshold.

Item 214. The touch sensor of any of items 209 through 213, wherein controller is configured to discriminate between the finger touch and the pen touch by identifying the touch as a pen touch if nodes within the predetermined radius of a profile of the touch have signal values less than an ambient threshold.

Item 215. The touch sensor of any of items 209 through 214, wherein the controller is configured to re-identify the pen touch as a finger touch if the pen touch was previously identified as a finger touch.

Item 216. The touch sensor of any of items 209 through 215, wherein the controller is configured to discriminate between the intentional and the unintentional touch by:
determining a profile of a touch on the touch surface; and
identifying the touch as an unintentional touch based on one or more of:
a size of the profile;
a number of peaks within the profile; and
a distance between a peak of the profile and nodes of the profile.

Item 217. A method of operating a touch sensor, the method comprising:
determining a profile of a touch on a touch surface of the touch sensor, the touch profile bounded by an edge of connected nodes having a signal value greater than a threshold;
identifying one or more peak nodes corresponding to signal peaks within the touch profile; and
classifying the touch as an intentional touch or an unintentional touch based on the one or more peak nodes and an area or shape of the touch profile.

Item 218. The method of item 217, wherein classifying the touch comprises classifying the touch as an unintentional touch if the touch profile includes one peak node and the area of the profile is greater than a threshold area for a finger touch.

Item 219. The method of item 217, wherein classifying the touch comprises classifying the touch as unintentional if the touch profile includes multiple peak nodes and the area of the profile is greater than a threshold area for multiple touches within the touch profile.

Item 220. The method of item 217, wherein classifying the touch comprises classifying the touch as unintentional based on a number of peak nodes as a function of the area of the touch profile.

Item 221. The method of item 217, wherein classifying the touch comprises classifying the touch as unintentional if a distance between at least one non-peak node in the profile and a peak node nearest to the non-peak node exceeds a threshold distance.

Item 222. The method of item 217, wherein classifying the touch comprises classifying the touch based on a history over multiple scans of the touch panel of at least one of:
number of peak nodes within the touch profile,
profile area,
profile shape; and
connections between touch profile nodes over the multiple scans.

Item 223. The method of any of items 217 through 222, wherein:
classifying the touch comprises classifying the touch as unintentional during a first scan of the touch panel; and
on a next scan of the touch panel, classifying any node having a signal value above the threshold that is connected to a node of the unintentional touch of the previous scan as a node within a profile of a continuing unintentional touch.

Item 224. The method of item 223, further comprising:
identifying a subsequent touch that falls within the profile of the unintentional touch or the continuing unintentional touch as an intentional touch only after there has been at least one scan of the touch panel for which no nodes within the profile of the unintentional touch or the continuing unintentional touch have a signal value above the threshold value.

Item 225. The method of any of items 217 through 224, further comprising discriminating between an intentional pen touch and an intentional finger touch.

Item 226. A touch sensor, comprising:
a touch panel having a touch surface and a matrix of electrodes with nodes at intersections of the electrodes; and
a touch controller configured to
identify a profile of a touch on the touch surface, the profile bounded by an edge of connected nodes having a signal value greater than a threshold;
identify one or more peak nodes corresponding to signal peaks within the touch profile; and
discriminate between the intentional touch and an unintentional touch based on the one or more peak nodes and an area or shape of the touch profile.

Item 227. The touch sensor of item 226, wherein the controller is configured to classify the touch as an unintentional touch if the touch profile includes one peak node and the area of the profile is greater than a threshold area for a finger touch.

Item 228. The touch sensor of item 226, wherein the controller is configured to classify the touch as unintentional if the touch profile includes multiple peak nodes and the area of the profile is greater than a threshold area for multiple touches within the touch profile.

Item 229. The touch sensor of item 226, wherein the controller is configured to classify the touch as unintentional based on a number of peak nodes as a function of the area of the touch profile.

Item 230. The touch sensor of item 226, wherein the controller is configured to classify the touch as unintentional if a distance between at least one non-peak node in the profile and a peak node nearest to the non-peak node exceeds a threshold distance.

Item 231. The touch sensor of item 226, wherein the controller is configured to classify the touch based on a history over multiple scans of the touch panel of at least one of:
number of peak nodes within the touch profile,
profile area,
profile shape; and
connections between touch profile nodes over the multiple scans.

Item 232. The touch sensor of any of items 226 through 231, wherein the controller is configured to:
classify the touch as unintentional during a first scan of the touch panel; and
on a next scan of the touch panel, classify any node having a signal value above the threshold that is connected to a node of the unintentional touch of the previous scan as a node within a profile of a continuing unintentional touch.

Item 233. The touch sensor any of items 226 through 232, wherein the controller is configured to:
identify a subsequent touch that falls within the profile of the unintentional touch or the continuing unintentional touch as an intentional touch only after there has been at least one scan of the touch panel for which no nodes within the profile of the unintentional touch or the continuing unintentional touch have a signal value above the threshold value.

Various modifications and alterations of the embodiments disclosed herein will be apparent to those skilled in the art. For example, the reader should assume that features of one disclosed embodiment can also be applied to all other disclosed embodiments unless otherwise indicated.

What is claimed is:

1. A method of determining a touch location on a touch surface of a touch panel comprising a matrix of intersecting electrodes with nodes at intersections of the electrodes, the method comprising:
discriminating between one or more intentional touches and one or more unintentional touches on the touch surface using first criteria; and
for each touch identified as an intentional touch, discriminating between a finger touch and a pen touch using second criteria, wherein discriminating between the finger touch and the pen test comprises identifying the touch as a pen touch if a distance between a touch and a profile of a previously identified intentional or unintentional touch is greater than a distance threshold.

2. The method of claim 1, wherein the intentional touches comprise multiple temporally overlapping touches.

3. The method of claim 1, wherein discriminating between the intentional and unintentional touches using the first criteria comprises identifying a touch as an unintentional touch based on at least one of:
a size of a profile of the touch on the touch surface;
a number of peaks within the profile; and
a distance between a peak of the profile and nodes of the profile.

4. The method of claim 1, wherein discriminating between the pen touch and the finger touch using the second criteria comprises:
determining a slope of a profile of a touch on the touch surface;
identifying the touch as a finger touch if the slope is greater than a slope threshold; and
identifying the touch as a potential pen touch if the slope is less than the slope threshold.

5. The method of claim 1, wherein discriminating between the finger touch and the pen touch comprises identifying the touch as a pen touch if nodes within the predetermined radius of a profile of the touch have signal values less than an ambient threshold.

6. A method of determining a touch location on a touch surface of a touch panel comprising a matric of intersecting electrodes with nodes at intersections of the electrodes, the method comprising:
discriminating between one or more intentional touches and one or more unintentional touches on the touch surface using first criteria;
for each touch identified as an intentional touch, discriminating between a finger touch and a pen touch using second criteria; and
re-identifying the pen touch as a finger touch if the pen touch was previously identified as a finger touch.

7. The method of claim 1, wherein discriminating between the intentional and the unintentional touch comprises:
determining a profile of a touch on the touch surface; and
identifying the touch as an unintentional touch based on one or more of:
a size of the profile;
a number of peaks within the profile; and
a distance between a peak of the profile and nodes of the profile.

8. A touch sensor, comprising:
a touch panel having a touch surface and a matrix of electrodes with nodes at intersections of the electrodes; and
a touch controller configured to
discriminate between one or more intentional touches and one or more unintentional touches on the touch surface using first criteria; and
for each touch identified as an intentional touch, discriminate between a finger touch and a pen touch using second criteria, wherein the controller is configured to re-identify the pen touch as a finger touch if the pen touch was previously identified as a finger touch.

9. The touch sensor of claim 8, wherein the intentional touches comprise multiple temporally overlapping touches.

10. The touch sensor of claim 8, wherein the controller discriminates between the intentional and unintentional touches using the first criteria by identifying a touch as an unintentional touch based on at least one of:
a size of a profile of the touch on the touch surface;
a number of peaks within the profile; and
a distance between a peak of the profile and nodes of the profile.

11. The touch sensor of claim 8, wherein the controller discriminates between the pen touch and the finger touch using the second criteria by:
determining a slope of a profile of a touch on the touch surface;
identifying the touch as a finger touch if the slope is greater than a slope threshold; and
identifying the touch as a potential pen touch if the slope is less than the slope threshold.

12. A touch sensor comprising:
a touch panel having a touch surface and a matrix of electrodes with nodes at intersections of the electrodes; and
a touch controller configured to:
discriminate between one or more intentional touches and one or more unintentional touches on the touch surface using first criteria; and
for each touch identified as an intentional touch, discriminate between a finger touch and a pen touch using second criteria, wherein the controller discriminates between the finger touch and the pen touch by identifying the touch as a pen touch if a distance between a touch and a profile of a previously identified intentional or unintentional touch is greater than a distance threshold.

13. The touch sensor of claim 8, wherein controller is configured to discriminate between the finger touch and the pen touch by identifying the touch as a pen touch if nodes within the predetermined radius of a profile of the touch have signal values less than an ambient threshold.

14. The touch sensor of claim 8, wherein the controller is configured to discriminate between the intentional and the unintentional touch by:
- determining a profile of a touch on the touch surface; and
- identifying the touch as an unintentional touch based on one or more of:
  - a size of the profile;
  - a number of peaks within the profile; and
  - a distance between a peak of the profile and nodes of the profile.

* * * * *

UNITED STATES PATENT AND TRADEMARK OFFICE
CERTIFICATE OF CORRECTION

PATENT NO. : 10,216,330 B2
APPLICATION NO. : 15/319410
DATED : February 26, 2019
INVENTOR(S) : Joshua Vavra et al.

Page 1 of 1

It is certified that error appears in the above-identified patent and that said Letters Patent is hereby corrected as shown below:

On the Title Page

Item (72)
Line 4, Delete "Ornis" and insert -- Drnis --, therefor.

In the Specification

Column 8
Line 22, Delete "capacitve" and insert -- capacitive --, therefor.

Column 9
Line 49, Delete "my" and insert -- may --, therefor.

Column 19
Line 24, Delete "the a" and insert -- the --, therefor.

Column 24
Line 36, Delete "$Nt^h$" and insert -- $N^{th}$ --, therefor.

Column 35
Line 25, Delete "to to" and insert -- to --.

Column 64
Line 7, Delete "誘 誧 誧" and insert -- FIG. --, therefor.

In the Claims

Column 87
Line 33, In Claim 1, Delete "test" and insert -- touch --.

Signed and Sealed this
Tenth Day of September, 2019

Andrei Iancu
*Director of the United States Patent and Trademark Office*